(12) United States Patent
Gimlan

(10) Patent No.: US 7,615,970 B1
(45) Date of Patent: Nov. 10, 2009

(54) ENERGY INVEST AND PROFIT RECOVERY SYSTEMS

(76) Inventor: Gideon Gimlan, 100 Lasuen Ct., Los Gatos, CA (US) 95032

(*) Notice: Subject to any disclaimer, the term of this patent is extended or adjusted under 35 U.S.C. 154(b) by 505 days.

(21) Appl. No.: 11/211,069

(22) Filed: Aug. 24, 2005

(51) Int. Cl.
H01M 10/46 (2006.01)
(52) U.S. Cl. .................................. 320/166
(58) Field of Classification Search .......... 320/166, 320/167, 101
See application file for complete search history.

(56) References Cited

U.S. PATENT DOCUMENTS

| | | | |
|---|---|---|---|
| 2003/0186110 A1* | 10/2003 | Sloop | 429/49 |
| 2005/0008904 A1* | 1/2005 | Suppes | 429/9 |
| 2005/0088140 A1* | 4/2005 | Bushong et al. | 320/107 |

* cited by examiner

Primary Examiner—Edward Tso

(57) ABSTRACT

A variable density actualizing means is provided for supporting one or both of temporarily condensed electric charge and intensified magnetic flux flow and for thereby generating electrical energy. More specifically, such an actualizing means comprises: (a) condensing means for condensing one or more of an amount of electrical charge supplied from a charge donating source and flux flow induced by a magnetic field generated by a magnetic field source; (b) decondensing means, integrated with the condensing means and couplable to one or more energy sources, for reducing the density of (decondensing) the charge and/or flux flow condensed by the condensing means, the decondensing being powered by input energy received from one or more of the energy sources; wherein the decondensing means is powered by at least one of (b.1) heat energy received from one or more of the energy sources; (b.2) pressure energy received from one or more of the energy sources; (b.3) displacement energy received from one or more of the energy sources; (b.4) electrolytic ion removal energy received from one or more of the energy sources; (b.5) dielectric constant reducing energy received from one or more of the energy sources; and (b.6) magnetic permitivity reducing energy received from one or more of the energy sources. The variable density actualizing means of one embodiment is provided as an integral part of a compressor of compressible fluids (i.e., refrigerants). The variable density actualizing means of one embodiment is provided as an integral part of a fluid condenser and/or heat radiator.

22 Claims, 21 Drawing Sheets

40

200

270

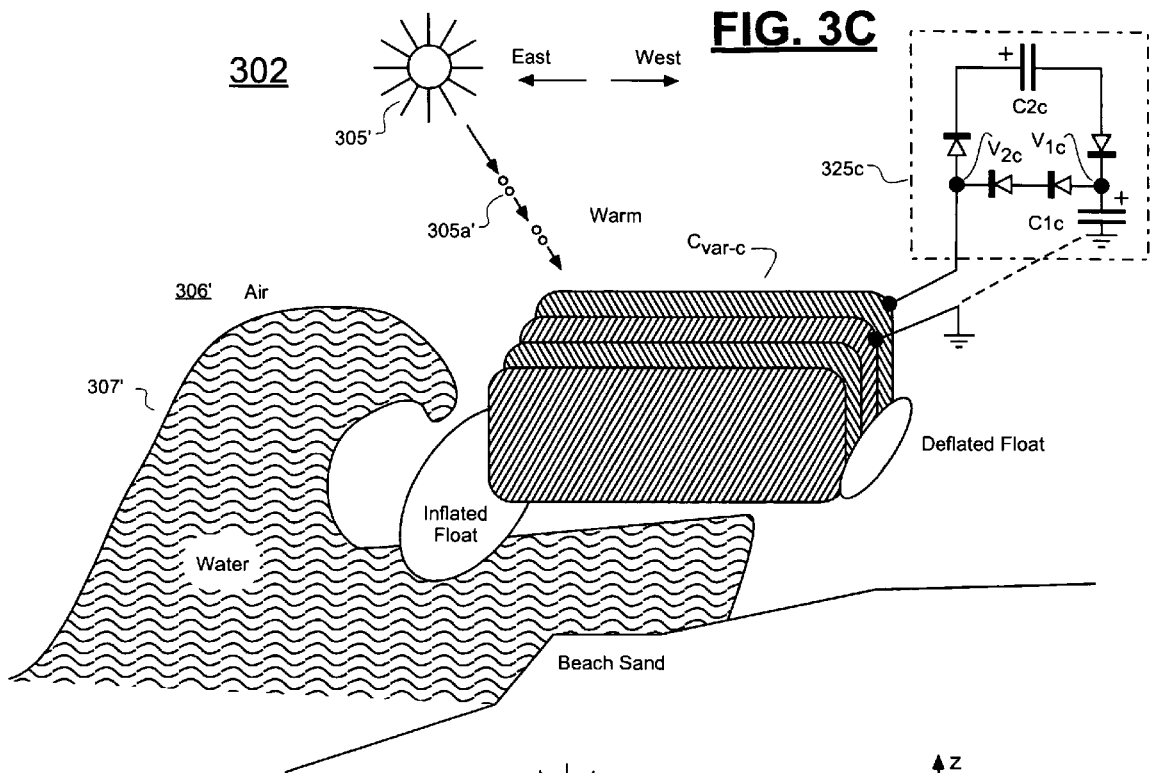
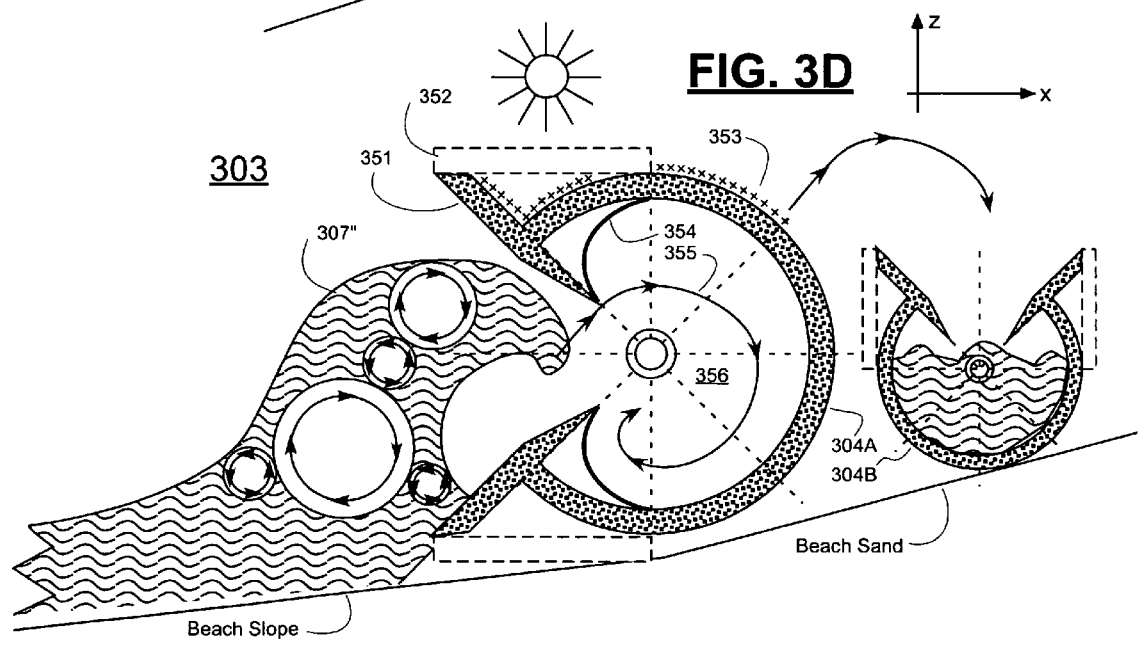

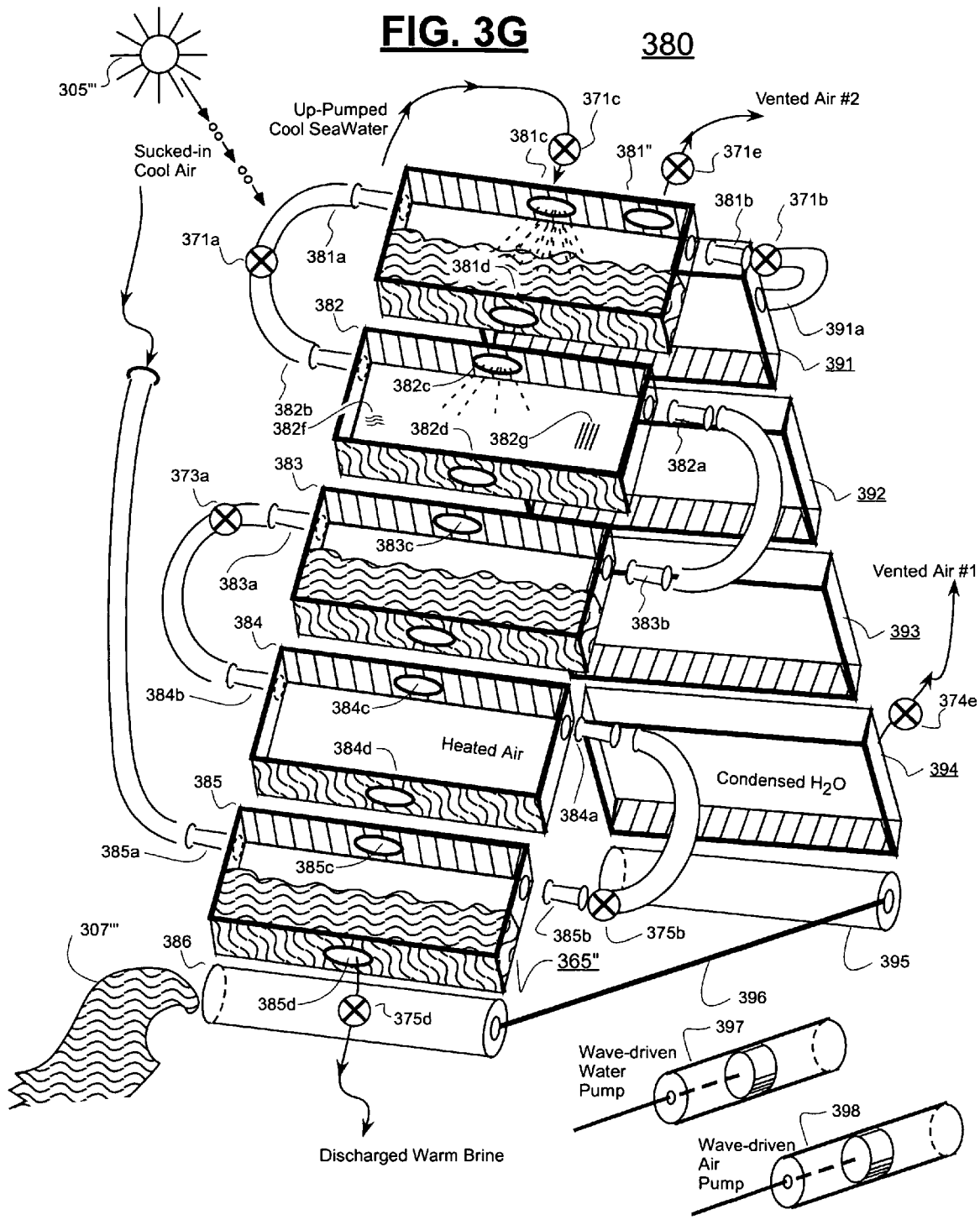

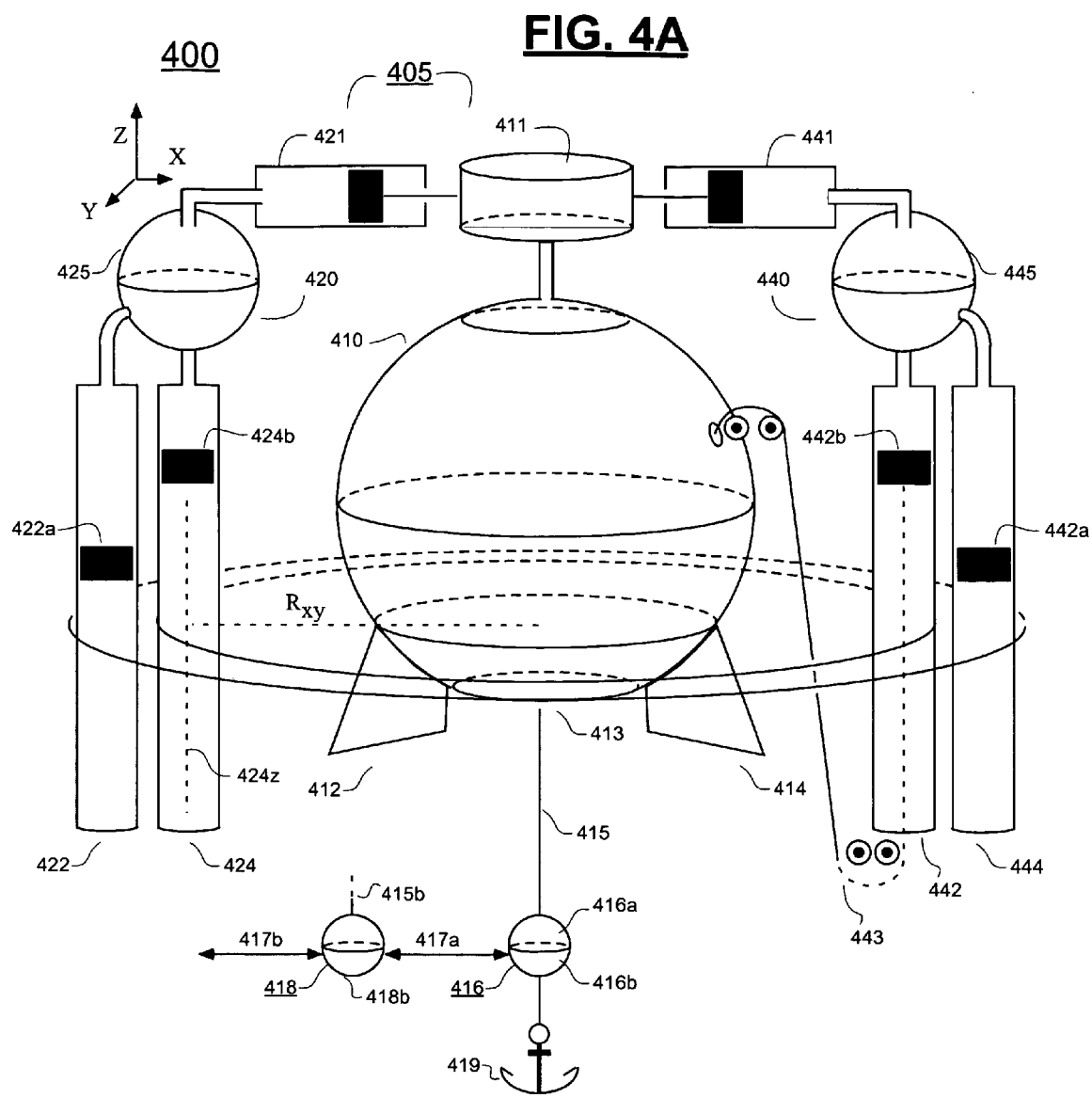

480

800

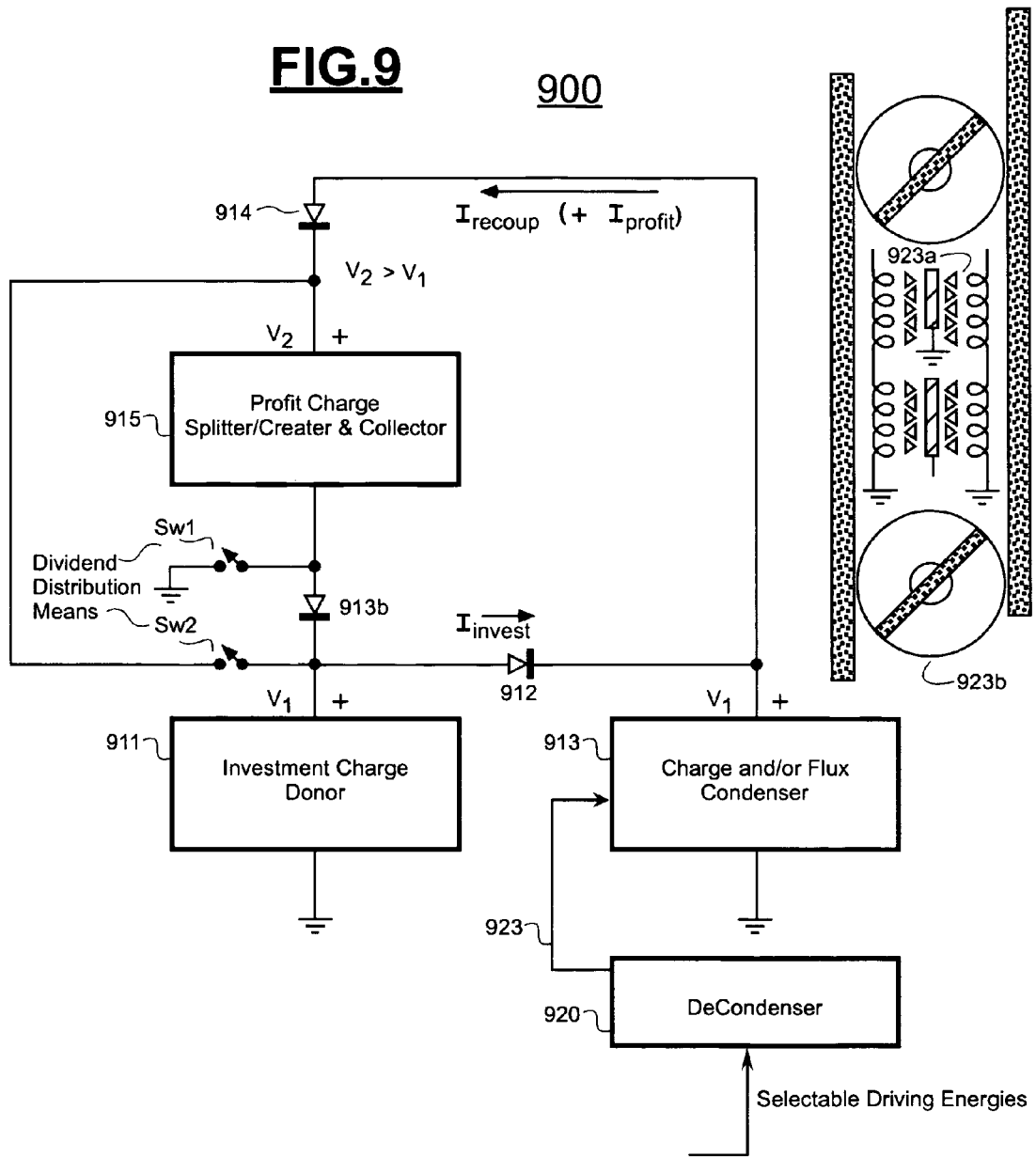

ENERGY INVEST AND PROFIT RECOVERY SYSTEMS

FIELD OF DISCLOSURE

The present disclosure of invention relates generally to generation of electrical energy by separation of opposed charges from one another. More specifically, it relates to the purposeful condensing of un-neutralized electrical charge, and/or the purposeful condensing of magnetic flux flow, this being followed by opportunistic decondensing of one or both of these condensed entities and by directed extraction of electrical energy from an EMF that is generated by the decondensing step.

CROSS REFERENCE TO CO-OWNED APPLICATION

The following copending U.S. patent application is owned by the owner of the present application, and its disclosure is incorporated herein by reference:

(A) Ser. No. 10/233,815 filed Sep. 3, 2002 by Gideon Gimlan and which is originally entitled, ELECTROSTATIC ENERGY GENERATORS AND USES OF SAME; subsequently issued as U.S. Pat. No. 6,936,994 on Aug. 30, 2005.

DESCRIPTION OF RELATED ART

Under well-known laws of thermodynamics, in general, energy is neither created nor destroyed. Instead it is transformed from one form to another, often becoming more diffuse, spatially distributed (decondensed) and more randomly ordered in the process, that is; if it is not intentionally guided during the transformation process towards a condensed form. This tendency towards spatial expansion, diffusion of concentration and shift to greater levels of disorder is generally known as entropy. The concept is sometimes expressed by stating that there is no such thing as a 100% efficient engine. Another way of expressing it is that one rarely gets something for nothing. Yet another is that systems have a tendency to randomly transitioning from more orderly condensed states to less orderly decondensed states.

By way of example, consider the case of a conventional automobile driving up a hill. Although not immediately visible to the human eye, it is understood that machinery within the automobile is converting the concentrated and explosively released chemical energy of a liquid fossil fuel (i.e., gasoline or diesel) partly into kinetic motion ($E=0.5*mv^2$) and some into potential energy ($E=mgh$). Were it not for the piston chamber guiding the explosive energy of combustion in a particular direction so as to do useful work, the explosive release of combustion energy would preferentially expand randomly in all directions and do essentially no useful work. (That being true unless the intent of the user was to make a big bang noise, release a lot of heat and release combustion byproducts, i.e. $CO_2$, into the atmosphere.) By controllably directing the mechanical portion of the released energy in a particular direction, namely in the reciprocation direction of the piston, some of the released energy is converted to doing useful work, i.e., propelling the vehicle. Some is not though.

Much of the energy of combustion is often wasted. In the case of the conventional internal combustion engine (ICE), the energy efficiency assigned to the machinery is often less than 50%. As poor as this number is, it is optimistically misleading. The exploding liquid fossil fuel (i.e., diesel or gasoline) did not by itself get into the combustion chamber and into the state where it can do useful work. A long series of energy investments were made along the way to getting to the stage where the fuel is highly ordered (refined) and available for transformation into useful kinetic energy. Energy was invested to drill holes in the ground and to extract crude oil. Energy was invested to refine the crude oil. Energy was invested to transport the refined product (i.e., diesel or gasoline) to a retail level dispensing station (gasoline station). Energy was invested to pump the liquid fossil fuel from the retail station's tank into the automobile's gas tank and then to pump the same into the internal combustion engine (ICE) for combustion therein. Energy was invested to mix oxygen with the fluidic fuel and to ignite the mixture (i.e., by compressing the mixture and/or sparking it). At each step of the way, investments were made and costs were paid, all in hope of usefully recouping a leftover amount of energy that still exceeds the total investments. Then, surprisingly, at the end of that series of operations, roughly 50% or more of the chemically released energy is blown away as waste heat. It is allowed to exit the ICE as hot gas spreading out in a disorderly manner. The wasted part of the released energy leaves not only as hot exhaust blowing out of the tail pipe (a form of chimney) but also as hot air blowing away from the engine's radiator (or condenser, as it might be termed when cooled vapor is condensed into liquid form).

Under conventional orthodoxy, this wasted 50% or more of the released energy (a rough approximation) is a necessary byproduct of the laws of entropy. Some energy must be lost in order to drive the reaction in the desired direction and reap the reward of useful energy conversion. However the laws of thermodynamics do not require inefficiencies of such large magnitudes. The problem is that the released energy is allowed to rapidly dissipate and spatially distribute out into the ambient atmosphere as waste heat rather than being further guided and controlled in a manner similar to how it was controlled inside the piston chamber. The unguided dissipation of heat does not do much useful work. What is interesting is that the wastefully dissipated heat energy starts its life in a concentrated (condensed) form in the tail-pipe effluents of the vehicle, or in the radiator emissions of hot air and in other such, not yet fully diffused emanations. When so concentrated, the heat energy could still have been used for carrying out useful work in an efficient manner rather than being merely used for example to pump effluents out of the tail pipe. However, because it is labeled as "waste" heat, the energy is allowed to become more and more spatially diffused and to spread itself out into the atmosphere. As it fades off into the distance, our ability to use that energy for useful work dissipates with each increased level of its diffusion (each level of decondensation). Ultimately the dissipated energy will leave the planet as very diffuse infrared or other radiation, heading off into space with no intent of ever coming back. (There is no such thing as "renewable energy" incidentally. It is all part of a one-way energy flow emanating from the Sun and heading out into space against the direction of gravitational attraction.)

While the waste heat energies were still concentrated within the automobile body, they could have, in theory, been converted into useful other forms of energy. Doing so economically is the problem. Thermo-electric generators (TEG's) have been fashioned from semiconductor materials. These are expensive and have low efficiencies. A need exists for less costly alternatives. Beyond automobiles (the fossil fuel powered kind), opportunities exist for useful capture of other kinds of lost energies in many situations. Examples include the ocean waves that batter the beaches day in and day out, winds that blow warm and cold air back and forth, waste heat energy pumped out from condensers of air conditioning (or refrigerating) systems and solar energy that impinges on rooftops and other surfaces. What if there was an economical way to capture these kinds of energies and to convert them so they generate separated charged particles, a condition that is sometimes referred to as electrical energy?

SUMMARY

Structures and methods may be provided in accordance with the invention for opportunistically capturing otherwise wasted energies and converting them into energy defined by spaced apart sets of oppositely charged particles. In broad, general terms, a method in accordance with the invention comprises a purposeful condensing of un-neutralized electrical charge and/or a purposeful condensing of magnetic flux flow followed by decondensing of one or both of these condensed entities and by directed extraction of surplus electrical energy from an EMF (electromotive force) that is generated by the decondensing step. External energy (i.e., wind, wave, solar, thermal and/or other) is used to power the decondensing step and to thereby generate the resulting EMF. (No claim is made here of perpetual motion or of obtaining free energy. There is no something for nothing being described herein. As will be clearly seen, up front energy investments are generally made before useful returns of profit from those investments are reaped, if at all.)

A methodology in accordance with the invention can include the steps of (1) temporarily increasing the density of (condensing on one or both of electrically charged particles and magnetic flux flows; (2) using received input energy to reduce the density of (to decondense) the temporarily condensed electrical charges and/or magnetic flux flows; and (3) directing a charge flow that results from the decondensing step to a profit energy collector. In one embodiment, the directed charge flow is further directed to a charge donor that was used to temporarily increase the density of one or both of the electrical charge and the magnetic flux flow so that the donor recoups at least part of its donation. In one embodiment, the received input energy is manifested as at least one of: (a) an increase of temperature (meaning that heat energy is flowing in); (b) a decrease of previously increased pressure; (c) an increase of previously decreased spacing between charge condensing electrodes (i.e., capacitor plates); (d) an increase of previously decreased or extinguished spacing between magnetic flux conducting pole pieces; (e) removal of dielectric constant enhancing conditions; and (f) removal of magnetic permitivity enhancing conditions.

Although the step of temporarily condensing same-charged particles and/or same-directed magnetic flux flows, and the subsequent step of decondensation, sound like lofty ones; one subset of this broadly stated approach is met by conventional electromagnet generators and by less often used, but already known, charge pumps that use mechanically agitated variable capacitors of the air gap comb type. After all, in a conventional electromagnet generator, a magnetic flux flow is forced to collapse as rotor and stator pole pieces are pulled apart from one another and a corresponding EMF is produced in the generator's coil. A broad claim is not made here to all manifestations of the broad principle. Nonetheless, the above broad expression of the operating principle opens new and nonobvious doors for converting otherwise wasted energies into useful electrical energy because the expression is followed herein with the query of where more can such operating principles be applied practically? More specifically, instead of dissipating heat energy from the fluid condenser (heat radiator) of an air conditioning system directly into the atmosphere (even though, eventually, that is where the exhausted heat energy will usually end up), some of the dissipating heat can first be converted into electrical energy in accordance with details provided below. The generated electrical energy can then be used to power an electrically driven compressor of the air conditioning system, thereby increasing the efficiency of the air conditioning system. This can have significant impact on the environment, particularly in times when global warming and air pollution are problems and fossil fuels or grid-supplied electrical energy are expensive.

A variable density actualizing means is provided in accordance with the invention for supporting one or both of temporarily condensed electric charge and intensified magnetic flux flow, where the actualizing means comprises: (a) condensing means for condensing one or more of an amount of electrical charge supplied from a charge donating source and flux flow induced by a magnetic field generated by a magnetic field source; (b) decondensing means, integrated with the condensing means and couplable to one or more external energy sources, for reducing the density of (decondensing) the charge and/or flux flow condensed by the condensing means, the decondensing being powered by energy received from one or more of the external energy sources; wherein the decondensing means is powered by at least one of (b.1) heat energy received from one or more of the external energy sources; (b.2) pressure energy received from one or more of the external energy sources; (b.3) displacement energy received from one or more of the external energy sources; (b.4) electrolytic ion removal energy received from one or more of the external energy sources; (b.5) dielectric constant reducing energy received from one or more of the external energy sources; and (b.6) magnetic permitivity reducing energy received from one or more of the external energy sources. The variable density actualizing means of one embodiment is provided as an integral part of a compressor of compressible fluids (i.e., refrigerants). The variable density actualizing means of one embodiment is provided as an integral part of a fluid condenser and/or heat radiator. The variable density actualizing means of one embodiment is provided as an integral part of a heater (i.e., dual flames burner). The variable density actualizing means of one embodiment is provided as an integral part of a fluid carrying passageway (i.e., an alternating cooled and heated chimney). The variable density actualizing means of one embodiment is provided as an integral part of an electric current carrying means (i.e., dual motor windings). The variable density actualizing means of one embodiment is provided as an integral part of a solar radiation absorber (i.e., rooftop system). The variable density actualizing means of one embodiment is provided as an integral part of an ocean power system. Specific ones of such embodiments will be elucidated below.

A method (#1) in accordance with the present invention comprises: (a) alternatingly exposing a temperature-sensitive, first charge storing means (e.g., capacitor, supercapacitor, wet battery) to one or more fluids of temperatures that are substantially different from one another so that at a first of the substantially different temperatures, electrical charge is urged to enter and become temporarily stored (condensed) in the temperature-sensitive, first charge storing means and so that at a second of the substantially different temperatures, a substantial amount of electrical charge is purged (decondensed) out of the first charge storing means; the method further comprising: (b) passing the purged charge through a first profit charge collecting means; and (c) from time to time, operatively coupling the first profit charge collecting means to a first charge lending means so that the first lending means can use at least some of the collected profit charge for subsequent donation (re-investment) to the temperature-sensitive, first charge storing means when the first charge storing means is again at said first temperature.

A method (#2) in accordance with the disclosure may alternatively or further comprise: (d) alternatingly exposing a pressure-sensitive, second charge storing means (e.g., capacitor, supercapacitor, wet battery) to one or more fluids pressures that are substantially different from one another so that at a first of the substantially different pressures, electrical charge is urged to enter and become temporarily stored (condensed) in the pressure-sensitive, second charge storing means and so that at a second of the substantially different pressures, a substantial amount of electrical charge is purged out of the second charge storing means; the method further comprising: (e) passing the purged charge through the first or another profit charge collecting means; and (f) from time to time, operatively coupling the first or other profit charge collecting means to the first or another charge lending means so that the first or other lending means can use at least some of the collected profit charge for subsequent donation (re-investment) to the pressure-sensitive, second charge storing means when the second charge storing means is again at said first pressure.

A method (#3) in accordance with the disclosure may alternatively or further comprise: (g) alternatingly exposing an electrolytic type of charge storing means (third charge storing means, e.g., supercapacitor, wet battery) to first and second fluids of substantially different electrolytic capabilities (e.g., electrolyte and non-electrolyte) so that when the fluid with substantially greater electrolytic capability is exposed to the third charge storing means, electrical charge is urged to enter and become temporarily stored (condensed) in the third charge storing means and so that when the fluid with substantially lesser electrolytic capability is alternatingly injected into the third charge storing means, a substantial amount of electrical charge is purged out of the third charge storing means; the method further comprising: (h) passing the purged charge from the third charge storing means through the first or another profit charge collecting means; and (i) from time to time, operatively coupling the first or other profit charge collecting means to the first or another charge lending means so that the first or other lending means can use at least some of the profit charge collected from the purging of the third charge storing means for donation to the third charge storing means when the fluid with substantially greater electrolytic capability is next used electrolytically within said third charge storing means. In one embodiment the first and second fluids of substantially different electrolytic capabilities are substantially immiscible in one another.

A method (#4) in accordance with the disclosure may further comprise: (j) alternatingly exposing a dielectric constant-sensitive, fourth charge storing means (e.g., capacitor, supercapacitor, wet battery) to two or more fluids of dielectric constants that are substantially different so that when the fourth charge storing means is subjected to a first fluid having a first of the substantially different dielectric constants, electrical charge is urged to enter and become temporarily stored in the dielectric constant-sensitive, fourth charge storing means and so that when the fourth charge storing means is subjected to another fluid having a second of the substantially different dielectric constants, a substantial amount of electrical charge is purged out of the fourth charge storing means; the method further comprising: (k) passing the purged charge through the first or another profit charge collecting means; and (L) from time to time, operatively coupling the first or other profit charge collecting means to the first or another charge lending means so that the first or other lending means can use at least some of the collected profit charge for subsequent donation (re-investment) to the dielectric constant-sensitive, fourth charge storing means when the fourth charge storing means is again subjected to the first fluid having the first of the substantially different dielectric constants.

An apparatus (#1) in accordance with the disclosure comprises: (a) first means for alternatingly exposing a temperature-sensitive, first charge storing means (e.g., capacitor, supercapacitor, wet battery) to one or more fluids of temperatures that are substantially different so that at a first of the substantially different temperatures, electrical charge is urged to enter and become temporarily stored (condensed) in the temperature-sensitive, first charge storing means and so that at a second of the substantially different temperatures, a substantial amount of electrical charge is purged out of the first charge storing means; the method further comprising: (b) second means for passing the purged charge through a first profit charge collecting means; and (c) third means for operatively coupling, from time to time, the first profit charge collecting means to a first charge lending means so that the first lending means can use at least some of the collected profit charge for subsequent donation (re-investment) to the temperature-sensitive, first charge storing means when the first charge storing means is again at said first temperature.

The same or an alternate apparatus (#2) in accordance with the disclosure may further or alternatively comprise: (d) fourth means for alternatingly exposing a pressure-sensitive, second charge storing means (e.g., capacitor, supercapacitor, wet battery) to one or more fluids of pressures that are substantially different so that at a first of the substantially different pressures, electrical charge is urged to enter and become temporarily stored in the pressure-sensitive, second charge storing means and so that at a second of the substantially different pressures, a substantial amount of electrical charge is purged out of the second charge storing means; the method further comprising: (e) fifth means for passing the purged charge through the first or another profit charge collecting means; and (f) sixth means for operatively coupling, from time to time, the first or other profit charge collecting means to the first or another charge lending means so that the first or other lending means can use at least some of the collected profit charge for subsequent donation (re-investment) to the pressure-sensitive, second charge storing means when the second charge storing means is again at said first pressure.

One embodiment of the combined or separate first and second apparatuses is integrated as part of a compressor of one or more fluids that contain gases (e.g., a compressor of a refrigerant or a compressor of air) such that the repeatedly changed temperatures and/or pressures within the compressor drive said purging of charge through the first or other profit charge collecting means. Another embodiment of the combined or separate first and second apparatuses is integrated as part of a condenser system for one or more preheated fluids (e.g., a condenser system within a refrigeration system or a condenser system within a power generating plant) where the condenser system is structure to repeatedly subject the one or more variable charge storing means to changing temperatures and or pressures such that the repeatedly changed temperatures and/or pressures within the compressor drive said purging of charge through the first or other profit charge collecting means.

Other aspects will become apparent from the below detailed description.

BRIEF DESCRIPTION OF THE DRAWINGS

The below detailed description section makes reference to the accompanying drawings, in which:

FIG. 3C is a schematic diagram of a first beach crawler that may be used to generate electricity from the modulating thermal and electrical properties provided by advancing and receding ocean waves;

FIG. 3D is a cross sectional view of a second beach crawler that includes one or more rotating wave catchers;

FIG. 3G is a perspective schematic of an on-shore A-frame system;

FIG. 4A is a perspective wire-frame schematic of a buoy system in accordance with the invention;

FIG. 9 is a schematic diagram summarizing some of the concepts disclosed herein regarding the condensing of electrically charged particles and/or the condensing of magnetic flux flow followed by decondensing of the condensed charge or flux flow and collection of recoupment and profit charge.

DETAILED DESCRIPTION

Figure 1A:
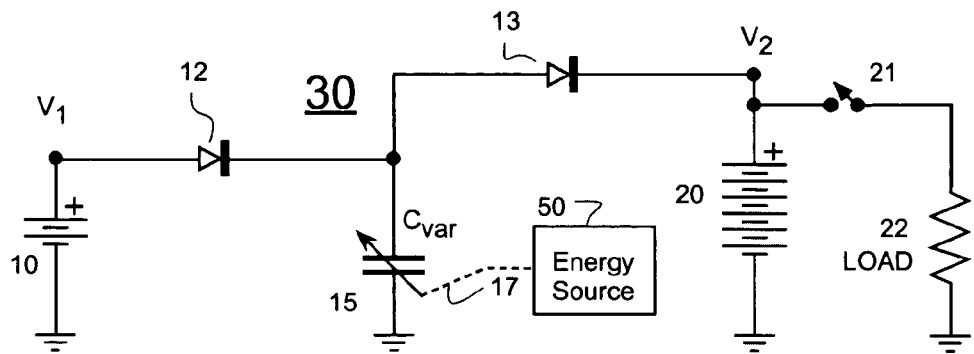
FIG. 1A is a schematic diagram of a conventional charge pumping system including a variable air-gap capacitor.

FIG. 1A is a schematic diagram of a conventional charge pumping system 30 in which the voltage V1 of a first battery 10 is made substantially less than the voltage V2 of second battery 20. Electric charge moves from the first battery 10, through first diode 12 and into variable capacitor 15 ($C_{var}$) when the capacitance of $C_{var}$ 15 is at maximum. Energy source 50 (a high frequency vibrating source) forces air-gap capacitor 15 into a minimum capacitance mode by way of coupling 17. The voltage across $C_{var}$ 15 then rises (V=Q/C) to thereby reverse bias diode 12 and forward bias diode 13. Excess charge from $C_{var}$ 15 then flows into battery 20 (rechargeable) and/or into load 22 if the load-coupling switch 21 is closed. Energy source 50 next forces capacitor 15 into a maximum capacitance mode again by way of coupling 17. The voltage across $C_{var}$ 15 then drops (V=Q/C) to thereby reverse bias diode 13 and forward bias diode 12. Current then flows from battery 10 into $C_{var}$ 15 by way of forward biased diode 12. The cycles repeat and with each cycle the system 30 pumps more charge into battery 20 and/or load 22. It is understood that $C_{var}$ 15 is a conventional, comb-style and air gap type of variable capacitor. One drawback of this system 30 is that the first battery 10 eventually depletes and must be replaced. Another drawback of this system 30 is that the maximum capacitance of the air gap variable capacitor 15 is relatively small and thus little charge is pumped per cycle.

There is yet another defect to the charge pumping system 30 of FIG. 1A. It is known as the capacitor energy paradox. Assume two capacitors (not shown) of equal capacitance where one is charged to 10 volts and the other is uncharged. The amount of stored energy in the system is proportional to the square of the stored voltage in each capacitor ($\frac{1}{2} CV^2$). For simplicity, the expression, $10^2+0^2=100$ is used as a representative number. If the two capacitors (not shown) are suddenly connected in parallel, their voltages will equalize to 5 volts across each. Now the energy in the system is represented as: $5^2+5^2=50$. Half the energy disappeared. Where did it go? (Hint: some of it became kinetic energy.) In FIG. 1A, battery 10 may be considered sort of as a first capacitor that equalizes its voltage into second capacitor, $C_{var}$ 15 when $C_{var}$ goes to a relative maximum value. $C_{var}$ 15 may be considered sort of a first capacitor that equalizes its voltage into second capacitor 20 (the larger battery) when voltage across $C_{var}$ goes high. The capacitor energy paradox applies to each charge transference step in system 30 of FIG. 1A. Battery 10 is being depleted of charge each time variable capacitor $C_{var}$ (15) goes low, the voltage across battery 10 (a chemical storage means) eventually goes low and the energy stored in battery 10 drops as a function of stored charge times voltage ($\frac{1}{2}QV=\frac{1}{2}C'V^2$, where C' is a hypothetical capacitance of the battery). The loss of charge (Q) from battery 10 is not a good thing. The drop of voltage across battery 10 is not a good thing. These two undesirable traits multiply together. The capacitor energy paradox dissuades many practitioners from pursuing systems of this type.

Figure 1B:
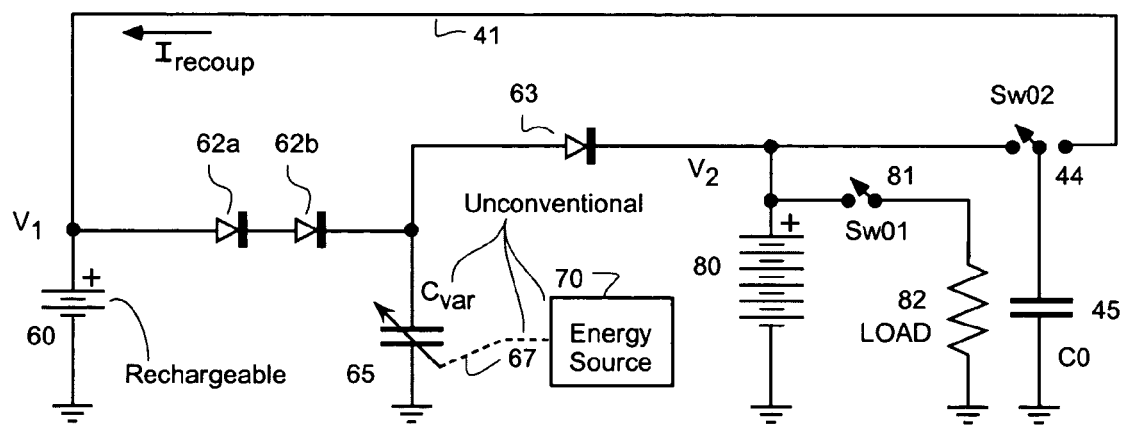
FIG. 1B is a schematic diagram of a first charge pumping system that is modified in accordance with the disclosure to include a loan recoupment means.

FIG. 1B is a schematic diagram of a charge pumping system 40 in accordance with the disclosure that includes a loan recoupment means. Comparing FIG. 1B against FIG. 1A, it may be seen that charge-transference capacitor $C_0$ (45) has been added in FIG. 1B, transference control switch $Sw_{02}$ (44) has been added, a recoupment current path 41 leading from switch 44 back to battery 60 has been added, and battery 60 has been made rechargeable. As a result, when energy source 70 modulates $C_{var}$ 65 via coupling 67 a number of times, some of the higher voltage charge passing through diode 63 will be stored in charge-transference capacitor $C_0$ if switch 44 is closed by moving its armature to the left. Then, when switch 44 is temporarily closed by moving its armature to the right, some of the high voltage charge (at voltage level $V_2$) from $C_0$ will trickle back to battery 60 as a recoupment current via path 41. Now, the voltage across battery 60 will not drop as rapidly as if there were no recoupment and the charge in battery 60 will not deplete as quickly as if there were no recoupment (41).

While this recoupment process (41) may seem like a wonderful thing, it is not. No new charge is being generated. Battery 60 is simply getting back some, but not all of the charge it lent out via diodes 62a and 62b. Some of the lent charge is annihilated in resistive load 82 as positive charge meets up in the load 82 with negative charge coming up from the ground connection when switch 81 is closed. Eventually battery 60 will be exhausted of its original charge and it will have to be recharged.

FIG. 1B is provided for making some points. First, the fact that battery 60 is a rechargeable one is an interesting fact because then it becomes possible to return to battery 60, some of the charge it had lent out to $C_{var}$ 65. Second, $C_{var}$ 65, coupling 67 and energy source 70 are marked as being "unconventional" in order to suggest that $C_{var}$ 65 does not have to be a conventional, comb-style and air gap type of variable capacitor, source 70 does not have to be a high frequency vibrating source, and coupling 67 does not have to be a rigid mechanical coupling.

Many alternate combinations can be devised. For example, what if $C_{var}$ 65 included a liquid conductive plate member (e.g., a plate made with room temperature mercury or another electrically conductive liquid which liquid plate is moved away from close proximity with an opposed rigid plate by action of a displacing low-K fluid, i.e. an oil)? What if the motion of ocean waves could be used to repeatedly increase and decrease the capacitance of $C_{var}$ 65 (e.g., by moving its liquid conductive plate over and away from a thin dielectric that covers an opposing rigid plate and is partially metallized with mercury-wettable microstrips)? What if the physical size of $C_{var}$ 65 were very large (many square feet of area per capacitor plate) rather than being small so as to fit onto a printed circuit board with other miniaturized electronic components? Mercury is toxic and therefore not the best choice for a liquid, moving plate. What about salt water from the ocean however? It is partially conductive and the water in it has a relative dielectric constant of about 80 compared to the $\in_r=1$ of dry air. Is it possible that ocean water can be used to form a variable capacitor means? Are variable capacitor means limited only to moving plate air-gap types? It will be seen that the answer is no. A rich array of possibilities is available if only the world is seen under new light.

Another interesting aspect of FIG. 1B is that diodes 62a and 62b are matched to have same reverse bias resistances. When $C_{var}$ 65 pumps up to a voltage greater than $V_2$ (so it can dump its charge into battery 80), diodes 62a and 62b operate to prevent excess reverse current from seeping back (leaking back) into the charge-lending battery 60.

Figure 1C:
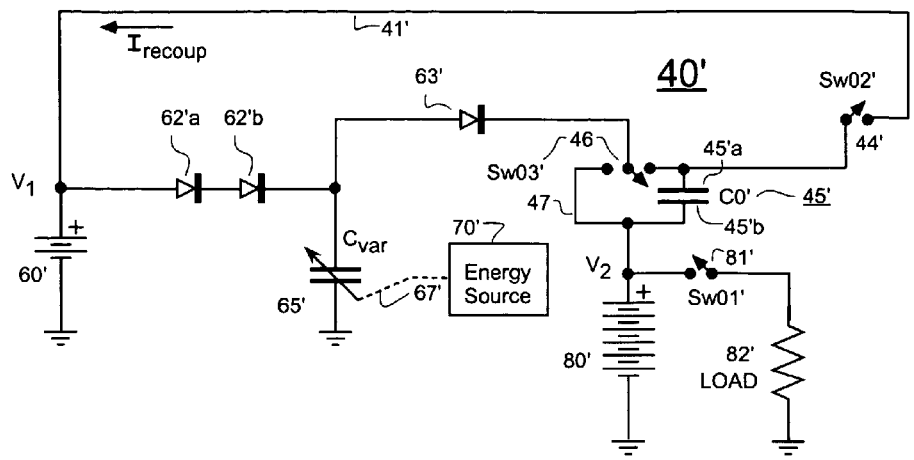
FIG. 1C is a schematic diagram of a second charge pumping system that is structured in accordance with the disclosure to include a profit creating and collecting means.

FIG. 1C takes the concept of FIG. 1B to a higher level. Now charge-transference capacitor $C_0'$ (45') is repositioned to be in series with rechargeable battery 80'. When switch 46 is thrown to place $C_0'$ (45') in series with diode 63', then pumped current flows in series through $C_0'$ and battery 80' as $C_{var}$ modulates between its high and low capacitance modes. A profit charge begins to accumulate in the $C_0'$ capacitor. When switch 46 is thrown to place short circuit 47 between diode 63' and battery 80', switch 44' ($Sw_{02}'$) can be temporarily closed to dump the accumulated profit of $C_0'$ (45') into battery 60' via path 41'.

The system 40' of FIG. 1C suffers from the following problem. When switch 44' is closed (and switch 46 activates short 47), the voltage between plates 45'a and 45'b goes negative. More specifically, $V_{45'a,b}$ goes to $V_1-V_2$ (assuming zero forward drop for the diodes). Then, when switch 44' is opened and switch 46 reinserts $C_0'$ into series with diode 63' and battery 80', the voltage at plate 45'a, relative to ground, is $V_2+(V_1-V_2)=V1$. There is initially hardly any voltage step up for charge being pumped out of $C_{var}$ 65' and through diode 63'. Eventually, profit charge builds up across charge-transference capacitor $C_0'$ (45') to remedy this undesirable situation.

Figure 1D:
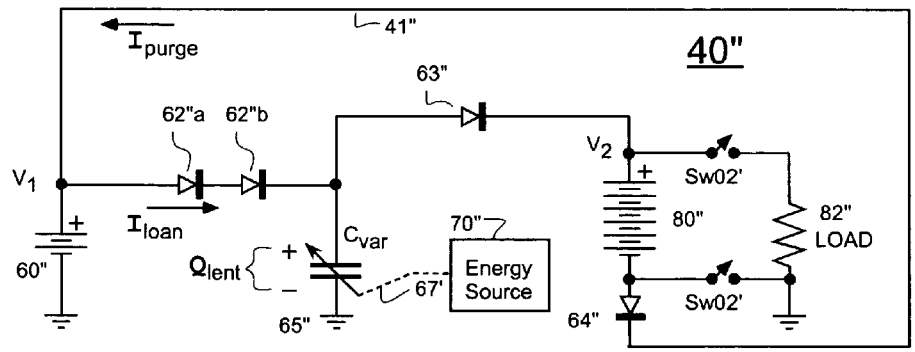
FIG. 1D schematically shows a simpler method for realizing profit collection and recoupment of lent out charge.

The circuit 40" of FIG. 1D solves the defects of FIG. 1C. The charge ($Q_{Lent}$) that battery 60" lends out across the plates of $C_{var}$ (65") when priming current, $I_{Loan}$ flows, is returned to rechargeable battery 60" when $I_{purge}$ is purged out of $C_{var}$ to flow in series through rechargeable battery 80" and diodes 63"-64". When double-ganged switch $Sw_{02}'$ is closed to place load 82" across battery 80", diode 64" becomes reverse biased. Voltage $V_2$ is always greater than $V_1$. Thus variable capacitor 65" is always pumping the charge of $I_{purge}$ up along an uphill energy gradient, thereby increasing the energy content of the pumped charge. Stated otherwise, the priming current, $I_{Loan}$ is fooled into entering a one-way trap (62"a, 62"b) as it enters and condenses in the variable capacitor, $C_{var}$ during the priming phase. Diodes 63" and 64" steer the trapped charge through profit collector 80" during the purge phase. In theory, the trapped charge has no where else to go. (In practice, care should be taken that trap-door diodes 62"a, 62"b do not break down or that the dielectric inside variable capacitor, $C_{var}$ does not break down. Also, care should be taken that trapped charge does not find other paths out of its entrapped situation by for example arcing through surrounding air.)

Figure 1E:
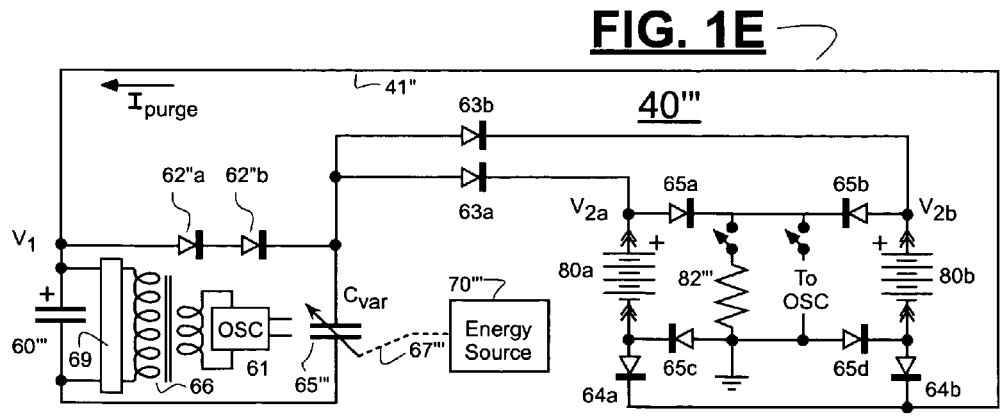
FIG. 1E schematically shows a system with multiple pathways for profit collection.

FIG. 1E shows a further modification. In circuit 40''' there are two rechargeable batteries, 80a and 80b disposed for collecting profit charge. The rechargeable lender battery of FIG. 1D has been replaced by a high voltage capacitor 60'''. Due to the arrangement of steering diodes 65a-65d, whichever of batteries 80a and 80b has the respectively higher one of voltages, $V_{2a}$ and $V_{2b}$, that battery will drive the loads 82''' and oscillator 61 when the corresponding load switches are closed. Whichever of batteries 80a and 80b has the respectively lower of voltages, $V_{2a}$ or $V_{2b}$, will collect profit charge from $I_{purge}$ due to its flow through either diode pair 63a-64a or 63b-64b. Oscillator 61 drives a step-up transformer 66. The step-up transformer 66 couples to capacitor 60''' through full-wave rectifier bridge 69 so as to charge capacitor 60''' to a relatively high $V_1$ level such as 100V or higher (e.g., 500V). The higher that $V_1$ is, the more charge that each of capacitors 60''' and 65''' can store; as long as neither breaks down or leaks excessively (Q=VC). The switch that applies $V_2$-$V_1$ across the power input of oscillator 61 is closed when it is sensed that energy source 70'' is modulating the capacitance of variable capacitor 65''' by way of coupling 67'''. Batteries 80a and 80b may be each removably placed in respective battery-retaining sockets so that either rechargeable battery can be easily replaced while the remaining other continues to provide power to whichever load (82''' and/or 61) is connected and while the remaining other continues to collect profit charge from purge current $I_{purge}$ if the latter is flowing. The concept of FIG. 1E can be expanded to having more than just two profit-collectors, 80a-8b so arranged. If there are 3 or more, the lowest voltage one will draw $I_{purge}$ into itself, the highest voltage one will feed the loads and the other profit-collectors (not shown) will sit in reserve until one of then becomes the highest or lowest voltage one.

Figure 2A:
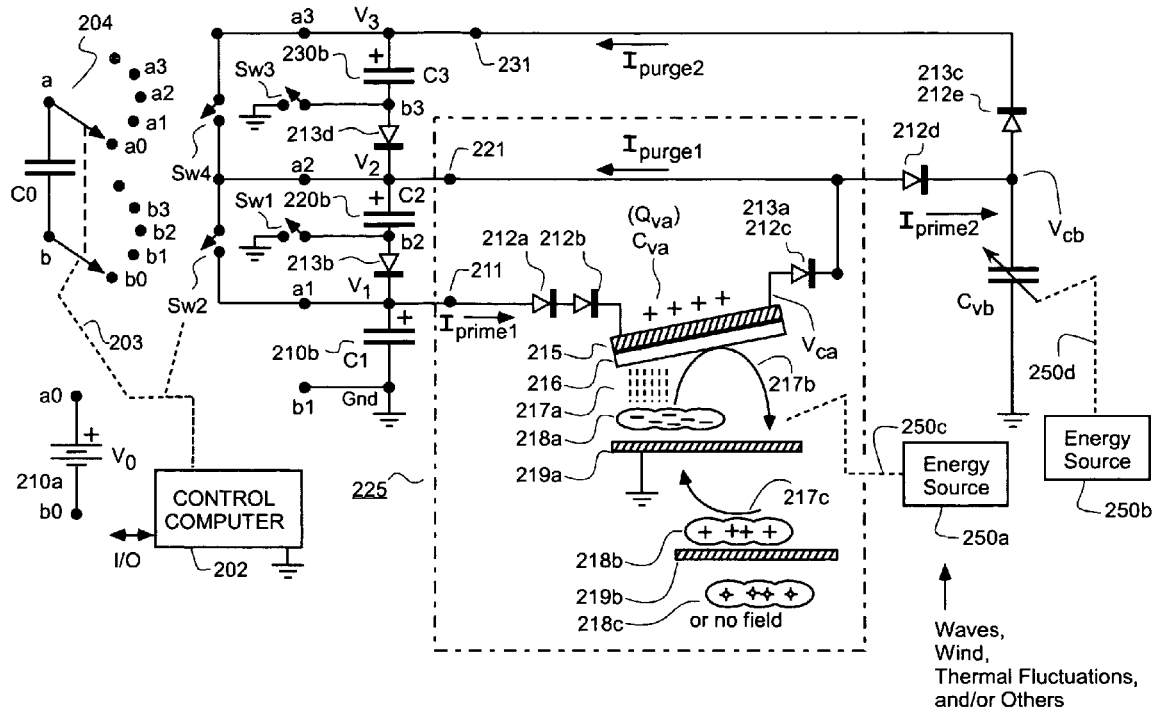
FIG. 2A provides a more detailed look at a first Charge Investing and Profit Recovering (CiPR) system in accordance with the disclosure.

FIG. 2A is a schematic of yet another Charge-investing and Profit Recapturing system (CiPR system) 200 in accordance with the invention. Profit collectors $C_2$ and $C_3$ are arranged in a series relation together with respective diodes 213b and 213d. A basic CiPR system was introduced in above-cited U.S. Ser. No. 10/233,815 (filed Sep. 3, 2002). One new twist shown in FIG. 2A is the placement of each profit-collecting means such as capacitor $C_2$ between matched diodes 213a and 213b. Another is the use of plural and matched diodes such as 212a, 212b in the priming path.

During operation of the illustrated CiPR system 200, a first amount of electrical charge; one referred to as the investment charge, $Q_{va}$, is condensed onto a first conductive plate 215 (e.g., a metallic or bimetallic plate, solid or liquid, or another type of charge storage electrode, i.e. a graphite containing electrode of a supercapacitor) of a first variable capacitance means, $C_{va}$ (an example of a variable charge storage means). Investment occurs during a so-called priming phase. The condensed charge is later pumped out of (evaporated from, decondensed from) the first plate/electrode 215 during a purge phase of the system such that a purge current, $I_{purge1}$ flows in series through the profit-collecting capacitor $C_2$ (220b, an example of a profit-collecting means) and through the charge-lending capacitor $C_1$ (210b, an example of a rechargeable charge-lending means). The lending-capacitor $C_1$ recoups at least part of the amount of charge, $Q_{va}$ it donated during priming, while a split set of opposed charges is produced across the plates (or electrodes) of the profit collecting capacitor $C_2$, this constituting a profit charge. Prime and purge phases are repeated one after the other, and as a result, newly-generated charge accumulates across the profit collecting capacitor $C_2$. The voltage ($V_2$-$V_1$) present across $C_2$ increases as the collected charge ($Q_{C2}$) increases if V=Q/C. In one embodiment, when an appropriately coupled controller or computer 202 detects that the voltage, $V_2$ at top node $a_2$ of $C_2$ has reached a predefined threshold, the computer temporarily closes switches $Sw_1$ and $Sw_2$ to thereby short bottom node $b_2$ (of $C_2$) to ground and to short top node $a_2$ to the top node $a_1$ of the charge-lending capacitor $C_1$ (210b). Charge then redistributes between $C_1$ and $C_2$ as their respective voltages become more equalized. (It is not necessary to wait until they become fully equalized.) In the same or an alternate embodiment, switch 204 is operated under control of controller/computer 202 so that charge-transfer capacitor $C_0$ transfers at least some of the accumulated profit charge from $C_2$ to $C_1$ and/or to rechargeable battery 210a. Note that in the closing of switch $Sw_1$, diode 213b protects capacitor $C_1$ from shorting to ground if $C_1$ holds a positive charge.

Switches $Sw_1$ and $Sw_2$ may also be used for priming the system 200. Assume that $C_2$ has been precharged to voltage $V_0$ while $C_1$ and $C_{va}$ have essentially no charge (0 volts) in them. When switches $Sw_1$ and $Sw_2$ are temporarily closed, $C_2$ empties part of its charge into $C_1$ and $C_{va}$ thereby priming the system. Priming can also take place by operation of switch 204 so that charge is placed across $C_1$ for lending out to $C_{va}$. $C_1$ is assumed to have a much larger capacitance than $C_{va}$ and to be precharged to voltage level, $V_1$>>0. In one class of embodiments, $V_1$ is greater than about 100 volts. In one sub class of embodiments, $V_1$ is greater than about 300V to about 500V. The voltage across capacitor 220b ($C_2$) can be set about equal to $V_1$, or it can be set to a substantially smaller value. The value of $V_1$ can be modified in response to environmental considerations (e.g., what level of capacitance-modulating source energy 250a appears to be present at the moment).

During priming, charge moves from top node $a_1$ of $C_1$ to conductive plate 215 due to the creation of a charge condensing state in variable capacitor means $C_{va}$. Charge condensation may be encouraged by presenting a charge-attracting force 217a such as an attracting electrical field to the first plate 215. This can be done, for example, by moving a given amount of opposed charge 218a onto a nearby, but electrically insulated, second conductive plate 219a or by effectively moving the attractively precharged plate 219a closer to plate 215. Insulation layer 216 may be used to prevent the opposed and attracting charge 218a from combining with and annihilating the investment charge, $Q_{va}$. The material of insulator 216 should be of relatively large dielectric constant (e.g., a ferroelectric insulator), but this is not the only way of keeping charge isolated while providing an attracting field for condensing the investment charge, $Q_{va}$. Another way of condensing charge is to have the condensation-phase, attracting charge 218a chemically bound such that it is not free to combine with and annihilate the attracted free charge, $Q_{va}$. Yet another way is to use a magnetic field to create an electromotive force (EMF) that urges at least some of the positive investment charge, $Q_{va}$ to condense onto plate 215 during priming.

After the invested charge, $Q_{va}$ has condensed onto conductive plate 215, an energy source 250 is used to reduce, neutralize, or reverse the attracting force 217a, for example by moving the attracting charge 218a away from the conductive plate 215 (this movement being represented by path 217b). The moving away of the attracting charge 218a can be followed with a replacing (per path 217c) of the attracting charge (218a) with a repulsive charge (218b) of same polarity as that of the condensed charge, $Q_{va}$ (e.g., positive). As a result of the reduction and/or reversal and/or neutralization of the charge-attracting force 217a, the conductive plate 215 is no longer able to store (condense) as much of the investment charge, $Q_{va}$ as easily as it did before. Its effective, charge-retaining capacitance (charge condensing capabilities) diminishes. As a result, voltage $V_{ca}$ between plate 215 and ground node $b_1$ increases. At some point, diodes 213a-213b become forward biased due to the increase of electromotive force, $V_{ca}$. At least a part of the investment charge, $Q_{va}$ moves out through diode 213a. The expelled charge is urged to flow out as a purged current, $I_{purge1}$ which moves in series through capacitors,

220b ($C_2$) and 210b ($C_1$). These capacitors, 210b and 220b had been precharged by a voltage source 210a (and/or by transfer capacitor $C_0$) so that node 211 is at voltage V1 and so that node 221 is at higher voltage V2. Capacitor 210b originally provided the investment charge, $Q_{va}$ to the variable capacitor means ($C_{va}$). When $I_{purge1}$ flows back, capacitor 210b ($C_1$) will recoup its original investment (partly or wholly). Capacitor $C_1$ will later return the recouped charge back to conductive plate 215 for reinvestment by the carrying out of another prime cycle. By contrast, the second capacitor 220b ($C_2$) did not directly donate any of the purged current ($I_{purge1}$) that now flows through it. Therefore the second capacitor 220b will be realizing a net profit in stored charge due to the flow of purge current, $I_{purge1}$. The separated positive and negative charges that accumulate respectively on the upper and lower plates of $C_2$ represent the profitable workproduct of energy from source 250a as that first energy source 250a repeatedly transitions plate 215 between the charge condensing and charge evaporating states. Note that when $V_{ca}$ (the voltage of plate 215) is below $V_1$, diodes 212a-212b are conducting priming current ($I_{prime1}$) into capacitor $C_{va}$. When $V_{ca}$ is greater than $V_2$, the diodes 213a-213b (where 213a is also referenced as 212b) are conducting the purging current ($I_{purge1}$) out of capacitor $C_{va}$. When $V_1 < V_{ca} < V_2$, then both of diode sets 212a-212b and 213a-213b are reverse biased and the invested charge, $Q_{va}$ is temporarily trapped on plate 215. It is during this latter time that $Q_{va}$ is pushed up the potential energy slope so as to acquire an increased amount of energy. Energy source 250a provides that increasing energy via coupling 250c. The coupled energy 250c may be in dynamic mechanical form, in dynamic thermal form and/or in other modulating form as may be appropriate.

The terms, $\Delta X$-CiPR and/or $\Delta Y$-CiPR are used herein to refer to a situation where a mechanical displacement or translation ($\Delta X$ or $\Delta Y$) defines at least part of the energy coupling 250c (and/or 250d). The term, $\Delta T$-CiPR is used herein to refer to a situation when a temperature change ($\Delta T$) defines at least part of the energy coupling. The term, $\Delta P$-CiPR is used herein to refer to a situation when a pressure change ($\Delta P$) defines at least part of the energy coupling. The term, $\Delta \in$-CiPR is used herein to refer to a situation when a change of dielectric constant ($\Delta \in$) provides at least part of the energy coupling. The term, $\Delta A$-CiPR is used herein to refer to a situation when a change of effective capacitor plate area ($\Delta A$) provides at least part of the energy coupling. The term, $\Delta \beta$-CiPR is used herein to refer to a situation when a change of magnetic flux density ($\Delta \beta$) provides at least part of the energy coupling. It is possible to have these different types of energy couplings operating at the same time and sometimes overlappingly. By way of example, a variable capacitance means that includes a dielectric layer comprising Sn doped and/or Sr doped $BaTiO_3$ particles held in an insulative binder (e.g., a high temperature plastic) and optionally further comprising a ferromagnetic dopant such iron or iron oxide bound to the $BaTiO_3$ particles, for instance, may constitute a dielectric that is sensitive to temperature variation and/or magnetic flux variation such that its effective dielectric constant modulates as a function of modulating temperature and/or a modulating magnetic flux density. Such a variable capacitance means would qualify as a $\Delta T$-CiPR capacitance, as well as a $\Delta \in$-CiPR type and a $\Delta \beta$-CiPR type.

In the illustrated embodiment 200, the series combination of $C_1$ and $C_2$ are structured to serve as a bootstrapped charge source for investing higher voltage charge into a second variable capacitor means $C_{vb}$. Diodes 212c-212d conduct the second priming current ($I_{prime2}$) into the second variable capacitor, $C_{vb}$. Diodes 213c-213d conduct the second purging current ($I_{purge2}$) out of capacitor $C_{vb}$ and through collecting capacitor $C_3$ (230b). Note that $I_{purge2}$ will also flow through collecting capacitor $C_2$ (220b). When $V_2 < V_{cb} < V_3$, then both of diode sets 212c-212d and 213c-213d will be reverse biased. Invested charge, $Q_{vb}$ will be temporarily trapped in variable capacitor means $C_{vb}$. It is during this latter time that the invested charge, $Q_{vb}$ rides up a potential energy slope to acquire its increased amount of energy. Energy source 250b provides that increasing energy via coupling 250d. The coupled energy 250d may be in dynamic mechanical form, in dynamic thermal form and/or in other form as may be appropriate. The first and second energy sources, 250a and 250b do not have to be synchronized to one another. Either one can be quiescent while the other provides input energy, or both can be active at the same time.

Transfer of initial charge into capacitors $C_1$, $C_2$, and $C_3$ may be carried out with the aid of dual-armature switch 204 and charge transference capacitor $C_0$. Alternatively or additionally, switches $Sw_3$ and $Sw_4$ may be temporarily closed to move the voltages across $C_3$ and the series combination of $C_1 + C_2$ toward equalization. Although mechanical switches are shown, these can be replaced with electronic switching means (e.g., MOSFET's). Similarly, although diodes are shown throughout for directing prime and purge currents, other electronic switching means (e.g., MOSFET's) may be used for these also. An advantage of using a charge transference capacitor such as $C_0$ is that the energy storage means (rechargeable battery 210a or another such means) can be protected from coupling directly across failed circuit sections. For example, if the dielectric layer of one of $C_2$ and $C_3$ breaks down, such that the failed capacitor presents a short circuit, switch 204 may be commanded by computer 202 to bypass the coupling of charge transference capacitor $C_0$ across the shorted-out one of $C_2$ and $C_3$. The non-failed one of $C_2$ and $C_3$ may continue to be used as a profit collecting capacitance means. It is to be understood that many of copies of the circuitry to the right of $C_0$ and switch 204 may be provided and simultaneously used (where each such copy has a basic prime-and-purge section like 225) and that charge transference capacitor $C_0$ may be used in combination with an expanded version of transfer switch 204 to convey initial or refresh charge to each of those copies (not shown) and to convey a corresponding profit charge back to the main lender, namely, rechargeable battery 210a and/or another such means (e.g., a super-capacitor). If any one of the copies fails due to dielectric breakdown or other problems, computer 202 may be programmed to detect the failure and to command the expanded version of switch 204 to bypass the coupling of charge transference capacitor $C_0$ across the failed ones of those copies.

Figure 2C:
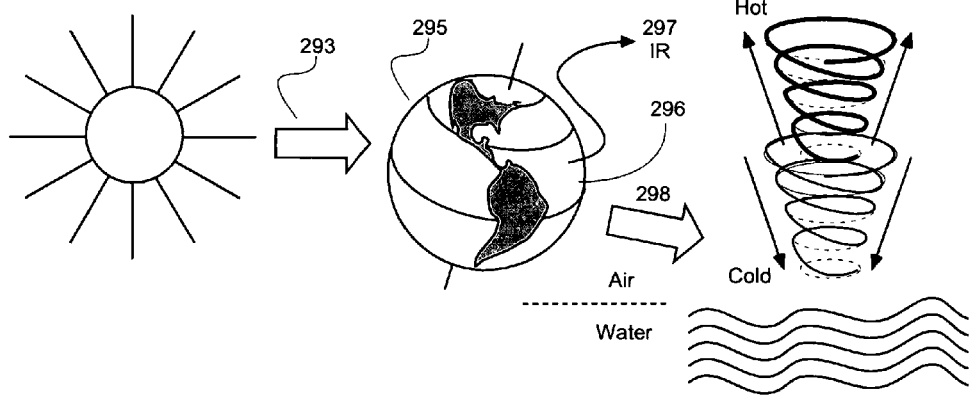
FIG. 2C is a schematic view of the global environment and ways in which sun-sourced energies can arrive and depart from the planet.
Figure 2B:
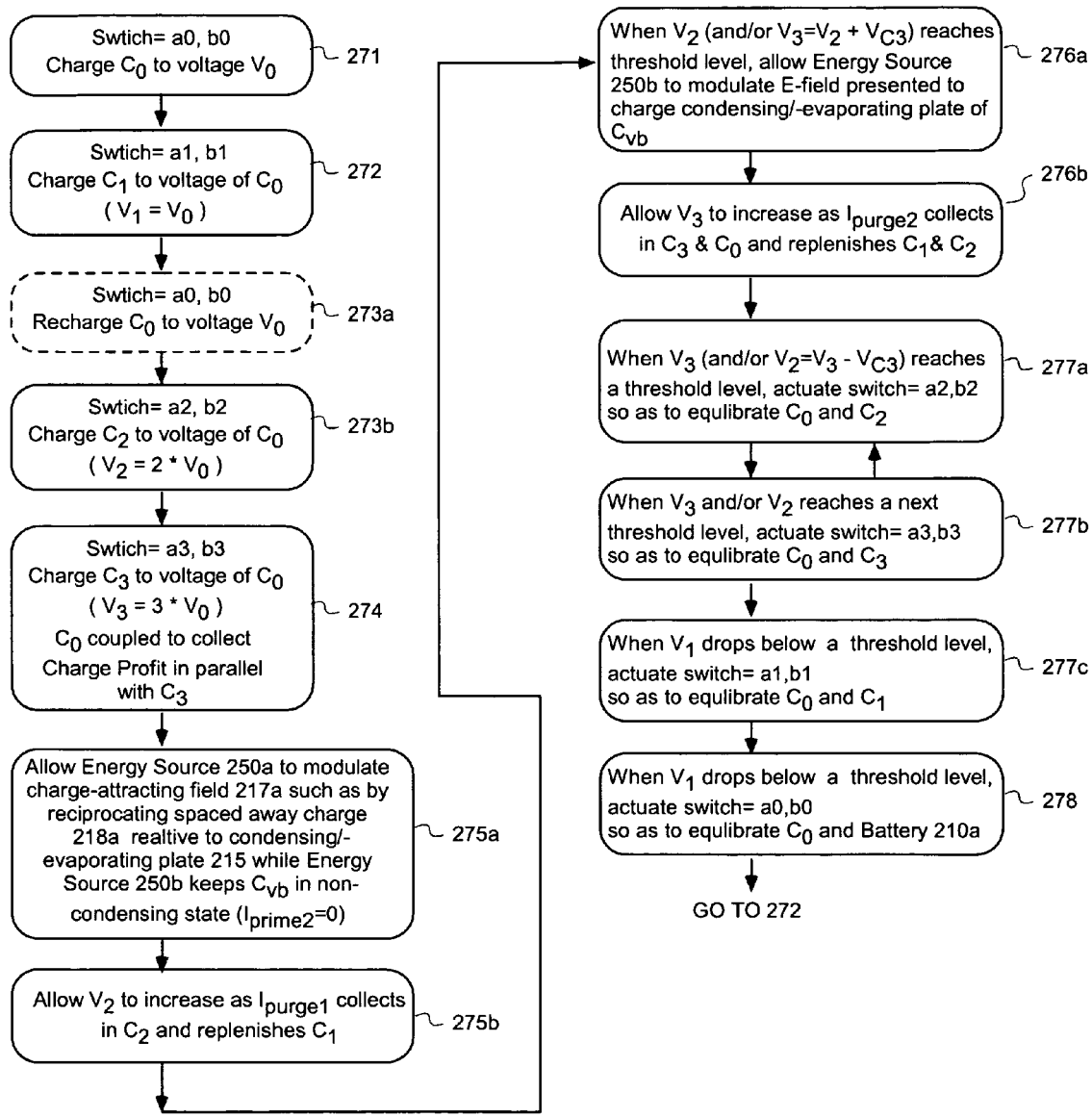
FIG. 2B is a flow chart of one method of operating the CiPR system of FIG. 2A.

Referring to FIG. 2B, an example of one method 270 for operating switch 204 is shown. At step 271, the top and bottom armatures make respective contacts with nodes $a_0$ and $b_0$ to thereby pick up charge from voltage source 210a (e.g., a rechargeable battery of voltage level $V_0$) and store it in transference capacitor $C_0$. It is assumed that the capacitance of $C_0$ is much greater than that of $C_1$, $C_2$, $C_3$, $C_{va}$ and $C_{vb}$. At step 272, the top and bottom armatures swing into contact with nodes $a_1$ and $b_1$, thereby dumping charge into $C_1$ and setting $V_1 = V_0$. At step 273a, the armatures optionally swing back to $a_0$, $b_0$ so as to fully equalize the voltage across $C_0$ with the $V_0$ voltage. At step 273b, the armatures swing into contact with nodes $a_2$, $b_2$, thereby dumping charge into $C_2$ and setting $V_2$ equal to about 2 times $V_0$.

Step 273a may be repeated again before step 274. At step 274, the armatures swing into contact with nodes $a_3$, $b_3$, thereby dumping charge into $C_3$ and setting $V_3$ equal to about 3 times $V_0$. The armatures may be kept in contact with nodes $a_3$, $b_3$, thereby leaving $C_0$ in parallel with $C_3$. In one embodiment, $C_3$ may be dispensed with and $C_0$ is allowed to temporarily define the profit collecting capacitance across $a_3$, $b_3$.

At step 275a, energy source 250a modulates the attracting force 217a to thereby pump charge ($Q_{va}$) out through diode 212c/213a. At step 275b, voltage $V_2$ increases as profit charge accumulates in capacitor 220b ($C_2$). At step 276a, $V_2$ reaches a predetermined level greater than its initial level and energy source 250b is activated so that it starts pumping charge up diode 212e/213c. The produced purge current, $I_{purge2}$ passes in series through $C_3$ (plus $C_0$ in parallel), $C_2$, $C_1$, thus replenishing $C_1$, $C_2$ while producing profit charge in $C_3$. At step 276b, voltage $V_3$ increases as profit charge accumulates in capacitor 230b ($C_3$, $C_0$). At step 277a, $V_3$ reaches a predetermined level greater than its initial level and switch 204 is moved into position $a_2$, $b_2$. This moves $C_0$ into parallel connection with $C_2$ thus equilibrating their respective voltages. Step 277b is optional. At step 277c, $C_1$ will have lent out or lost (through undesirable leakage) charge so that $V_1$ drops below a predefined threshold. Switch 204 is moved into position $a_1$, $b_1$. This moves $C_0$ into parallel connection with $C_1$ thus equilibrating their respective voltages. At step 278, switch 204 is moved into position $a_0$, $b_0$. This moves $C_0$ into parallel connection with the main lender, namely, rechargeable battery 210a. The profit accumulated in $C_0$ is dumped into battery 210a. This is just an example. Many variations on theme are possible.

Referring to FIG. 2C, a global view is taken of our planetary system 290. Radiant solar energy 293 leaves the sun and a small portion strikes the daylight side 295 of the Earth. The dayside ocean waters (large specific heat) tend to absorb much of that dayside impinging radiance. As that water mass rotates to the nightside 296, some of the absorbed energy radiates out diffusively as infrared energy (IR) 297 to the outer reaches of the solar system and beyond. Some is retained by the specific heat of the water. This of course, is a simplified explanation. Some impinging energy 293 gets temporarily stored on Earth as chemically bound energy (e.g., biomass and fossil fuels). Path 298 points to a closer look at what happens at the air water interface. Near the equatorial regions, the air tends to be relatively warm (roughly between 32° F. and 80° F., in other words, above about 0° C.) while the water mass is cooler (closer to the 0° C. freezing point for standard, 1 atmosphere pressure). Near the Polar regions, the air tends to be relatively cold (below 0° C.) while the water mass is relatively warmer (slightly above 0° C.) if not frozen. Spiraling air masses 298 tend to equilibrate the temperature disparities above water by carrying heat energy out of the oceanic waters and moving it up to the higher atmospheric layers. The oceans also have current flows that equalize heat disparities. Thus, it can be seen that global level amounts of energy are present at the air/water interfaces of the oceans. The more obvious of such energies is that of visible ocean waves which are driven for example by wind power. However, temperature disparities and dielectric constant disparities (and/or electrolytic concentration disparities, i.e. salinity) also represent tappable forms of energy.

Figure 3A:
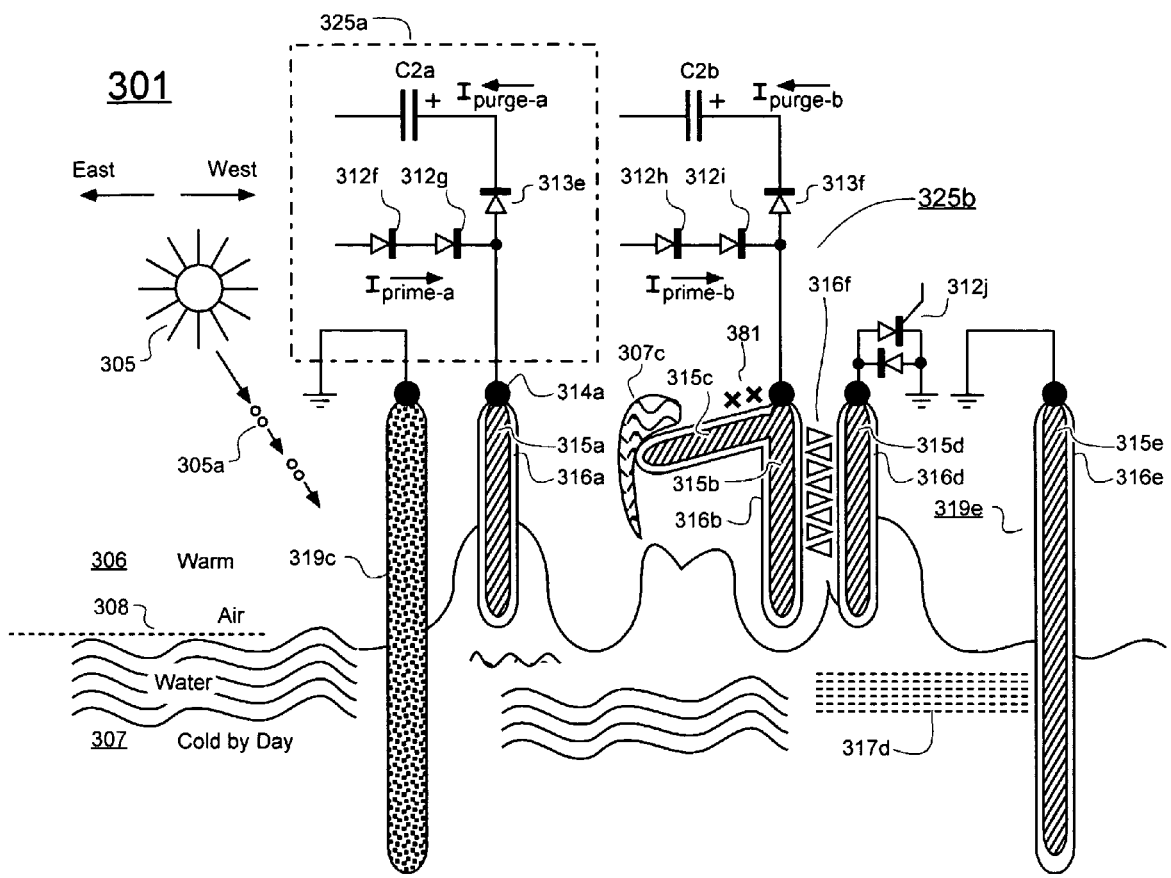
FIG. 3A is a schematic diagram of a CiPR system that is structured to convert various forms of energy that may be available near an ocean-to-air interface into electrical energy.

Referring to FIG. 3A, shown is a set of systems 301 by way of which ocean energies can be converted into electrical energy in accordance with the present disclosure. The Sun 305 sweeps the skies from East to West during the day, warming the upper ocean waters 307 and the air 306. Because deeper ocean waters do not receive as much solar energy, they tend to be cooler than the air near the water/air interface zone 308. (Also, due to coldness and weight compression, salt concentration tends to be less at around 500 meter depth.) A number of capacitor-forming electrodes (i.e., rigid or flexible) are disposed in accordance with the invention at the water/air interface zone 308. Carbon electrode 319c is relatively long such that it will normally be immersed in the seawater and will provide an electrical connection to ground. A first aluminum electrode 315a is provided, and it is well coated with an aluminum oxide layer 316a (e.g., by anodization) and/or with a hydrophobic coating such as Teflon™ or another fluoride treated surface material. A variable capacitor means is formed by electrodes 319c and 315a as ocean waves ride up and down along partially immersed electrode 315a. The intermittently interceding seawater may be viewed as a liquid electrolyte or as a high $\in_r$=80 liquid dielectric (high compared to the relative constant of $\in_r$=1 of interceding air between the capacitor plates) depending on salinity. In either case, wave motion causes the capacitance between electrodes 319c and 315a to modulate. A corrosion resistant contact 314a is made between the aluminum layer of electrode 315a and a CiPR circuit 325a (not fully shown). Priming current, $I_{prime-a}$ flows through diodes 312f-312g when the wave-modulated capacitor 319c-315a is in high capacitance mode. Purge current, $I_{purge-a}$ flows through diode 313e and $C_{2a}$ when wave-modulated capacitor 319c-315a switches to low capacitance mode. The Teflon™ or other hydrophobic coating on the outside of the dielectric layer 316a helps to keep negatively charged salt ions from sticking on as the water wave recedes. When a wave of water recedes, the effective plate area decreases if the wave is considered as a liquid conductive plate ($\Delta$A-CiPR approach). Alternatively, if the receding wave of water is considered as a liquid dielectric, then dielectric constant decreases ($\Delta\in$-CiPR) with the inrush of air in place of the water. The $\Delta\in$-CiPR analysis shows that this should work with fresh water waves, not just salt-water waves.

Note that the carbon electrode 319c can be of an activated graphite type and can define a crude supercapacitor with variable capacitance. Suppose however, that the carbon electrode 319c becomes covered with an electrically insulative film. Does that stop variable capacitance from occurring? No. The circuit becomes one of two series capacitors joined by a liquid electrolyte. Anodized and sealed aluminum electrode 315e can define an opposed capacitor plate in relation to anodized and sealed aluminum electrode 315a (or in relation to 315b as will be explained). It is not necessary for carbon electrode 319c to make good conductive contact with the seawater 307. Note that no moving mechanical parts are needed for realizing this first alternate form of variable capacitance, 315a-to-319c and or to 315b via the seawater 307 acting as an electrolytic connector or as an intermediary dielectric.

Figure 3B:
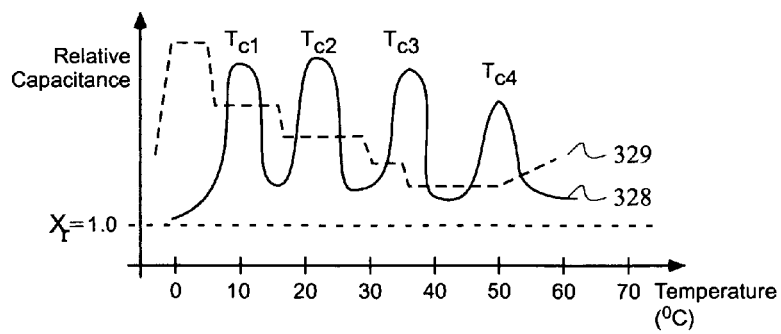
FIG. 3B graphs relative capacitance (with dielectric constant greater than unity) versus temperature, as may be practiced with use of one or more, temperature sensitive ferroelectric insulators.

Referring to CiPR circuit 325b, yet another form of variable capacitance is possible where the cool waves meet the warm air (or alternatively, where cooler air meets warmer water). Layer 316f represents a temperature-sensitive ferroelectric material (schematically denoted as opposed little triangles). The material of layer 316f can be made for example, to include Perovskite crystal particles such as barium titanate and/or Rochelle salts. In the case of $BaTiO_3$, the particles can be doped with dopants such as Sn or Sr so as to bring the Curie temperature, $T_c$ of the ferroelectric material down from its undoped 126° C. range (greater than that of boiling water) into the temperate range between 0° C. and say 30° C. (If a $T_c$ above about 126° C. is desired, Pb doping of $BaTiO_3$ may be used.) Layer 381 is made of a solar radiation absorbing material (e.g., black-dyed anodized aluminum oxide) that is thermal conductivity-wise connected to aluminum plates 315b and 315c. Plate 315c is angled toward the sky and/or Sun 305 while plate 315b is oriented to be intermittently struck by cool waves. Solar radiation should be coupled so as to heat the plates 315b and 315c to above the $T_c$ of the included ferroelectric material 316f and the impinging waves should be coupled to operatively cool it down to below the respective $T_c$. Particles in ferroelectric material 316f may be doped to have different, spaced apart Curie temperatures, $T_{c1}$-$T_{c4}$ as is roughly shown in first curve 328 of FIG. 3B so that capacitance goes up and down at various temperatures. A staircase temperature profile such as shown at 329 may be used instead. Temperature may be controlled in some instances so as to modulate fairly quickly across one or more of steep capacitance change ranges of temperature of the ferroelectric material. Silicon-controlled rectifier (SCR) 312j is optional and may be replaced by a short circuit. If used, the SCR is triggered on just before a cooling wave comes rolling in. In this way, a ferroelectric poling voltage and subsequent priming current are supplied on a just in time basis rather than constantly. Constant application of the priming voltage has the disadvantage that some of it may be wasted as leakage current through the dielectric of the variable capacitor if left on the variable capacitor for a long time. With just in time application, leakage can be reduced.

Referring to FIG. 3C, one possible use of the principles introduced in FIG. 3A is shown for beach environment 302. Wind blows waves of water toward shore. A set of oxide coated and spaced-apart aluminum plates are positioned roughly perpendicular to the wave fronts so that the seawater from the waves enters between some of the plates (not necessarily all) and then recedes, thereby defining a variable capacitance, $C_{var-c}$ that changes capacitance at least under one of ΔЄ-CiPR and ΔA-CiPR principles. Additionally, for one embodiment, the $C_{var-c}$ plates are coated with a dark colored, solar radiation absorbing material (i.e. dark dyed anodized aluminum) so that the plates become significantly hotter than the ambient air when the Sun (305') is out and the next water wave 307' has still not rolled in up the beach to touch and cool the plates. Transparent windshields (i.e. made of acrylic plastic or glass, not shown) may be placed about 3 sides of the structure (not the ocean facing side) and optionally over the top with air-holes optionally provided in them to allow wave-compressed air to escape, this reducing convection cooling into the air especially if the wind is blowing. When the next wave rolls in, it contacts and cools the preheated plates. Some of the $C_{var-c}$ plates have one or more temperature sensitive, ferroelectric materials interposed between the plates so that the ferroelectrics will cross through their respective one or more Curie points ($T_c$) as the plates heat and cool under the respective influences of the Sun (or ambient air) and then of the waves. This therefore defines a variable capacitance, $C_{var-c}$ that changes capacitance at least under the ΔT-CiPR principles. The plates may have selectively inflated and deflated floats coupled to them so that the plate structure can be buoyantly moved up and down the beach as the tide flows in and ebbs out. A spooled and winch-driven tether (not shown) may be coupled to the $C_{var-c}$ plate structure to keep it secured relative to a stationary wall or pole structure on the beach. CiPR circuitry 325c is merely representative of a charge-invest and profit-recovery system that may be operatively coupled to the plates of the $C_{var-c}$ plate structure. If desired, some or all $V_{1c}$ plates of $C_{1c}$ may be interspersed between ground plates of the $C_{var-c}$ plate structure. $V_{2c}$ is generally kept greater than $V_{1c}$. Capacitor $C_{2c}$ and/or another charge collector (i.e. chargeable battery) collects the profit charge generated when purge current flows out of the $C_{var-c}$ plate structure as the waves recede and the Sun heats the plates. While the $C_{var-c}$ plate structure is shown on beach front, it or other here-disclosed CiPR systems may be incorporated elsewhere, such as into over-topping wave energy devices such as the so-called Wave-Dragon from Japan or into OWC (oscillating water column) devices.

Referring to FIG. 3D, a more sophisticated beachfront system 303 is shown in cross section. The water waves that roll up the beach slope may be crudely modeled as sets of cylinders having respective large-radii and smaller-radii rolling adjacent to each other, where the backwards-rotating small-radii cylinders serve to some extent as roller bearings or lubricants for the more massive and predominant, forward-rotating and larger-radii cylinders. The incoming waves 307" may therefore be modeled as having a number of different energies, including but not limited to: a forward or shoreward kinetic energy ($½ \cdot m \cdot V_x^2$); a beach-slope climbing potential energy ($m \cdot g \cdot h_z$); a clockwise (as illustrated) or shoreward rotating mass energy ($½ \cdot Km \cdot \omega^2$); and a thermal energy which a function of temperature difference between the temperature of the water and the temperature of a relatively hotter or cooler object that the wave will strike and exchange heat energy with when it contacts that object (i.e. wave catcher 304A).

In one embodiment 303, a partially open, and elongated cylindrical object 304A (i.e. having an elongated length of about 4 feet or more, or 8 feet or more and a diameter, i.e. 1 foot, that varies with application) rests on the beach with the longitudinally-ended opening of its generally C-shaped cross section first facing the incoming wave 307". The wave receiving (and capturing) device 304A has an upwardly sloping entrance ramp 351 (i.e. 45°) along which the base of the wavefront climbs as the wave enters the mostly circular interior 356 of the device 304A. Not shown are air exhaust vents at the end caps of the elongated cylindrical object 304A as well as releaseably latched, side slide doors provided at those end caps to buoyantly float up and open when their latches (not shown) are later released, thus later allowing the captured wave water to flow out, and further arranged to slide down and shut under the action of gravity in preparation for temporarily capturing the next wave. Keeping our focus on the spirally-wise in-tumbling wave 307", part of its mass should follow the spiral path shown at 355, first striking the upper interior part of the C-shaped cross section of object 304A and then swirling down to encounter loopback ramp 354. The effect of the loopback ramp 354 is to redirect the rotational kinetic energy of the wave into more of a linear force vector directed in the x-direction. In other words, part of the rotational energy of the wave is rectified into a linearly-directed force energy. The C-shaped wave capturer 304A sits within a sand-sled (see FIG. 3E) which is urged shoreward (in the +X-direction) by the impact of the incoming wave. A spooled tether (not shown, but attached to the sled at one end and a stationary shore structure at the other) is winched tighter into shore as the sled slides slightly up the beach slope. Then, later as the surrounding water (that not captured by 304A) rushes back out, seaward, the weight of the water-capturing sled and the force of the back flowing remainder water are used to work an air piston (not shown) that is also attached to the tether and/or to work a linear electric generator. Then, the sled-captured water is released via the end cap slide doors. Thus the temporarily captured mass of the wave is used to perform useful work by moving against an opposing force (i.e. to thereby create compressed and/or rarified air and/or electrical energy at the other end of the sled tether).

Aside from the linear shoreward force that is imparted to the encompassing sled (FIG. 3E) of the wave-struck catcher 304A, some of the incoming energy causes the catcher 304A to itself rotate or roll uphill along the beach slope. The weight of the roll is absorbed by the circular outer surface of the catcher's partially-cylindrical shape, where this outer surface is pressed between the beach sand or other support and the weight of water above it. In one embodiment, a cam means on its surrounding sand sled (see FIG. 3E, cam not shown) limits the uphill catcher to assuming the 90° rotated state shown (not to scale) at 304B. During the rotation, the water collected at the bottom of the 90° rotated C-shape will have progressively pressed against parts of the C-shaped shell as the C-shaped wave capturer rolled uphill against a supporting base (e.g., sand) from state 304A to state 304B. The rotating water mass inside the C-shaped shell will also have transferred heat energy in one direction or the other, depending on which mass initially had the higher temperature, either the wave 307" or the C-shaped wave capturer 304A. In the illustrated embodiment, it is assumed that it is summer time, the sun is out, and the C-shaped wave capturer 304A will have been heated by solar radiation to above-ocean temperature before the wave hits. To this effect, a dark colored (e.g., black) solar absorbing coating material 353 (represented by X's) will have been layered on the outer C-shaped shell of the wave-catcher 304A. At least in some places, transparent, thermal insulating material (i.e. sulfur bubbled glass) will be layered on top of the solar absorbing coating (X's) so as to reduce the amount of absorbed heat energy that is convectively leaked back directly to the atmosphere. By way of example, an acrylic plate is shown at 352 substantially encapsulating the solar absorbing coating (X's) in the V-shaped recess of the ramp and C-shape so that solar energy absorbed there does not immediately escape to the ambient, especially on windy days. Thermal escape routes are provided however, as will be seen, in the interior of the C-shaped wave capturer 304A so that when the cool wave 307" rolls in, the wave will serve as a temporary heat sink. The temperature of the shell of the wave capturer 304A thus modulates up and down as the waves roll in and out while the sun provides heating radiation.

Figure 3E:
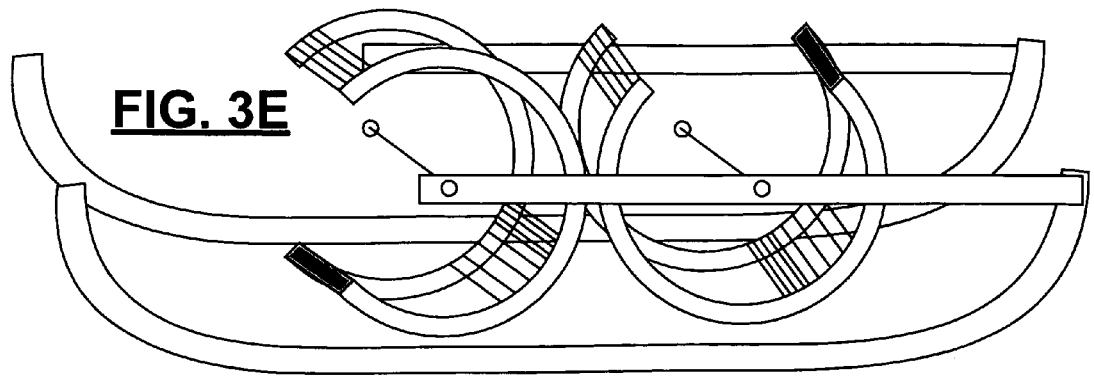
FIG. 3E is a perspective wire-frame schematic of a beach crawling sled.

Referring briefly to FIG. 3E, it is seen that in one embodiment a plurality of C-shaped wave capturers are rotatably mounted within a sled that slides along the beach sand as the waves move uphill and then down along the beach slope. The sled is towed deeper inshore with the aid of a spooled tether when the tide comes in and it is allowed to slide further out when the tide ebbs out. The tether drives an air piston and/or a linear electric generator. The tether is pulled by the weight of the water-filled wave capturers after the wave has rolled in. As the wave rushes out, side door latches are automatically released and the water in the wave capturers flows out from the end caps of the C-shaped cylinders. Numerous methods may be employed together with the C-shaped wave capturers 304A,B or with similarly structured devices for temporarily capturing the mass of the in-rolling waves and using the captured liquid mass to perform useful work. Instead of a sled, a rail-guided system may be used. Such a rail-guided system may be augmented with wind-catching sails mounted to it. The system may be deployed in fresh water lakes and/or by cold mountain streams rather than merely by the ocean. However, these variations are not the main focus of this disclosure. Instead, the focus is on what can be done with CiPR techniques to capture opportunistically available and trappable energies, wherever they may be found, and to steer the temporarily trapped energy(-ies) towards conversion into useful electrical energy.

Figure 3F:
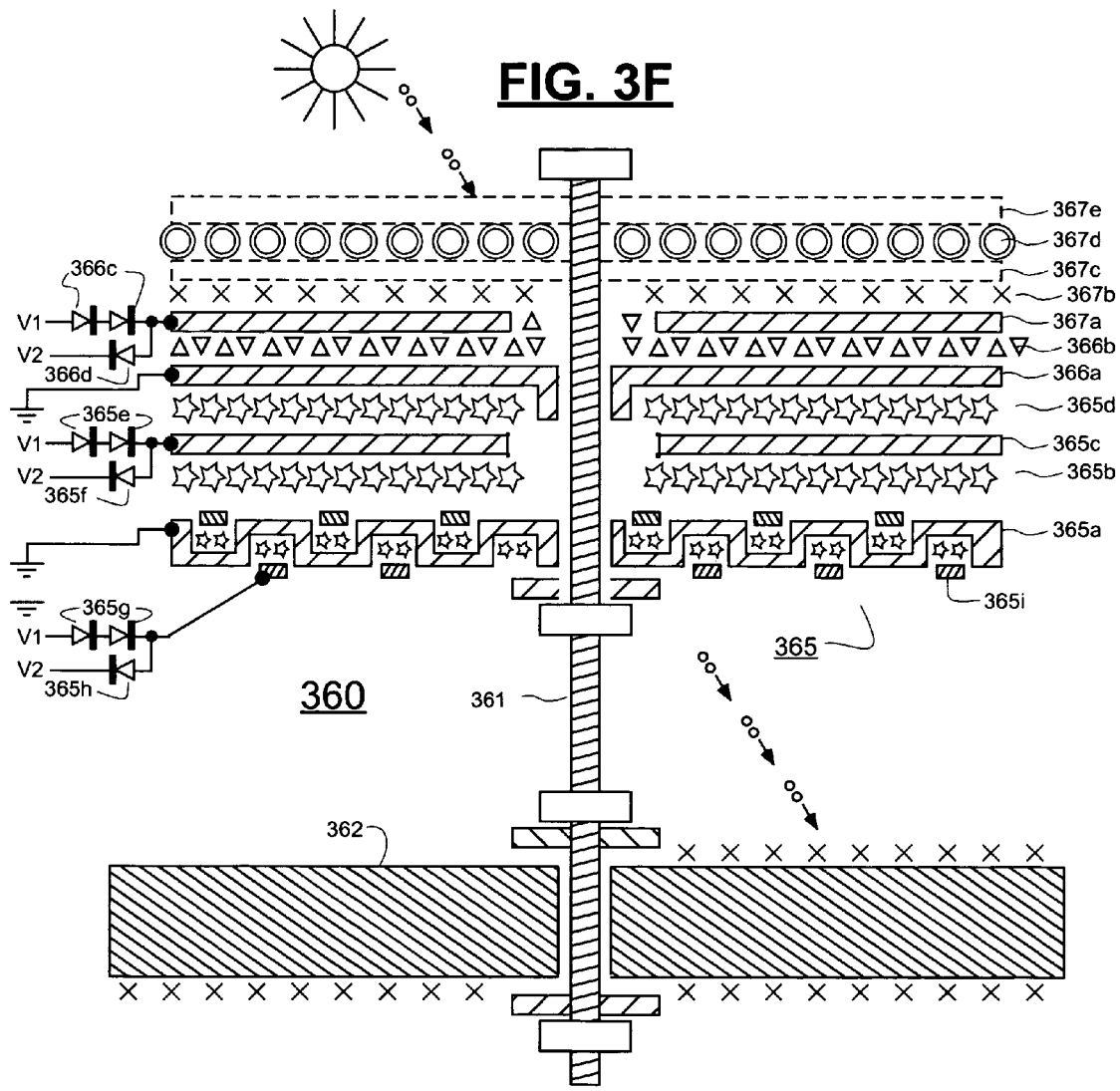
FIG. 3F is a cross sectional schematic view of a CiPR capacitor means that includes at least one of temperature modulated capacitor means, pressure modulated capacitor means, electrolyte modulated capacitor means, solar radiation absorbing means, and heat radiating means.

Referring briefly to FIG. 3F, a sectional portion 360 of the C-shaped cylinder is shown, including a radially extending and threaded rod 361 made of a thermally conductive metal (i.e., a copper core with an aluminum shell around it) coated with a corrosion resistive outer coating (e.g., aluminum oxide). The central axle of the cylinder is represented at 362 and is also made of a thermally conductive metal coated with a corrosion resistive outer coating. Such outer coating of the central axle should be dark colored to function as an optical absorber. By contrast, the interior walls of the round-bottomed canoe shape that defines the C-shaped cylindrical sections of the wave catchers (304B) are preferably optically reflective so that solar energy caught by the interior when the canoe opening points to the sun, is concentrated on, and absorbed by the central axle 362. In one embodiment, Fresnel type parabolic reflector surfaces (not shown) are defined on the interior of the circular bottom canoe shapes so that the mechanical strength of the circular shape is combined with the improved concentrating powers of the Fersnel style parabolic reflector. The central axle 362 of the rotatable canoe (the axle about which 304A rotates into position 304B) then conducts the heat energy that is focused onto it via radially extending rods such as 361 (only one shown), mostly to conductive metal layers 366*a* and 367*a* of the shell 365. A temperature sensitive ferroelectric coating 366*b* (i.e. doped BaTiO3) is interposed between conductive layers 366*a* and 367*a* to thereby define a temperature-varied variable capacitor means. When heat energy is transferred to the ferroelectric coating 366*b* so as to raise its temperature, the effective dielectric constant of coating 366*b* changes substantially. Later, when a water wave rolls in and passes through a radiator means such as that defined by the radially extending rods 361, heat energy is transferred away from the ferroelectric coating 366*b* and into the water, this lowering the temperature of the ferroelectric coating 366*b* so as to substantially change the effective dielectric constant of coating 366*b* again. (With appropriate priming voltages, some of the CiPR systems shown herein can inherently re-pole their temperature sensitive ferroelectric dielectrics once temperature drops substantially below $T_c$.) Diodes 366*c* represent the priming current path and diode 366*d* represents the purge current path for variable capacitor plate 367*a*. Plate 367*a* is additionally coated with a solar absorbing layer 367*b*. Layers 367*c*, 367*d* and 367*e* are made of transparent materials such as acrylic and glass and are disposed above the solar absorbing layer 367*b* so as to let solar radiation in while reducing the amount of heat lost to the ambient atmosphere by convection or otherwise. In one embodiment, transparent material layer 367*d* is composed of spaced-apart, hollow spheres or closed-end tubes (or open end long tubes) made of acrylic, iron-doped glass or another transparent material. If glass and sealed, the spheres/tubes may be filled with nitrogen gas so that a Si3N4 sealing layer develops internally. Transparent layers 367*c* and 367*e* are relatively planar (but curve with the shallow curvature of the C-shell) so as to define minimal area contact points with the pacers spheres 367*d*. A thin layer of adhesive is coated on the spheres/tubes during assembly to bind layers 367*c*-367*e* together. Nuts on threaded rod 361 are tightened to join transparent layers 367*c*-367*e* to the absorbent-coated ΔT-CiPR capacitor 366*a*-367*a*. As a result of this arrangement, the solar radiation that impinges on absorbing layer 367*b* is temporarily trapped to some extent as heat energy that warms plate layer 367*a* and thereby heats the ferroelectric coating layer 366*b*.

Conductive metal plate 365*c* is movably sandwiched between resilient layers 365*b* and 365*d*. The resilient layers 365*b* and 365*d* may be composed of a dielectric material such as Neoprene and/or another elastic material. When a movable inner face plate 365*a* is compressed against outer layers such as 366*a*, it compressively reduces the thickness of resilient layers 365*b* and 365*d*, thereby bringing the surface areas of plate layer 365*c* closer to the counterfacing surfaces of plate layers 366a and 365a and thereby temporarily increasing capacitance. Layers 366a and 365a are electrically conductive and coupled to ground. Movable plate layer 365c is coupled to priming diodes 365e and purge diode 365f.

In the illustrated embodiment, the reciprocally movable inner face plate 365a has a grooved structure that allows for further CiPR plates 365i to be resiliently or fixedly mounted in the grooves and spaced from the face plate 365a by a resilient and/or ferroelectric or other dielectric material. One of the in-groove CiPR plates is shown coupled to the $V_1$ priming source by diodes 365g and coupled to the $V_2$ purge destination by diode 365h. When saline water waves enter the C-shell, the saline water acts as an electrolytic solution providing bridging between the dielectrically coated (not shown) front surfaces of plate members 365i to the dielectrically coated (not shown) front surfaces of face plate 365a, thereby increasing capacitive coupling between members 365i and plate 365a. When the water moves away and is replaced by air (a fluid of lower dielectric constant), capacitance decreases. If the dielectric material sandwiched between members 365i and plate 365a is resilient and/or defines a temperature sensitive ferroelectric, then the pressure and temperature of moving by water wave will affect capacitance also on a ΔP-CiPR basis and/or ΔT-CiPR basis.

It is seen from the example of FIG. 3F that numerous ones of the ΔT-CiPR, ΔP-CiPR, Δ∈-CiPR and ΔA-CiPR mechanisms can be operating substantially on a simultaneous and cooperative basis while sharing common structural parts such as common ground plates (capacitor electrodes) and heat conduction paths. The CiPR endowed tubular structures do not have to have their longitudinal axes oriented orthogonally relative to the beach's up slope. The slide-door bearing end caps (not shown) can be replaced with wire meshes (to block seaweed and other debris) and the tubular structures can be then oriented with their longitudinal axes parallel to the beach's up slope, or oriented at a slightly greater up slope than the beach's up slope. Waves may then enter the meshed opening of the tubes and rise for a given distance up a slope within the tubes while at the same time modulating the ΔT-CiPR, ΔP-CiPR, Δ∈-CiPR and ΔA-CiPR mechanisms of each tube. The tubes can have their skyward facing tops enclosed by acrylic or other transparent tops so as to prevent rapid loss of radiantly collected heat energy (solar energy) back to the ambient air. The main point is that a fluid of temperature(s) different from the ambient temperature flows into the tube in pulsed instances so as to move through the CiPR endowed tubular structure(s) and to thereby modulate one or more of the ΔT-CiPR, ΔP-CiPR, Δ∈-CiPR and ΔA-CiPR mechanisms integrated in the tube. The fluid could be liquid or gaseous or both. The fluid could be fresh water, or salt water or another type of electrolytic and/or high-dielectric constant material that is clear or opaque. This concept will be re-visited when rooftop structures are discussed below.

While FIG. 3F is suggestive of a relatively rigid CiPR structure that has metal plate layers, screws, etc. defining its tubular structure, the invention is not so limited. It is within the contemplation of the disclosure to provide sandwiched flexible conductive and dielectric layers. For example, on top of metal ground plate 366a (e.g., aluminum), a layer of ferroelectric-containing paint (a dielectric) can be electrostatically sprayed on such that essentially complete coverage of the metal surface is assured by electrostatic attraction of the charged paint droplets to the grounded plate 366a. (Other deposition methods could be used instead.) The ferroelectric-containing paint layer (not shown) may include a heat expandable binder that swells in thickness when exposed to temperatures above a predefined norm (e.g., above room temperature). Thus the dielectric-defining first paint layer (or other deposited and flexible dielectric layer) can function simultaneously as one whose ferroelectric properties change with temperature and whose thickness changes with temperature. Generally, dielectric constant decreases with increased temperature and layer thickness increases with increased temperature so that these mechanisms work cooperatively and in tandem to alter capacitance more quickly. Increased thickness of the dielectric layer can help to raise its breakdown voltage so that, as capacitance decreases and the voltage of the temporarily trapped priming charge increases, the breakdown voltage of the variable charge storing means (e.g., variable capacitor) also increases.

On top of the first, painted-on or otherwise deposited dielectric layer (not shown), and after the first one dries, there is deposited by spraying on or otherwise, an electrically conductive paint layer (not shown). This electrically conductive paint layer extends to and electrically couples with a metal wire (not shown) that connects to the $V_1/V_2$ plate 367a. Various types of electrically conductive paints are known in the art and are often used to provide electrostatic shielding (or EMI protection) to plastic housings of electronic components. The more expensive ones use silver as a conductive metal filler. Less expensive ones use conductive polymers and/or nickel and/or graphite or other carbon blended into the paint binder. Any such technology or an alternate that renders this second flexible layer electrically conductive is acceptable (including use of carbon nanofibers and/or use of metal fibers), although those that reduce cost are preferable of course. After the electrically conductive paint layer (not shown) dries, it is temporarily grounded and a next layer of ferroelectric-containing paint (a next dielectric layer) is electrostatically sprayed on or otherwise deposited so as to assure complete electrical insulation of the underlying conductive layer. The next electrically conductive paint layer on top of this extends to and electrically couples with a metal wire (not shown) that connects to the ground plate 366a. Thus, thin flexible films of alternating dielectric and conductive characteristics can be layered one on the next to form a variable capacitor means whose charge storage capabilities change substantially in response to the fluctuating temperature of its environment. Such adhesive and flexible layers of alternating dielectric and conductive characteristics can be layered onto any structure including interior and/or exterior walls of large structures such as buildings, bridges, boats, etc. and they can then be used to produce electrical energy from the fluctuating temperatures of such environments. It is to be understood that the specific Curie transition temperatures (e.g., $T_c$'s) of the utilized dielectric materials will be picked in accordance with the expected temperature swings of the corresponding structure and environment. Thus in an air-conditioned and/or heated office building, the temperature swing may be dictated by the tightness of the thermostat control system whereas for a bridge (which must be painted anyway with electrically conductive paint to prevent corrosion), the temperature swing will be dictated mostly by natural weather variations. Bands of ΔT-CiPR capacitors can be painted on or attached to buoys such as those described below to take advantage of the oscillating temperatures of the banded regions as those regions are subjected to fluids of different temperatures (e.g., air and water). ΔT-CiPR capacitors may be painted onto over-topping wave energy devices such as the known Water Dragon (Japan).

There are many places other than a beachfront or out in the open sea where pulsed fluid flow(s) of differing temperatures may be found or made to occur. Examples include, but are not limited to: (a) high pressure fluid output from out-of-phase mechanical compressors such as those used to compress refrigeration fluid through heat exchange coils (condensers) and then into expansion orifices (refrigerant throttles); (b) gas effluents from low temperature furnaces (e.g., home or office water and air heaters); (c) radiator fluid, such as that pumped from the top of an automobile engine and then dropped through radiator pipes; and (d) hot exhaust gases such as those emitted from the tail pipe of an automobile or from chimneys such as found at many factories. Because of the wide variety of possibilities, it will not be possible to cover all such options in detail in this disclosure. However, these are is seen to be within the contemplation of the invention. An embodiment of the compressor option and some of the around the home/office options will be further described, later below. Ultimately it will be seen that the capacitive types of charge condensing and decondensing structures can be viewed as part of a broader class of structures that alternatively or additionally condense and decondense magnetic flux flow and that both mechanisms can generate a current inducing EMF where the induced current flows through a profit charge collector as well as through a lent-charge recouper, thereby providing for recoupment of invested electricity as well as collection of a profit amount of new electricity. (See FIG. 9.)

For the moment, focus remains at the beach front as yet another shoreline system 380 is shown in FIG. 3G. The illustrated shoreline system 380 can provide desalinization as well as generating electrical energy. An upstanding, A-frame style structure is formed of a set of sun-facing solar collecting units or panels 381", 382-385 and another set of away-facing cooling units 391-394. A-frames may be stacked one behind the next to define a hinged, accordion style structure that expands and compresses with the flow and ebb of the beach attacking waves. Each sun-facing solar unit (i.e., 382) has a relatively transparent front face (i.e., 382f such as made of glass or acrylic and a surface treated to be hydrophobic. The back plate (i.e., 382g) includes a solar absorbing surface material (e.g., black-dyed anodized aluminum) with one or more of ΔT-CiPR, ΔP-CiPR, Δ∈-CiPR and ΔA-CiPR mechanisms incorporated in it. In a first state, the sun-facing solar unit is filled with a low-pressure, transparent fluid such as air and the sun (if out) heats the back plate (i.e., 382g) of the unit. (Methods by which the internal air can be rarified to a pressure below ambient atmospheric pressure will be detailed later.) The sides of the sun-facing solar unit are thermally insulating (e.g., made to include porous oxides). The relatively transparent front face (i.e., 382f) is made with a thermally insulating structure (e.g., hollow glass spheres/tubes disposed between substantially transparent plates such as shown at 367c-367e in FIG. 3F). Behind the back plate (i.e., 382g) there is also a thermally insulating layer. Thus the temperature of the solar absorbing back plate (i.e., 382g, for example made of aluminum and/or made to include magnesium) climbs above that of the ambient air when the sun-facing solar unit (i.e., 382) is filled with low pressure air and it approximately faces the sun. The air inside the sun-facing solar unit (i.e., 381") also heats to a supra-ambient temperature.

After a predefined amount of time and/or after a predetermined supra-ambient temperature is reached in the topmost and air-filled solar unit 381", cool seawater is pumped into that unit through valve 371a and through top opening 381c. The seawater (saline) may be sprayed from the top opening such that it mixes with the hot air escaping the top of top unit 381" by way of opening 381b and valve 371b. Valve 371a is closed at this time. The hot and moisturized air that escapes through the upper side opening 381b of unit 381" enters opaque box 391 at the top of the back portion of the A-frame. There the moisturized warm air begins to cool. Box 391 is conductively coupled thermally-wise to the waves passing under the lower portions of the A-frame. The temperature inside the back portion of the A-frame 380 decreases as the exhaust vapors zigzag down through successive units 391, 392, 393 and 394 to be vented out by way of valve 374e. By the time the vented air reaches the lower cool-off unit 394, some of the moisture acquired in heat-up unit 381" will have condensed against the wave-cooled and opaque walls of cool-off unit 394. (An internal heat exchange mesh may be used to enhance the cooling effect.) The output side of valve 374e may connect to air suction pump such as the wave-driven pump shown at 398. This is one way that low pressure air (substantially below 1 atmosphere) can be developed in the interior portions of the A-frame units 381", 382-385 and 391-394.

Another way that low pressure air can be created within the interior portions of the A-frame units 381", 382-385 and 391-394 is by first filling up the lower units with pumped water and then closing off the upper air vents (e.g., 371e) so that when most but not all of the water is dropped out through the bottom units, air trapped in the upper units will be decompressed. As is known in the art of desalinization, reduced air pressure enhances the evaporation rate of water from an adjacent saline supply.

When the up-pumped, cool seawater of the earlier mentioned step encounters the pre-heated, sun-facing aluminum (and/or other high specific heat metal and/or other material) plate of solar unit 381", the water cools off that pre-heated plate, thereby modulating the dielectric constant of a temperature-sensitive ferroelectric material coupled to that pre-heated plate. Alternatively or additionally the up-pumped, cool seawater may modulate the effective capacitive plate area and/or effective dielectric constant of ΔP-CiPR, Δ∈-CiPR and/or ΔA-CiPR mechanisms incorporated into that pre-heated plate.

Figure 7:
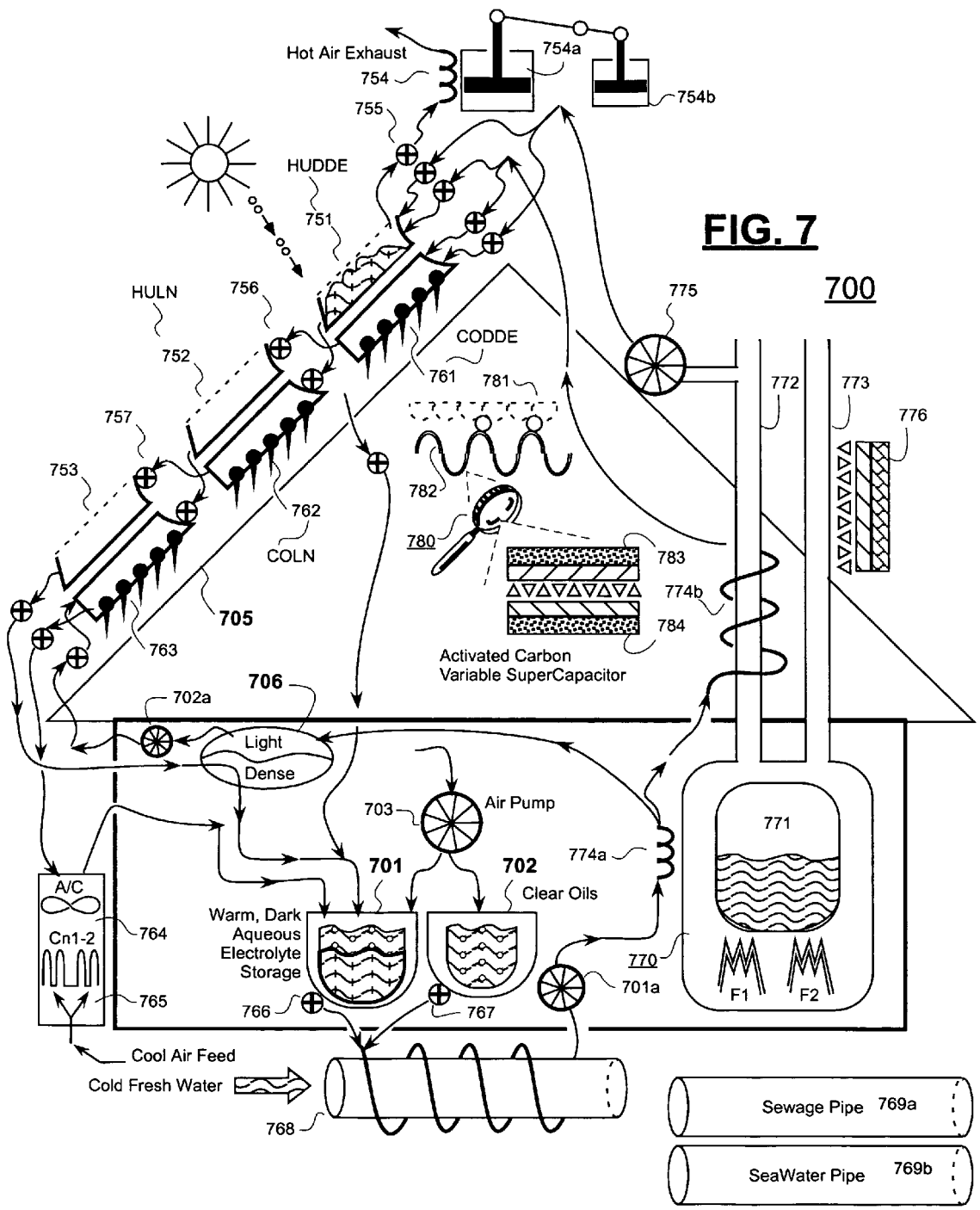
FIG. 7 shows a home/office based system in accordance with the invention that includes rooftop energy transforming means as well as a dual flame heater and dual chimney exhaust and dual radiator air conditioner.

While the upper solar unit 381" is being cooled off by the up-pumped seawater, the next lower solar unit, 382 remains filled with rarified air and its solar absorbent back plate 382g is heated by the incident solar radiation. (External optical reflectors may be used to increase the amount of solar radiation concentrated onto back plate 382g.) Then, a valve (not shown) between bottom opening 381d of unit 381" and a top opening 381c of unit 382 is opened so that the liquid held in unit 381" drops through the heated, low pressure air of unit 382. Valve 371a is opened at some point to allow the warm moisturized air to escape in zigzag, upflowing fashion through units 382 and 381" and then out through valve 371b. Top solar unit 381" next remains substantially liquid free and heats up again while the dropped liquid cools off the below second solar unit 382. Thus one unit is heating up while the adjacent one is cooling off. (A similar concept will be seen to be repeated when the slanted rooftop embodiment of FIG. 7 is detailed.) In a next step, up-pumped and then dropped seawater (or another liquid) fills units 381" and 383 while units 382 and 384 re-heat or continue to heat. Thus, a staggered sequence of up-pumps and water drops mixes the cooler saline water with pre-heated air so as to generate desalinated moisture and to modulate the temperatures in the solar-collecting units 381", 382-385. Partially desalinated water from a first A-frame may be cascaded into a next A-frame to provide successively increased levels of desalinization. In one embodiment, the cool-off units 391-395 mount to the underside of the sun-facing board of the A-frame while a light reflecting plate (optionally covered by a thermally insulative transparent cover) forms the other half of the A-frame. Then when the sun is at or near high noon, light is reflected from the reflective plate of one A-frame into the solar absorbing units 381", 382-385 of the next successive A-frame (not shown). A-frames may rest on rollers such as 395 and the apex angle of each A-frame may hingedly open and close as waves roll up the beach slope and then back out to sea. The most in-shore of the accordion-wise interconnected A-frames is tethered to an on-shore stationary post (not shown). A wave driven water pump such as 397 may be used to up-pump the water into the units.

Referring to FIG. 4A, an offshore energy system 400 in accordance with the invention is schematically shown in cross sectional perspective. Frusto-bottommed sphere 410 defines a central body part of a wave-crawling spider 405 having symmetrically distributed leg sections like 420 and 440. Exemplary embodiments have three 120° apart leg sections, or four 90° apart leg sections, or six 60° apart leg sections, or 8 symmetrically distributed leg sections, etc. Each leg section includes a lateral piston unit like 421 and 441 for absorbing lateral wave forces or motions. Each leg section further includes two vertical tubes like 422 and 424 for containerizing vertical pistons that absorb vertical or heaving wave forces or motions. The plural vertical tubes, i.e., 442 and 444 of each leg section, i.e. 441 are arranged non-radially relative to the central body sphere 410 so as to define a rotating blade shape relative to the central body sphere 410. In other words, a line drawn between the vertical axes of tubes 442 and 444 is not parallel to a radius ($R_{xy}$) drawn out from the central body sphere 410 to either of the axes (e.g., 424z). The central sphere 410 can have vertical down protruding, flat blades or opposingly twisted blades like 412 and 414 so that the central body sphere 410 is urged to rotate about its vertical axis oppositely to a rotation urged on the leg sections (420, 440) when a lateral water current sweeps past the buoy 405. Upper and rotatably-mounted support 411 links the leg sections together and rotates relative to the central body sphere 410.

An opening 413 at the frusto bottom of the central body sphere 410 lets out a cable that functions as a combined anchoring and electricity conducting cable 415 from a winch area (not explicitly shown) housed in the sphere, above its bottom opening 413. The electrical/anchor cable 415 provides electrical power and control signal coupling as well as physical coupling to a rotatable top half of a submerged cable joint unit 416. A bottom half portion 416b of the joint unit is independently rotatable of its top half 416a. Rotation of the central body sphere 410 does not twist the electrical/anchor cable 415 because the upper and lower halves of joint unit 416 can twist independently of each other. The schematically shown, bidirectional line 417 represents a bidirectionally conducting electrical cable that ties from the bottom of joint unit 416 to the bottom 418b of a next joint unit 418 within a farm (not all shown) of such joint units and optionally a corresponding farm of floating, but submergible spider buoys like 405. The upper and lower halves of each joint unit (e.g., 416) are detachably attached so that, in the case of extreme storm conditions, a given spider buoy 405 can be allowed to break free of the otherwise anchored farm and to float away for possible recovery at a later time via radio beacon locating. Alternating current (AC) transformers are formed across the independently rotatable upper and lower halves, 416a-416b, of each joint unit (e.g., 416) so that electrical energy can pass between the upper and lower halves (in either or both directions) even though the halves rotate relative to one another. The transferred AC signals (e.g., at 400 Hz) can include control signals passed back and forth between the illustrated spider buoy 405 and its submerged network farm (416, 418) via cables 415 and 417 for control of the behavior of the buoys (e.g., 405) and for collecting telemetry information gathered by the network of buoys (only one shown). The AC signals transferred through the joint units (e.g., 416, 418) can include invested input electrical power sent from the joint farm 416-418 into selectable ones of the spider buoys (405) in the farm. Additionally, the AC signals transferred through the joint units can include profit output power collected from selectable ones of the spider buoys (405) in the farm.

Although not all explicitly shown, each spider buoy (405) can include one or more energy storage means such as, but not limited to: rechargeable electrical batteries, supercapacitors, flywheels, compressed air tanks and decompressed air tanks (421, 441). Painted-on or other such flexible ΔT-CiPR capacitors such as elsewhere described herein may be applied in appropriate bands around buoy parts so as to capture ocean thermal energy (OTEC) from temperature change due to heaving or other wave motion. Each spider buoy (405) can opportunistically generate local energy as wave or other input energy opportunities present themselves, temporarily store all or an excess portion of the locally generated energy in its local energy storage means (e.g., decompressed air tanks 421, 441), and then output the locally stored energy to the joints network 416-418 at a later time as commanded by control signals sent via the joints network 416-418 and/or by other means (e.g., wireless control signals).

Figure 4B:
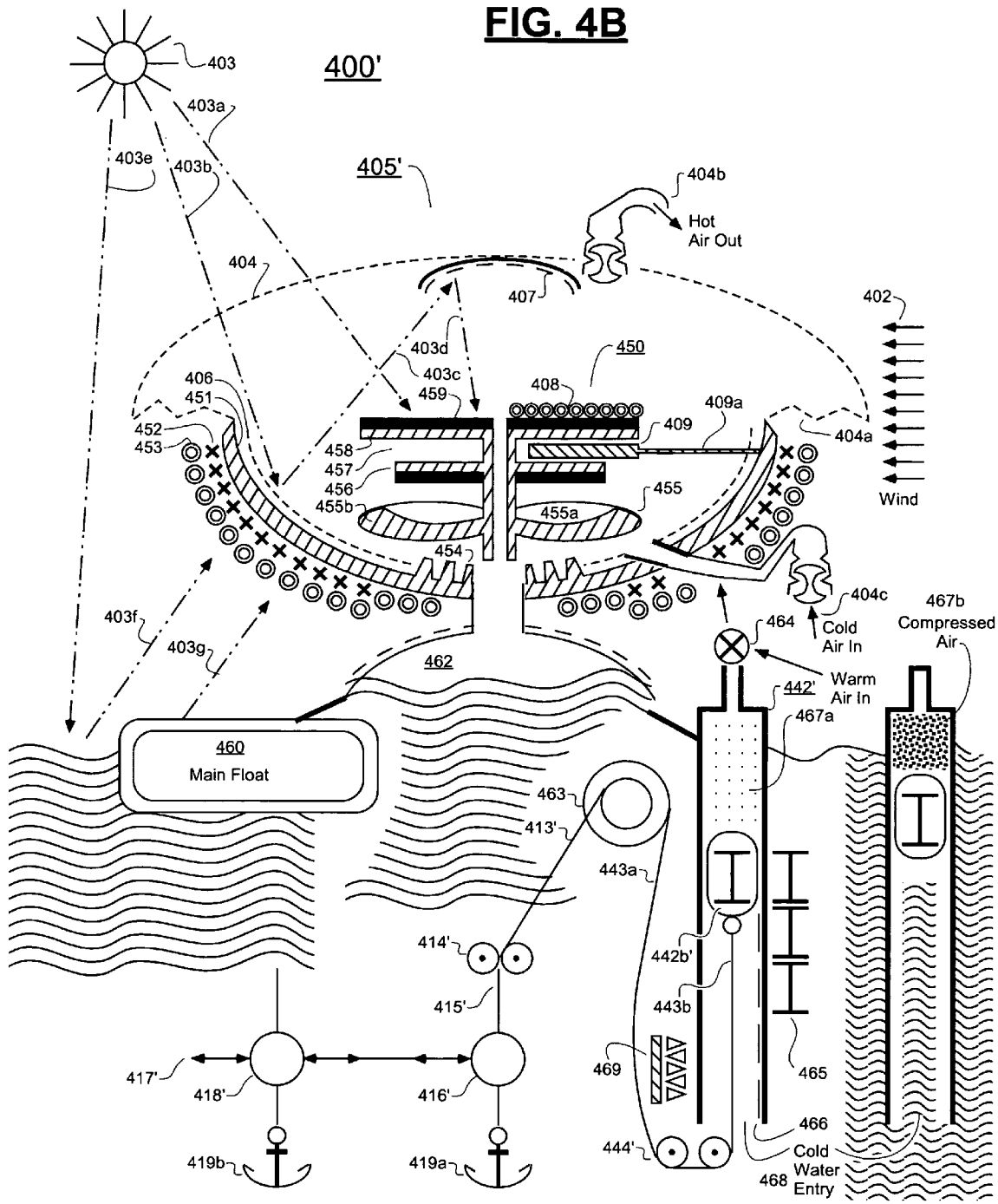
FIG. 4B is a cross sectional schematic side view of a buoy system in accordance with the invention.
Figure 4C:
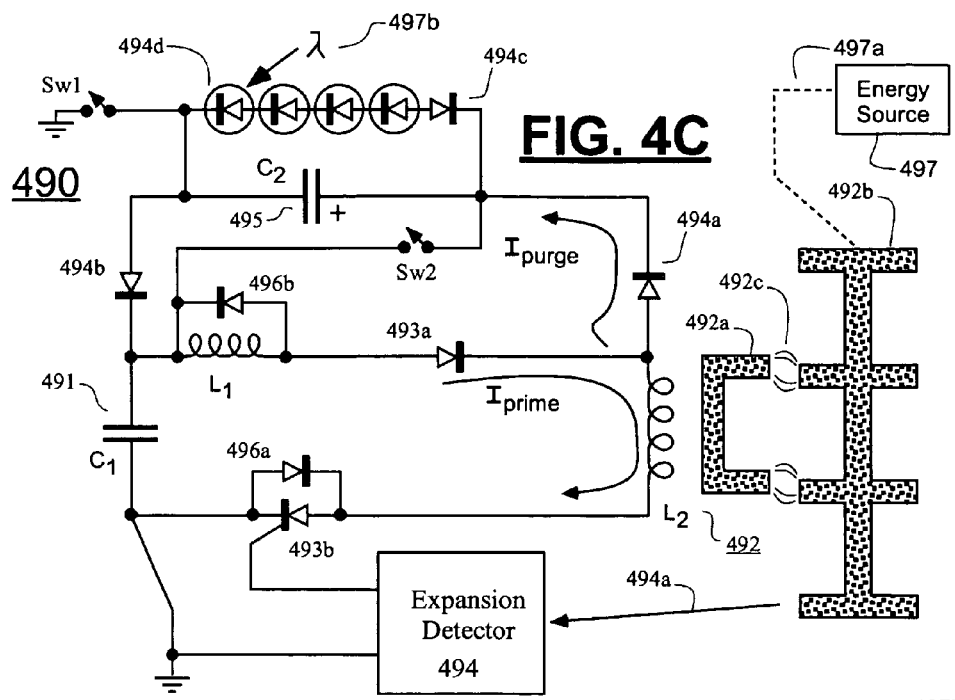
FIG. 4C shows an inductive type of energy investment and profit recovery system in accordance with the invention.
Figure 4D:
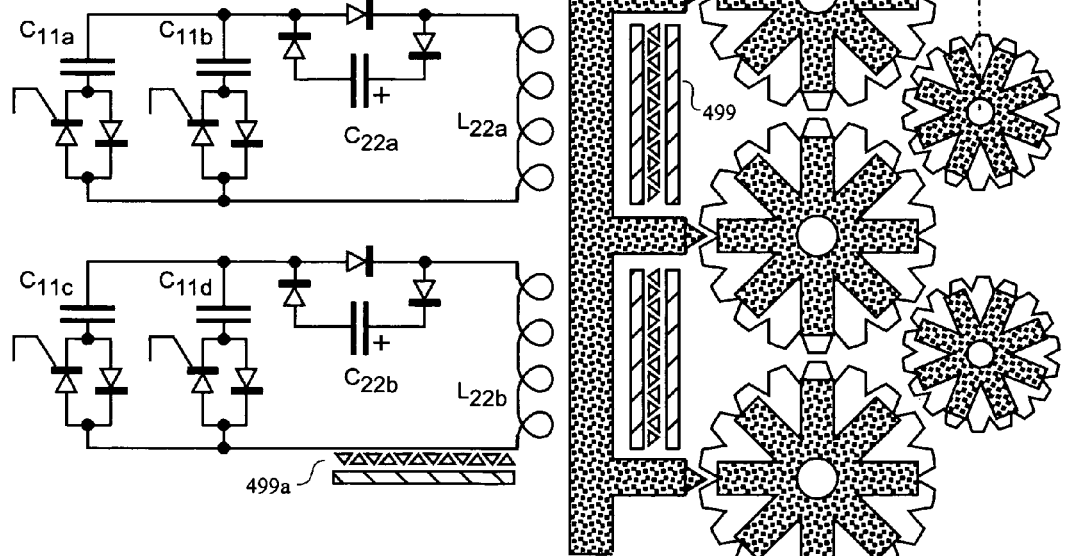
FIG. 4D shows an integrated inductive and capacitive type of energy investment and profit recovery system in accordance with the invention.

Some conventionally-proposed buoy systems are designed to expect power flow in only one direction, namely, only from a heaving buoy to a submerged, power-collecting network. In contrast, the illustrated system 400 of spider buoys (405) may be structured to opportunistically pump investment energy into selectable ones of the buoys before expecting to receive a greater-than-unity, return on investment at a later time. One of the uses of the investment input power is to operate the winches housed in the central spheres 410 of the spider buoys (405) so as to partially or fully submerge selectable ones of the spiders during severe weather conditions. Selectable ones of the spiders are afterwards let up closer to the surface or all the way up as surface weather conditions become more tolerable. Another use of the investment input power is to opportunistically generate magnetic fields about float pistons 422a, 424b within the vertical tubes. Heaving wave motion may be used to expand magnetic gaps across which the created magnetic fields span. This gap expanding or yoke-continuity breaking operation produces profit electrical energy. Such operation will be detailed more when FIGS. 4B and 4C are described. FIG. 4D shows a yoke-continuity breaking embodiment.

The bottom half 416b, 418b of each joint unit (e.g., 416, 418) tethers to a corresponding anchor means like the one shown schematically at 419 or to other submerged and relatively stationary masses (e.g., large rock formations, if any, found near the seabed). Heaving or other wave motion propels the central buoy sphere 410 reciprocally closer to and away from the anchor means 419. Resulting tension on the electrical/anchor cable 415 is translated into other forms of energy within the spider buoy 405 as shall be detailed shortly below. During a wave trough, when the sphere 410 drops closer to the anchor means 419 and tension slacken on its tie-down cable 415 (or on 415b of the unshown other spider), the winch motor in the sphere-housed winch room may be actuated to tighten the cable tension and/or shorten the cable length so as to maintain a specified average tension. Then, as the next wave peak arrives, the cable 415 is let out again, under a predetermined amount of relatively high tension and the resulting work (force times distance) is translated into useful forms of energy within the spider buoy (405).

Cable 443a/b represents one of a plurality of combined pulley and electrical cables that connect from their respective piston floats (e.g., 442b) down through the respective vertical tubes (e.g., 442) and to the central sphere 410. Within the central sphere 410, a mechanical transmission means (not shown) is provided to selectively couple heaving wave tension or other available mechanical energy to selectable ones of the piston floats to pull them further down in their respective vertical tubes (e.g., 442), thereby creating an enlarged air volume in the tube above the piston float and a decreased water volume in the tube, the decreased water volume being below the piston float. The decreased water volume in the tube may be viewed as an inverted water column since upwardly-urging water pressure against the float increases as the piston float (e.g., 442b) is pulled further down below the average water line. The so-formed, inverted water column may serve as a temporary energy storage means.

Depending on how the air above the pulled-down piston float is managed, different types of air pressure conditions (above or below ambient air pressure, above or below ambient air temperature) may form above the pulled-down piston float (e.g., 442b). In one mode, a valve (not shown) is selectively opened between the upper air area of the vertical tube (e.g., 442) and a decompressed air tank such as 441. As the piston float is pulled down by heaving wave power, some air is pumped out of the decompressed air tank 445 due to the enlargement of upper volume in the vertical tube. This can happen a number of times until the incrementally reduced mass of the further decompressed air tank 445 provides a substantial increase of buoyancy for the spider buoy 405. The reduced pressure in the decompressed air tank 445 can serve as a temporary energy storage means relative to ambient air pressure or relative to super-ambient air pressure stored in other, compressed air holding tanks of the spider buoy. An onboard and/or remote computer (not shown) may be used to control various valves and thereby determine when air should be allowed to flow from the ambient above the water surface or from a compressed air holding tank into the decompressed air tank 445 and whether the flow of air from one pressure zone to another should be used to generate electrical energy. One use of such controlled air flow is to selectively submerge the spider buoy (405) to a desired depth in light of existing weather conditions. Pistons in lateral tubes such as 421 and 441 may be used to generate additional pressurized and/or rarified air for coupling to selectable ones of compressed air holding and decompressed air tanks within the spider buoy 405.

Referring to FIG. 4B, a specific embodiment 400' of a spider buoy is schematically shown in greater detail. A transparent top dome 404 is provided in a central part or other of the spider for passing solar radiation (e.g., 403a) from the Sun 403. The dome 404 may be made of hydrophobically coated glass, acrylic, etc. A spherically shaped and generally opaque bottom support (e.g., made of an aluminum copper alloy) 451 is provided under the dome and has an inner reflective surface 406 that is covered by thermally insulative but transparent material (i.e. porous glass capped at its top surface with nonporous glass). The spherical shape gives the support 451 mechanical strength, but if desired, internal reflecting surfaces 406 may be polished Fresnel style in the interior surface of the spherical shape to define a parabolic type of reflecting means that focuses reflected radiation on a dome-top, small mirror 407. The dome-top mirror 407 redirects the once-reflected solar radiation 403c towards (403d) a radiation absorbing coating 459 provided on an upper surface of a rotatable fan structure 450. The radiation absorbing coating 459 is preferably covered with a transparent but thermally insulative layer 408 (e.g., hollow glass spheres/tubes or solid-capped porous glass) so as to reduce leakage of heat energy upwardly directly from the absorbing coating 459. Instead, coating 459 contacts a thermally conductive metal layer 458 (i.e., includes copper), which among other things, couples thermally to bottom surfaces 455b of plural fan blades 455 which each have thermally insulative upper surfaces 455a. Heat energy thus preferentially flows out from the bottom surfaces 455b of the fan blades 455 rather than from the top (408) of the rotatable fan structure 450.

Because reflector 406 is often not a perfect reflector, some of the incoming solar radiation 403b will be absorbed as heat by the aluminum support 451. Thermally insulative but transparent layer 461 reduces leakage of this built up heat (aluminum has a relatively high specific heat compared to copper for example) into the air within dome 404. The heat of the aluminum support 451 is allowed to leak out through radiator fins 454 under the fan blade bottoms 455b. Thus air in the region between fins 454 and blade bottoms 455b should be relatively hotter than ambient (assuming nothing else is bringing in a cooling breeze at the time) and this relatively hot air will tend to flow up through the fan blades 455 so as to escape out of a hot air vent 404b at the top of the dome. The vent 404b includes a gravity-hung, buoyant valve piece. If the spider buoy (405') submerges, vent 404b closes up. Hot air from inside dome lifts the hanging plug to escape and let cooler air in. Cooler air may alternatively or additionally enter via lower vent 404c which is closer to the cool water surface than is upper vent 404b.

The outside of the spherical aluminum shell 451 is coated with solar absorbing material (e.g., dark-dyed anodized aluminum) 452. This absorbing layer 452 is then covered by a thermally insulative but transparent layer 453 (e.g., hollow glass spheres and/or porous glass). Solar radiation 403e may reflect off the water surface and/or from other reflective surfaces (e.g., float-supported concentrator mirrors) to strike (403f) the thermally insulated absorbing layer 452. This absorbed radiation 403e further heats the aluminum shell 451 and the air within dome 404. Dome 404 has a pleated bellow area 404a which allows the dome top 404 to reciprocate relative to the lower shell 451. The dome top 404 may be shaped as a Frisbee™-style airfoil such that it rises and falls when gusts of wind 402 sweep by. The bellows action may be used to pump cool air in via lower vent 404c and to pump warmer air out of upper vent 404b, turning the fan structure 450 in the process.

Fan structure 450 includes a shape corresponding to a capital-T overstruck on a descended capital-T where the spacing 457 between the T-tops accommodates a stationary, ΔX-CiPR plate 409 on which the double-T fan structure 450 loosely hangs. Upwardly blowing air currents define an air bearing for urging the double-T fan structure 450 to rise slightly above T-top plate 456. The stationary, ΔX-CiPR plate 409 may be disk shaped with a hole in the middle and with radial support spokes 409a extending to shell 451. Alternating and radially extending, ground and $V_1/V_2$ capacitor strips are disposed onto both sides (top and bottom) of the stationary, ΔX-CiPR plate 409. Conductors that define countering, and radially extending, ground and $V_1/V_2$ capacitor strips are alternatingly (interdigitally) disposed on the inwardly facing surfaces of T-plates 456 and 458. Some form of dielectric material may be used to keep the capacitor strips of the facing stationary and rotatable plates 409, 456, 458 from shorting to each other. The counterfacing ground and $V_1/V_2$ capacitor strips define variable capacitors that change in capacitance as the double-T fan structure 450 rotates relative to the stationary plate 409 and/or bobs up and down. ΔX-CiPR energy is extracted via diodes or other switching means (not shown). The $V_1/V_2$ capacitor strips are understood to each have at least one diode coupled to them for conducting priming charge from a $V_1$ voltage level source (e.g., $C_1$ of FIG. 2A) to the strip and at least one diode coupled to them for conducting purged charge from the strip to a $V_2$ voltage level collector (e.g., $C_2$ of FIG. 2A). Capacitance may change not only as the double-T fan structure 450 rotates relative to plate 409, but also as the fan structure 450 reciprocates vertically between the double T-tops 456 and 458. As schematically shown in FIG. 4B, the bottom of plate 458 is coated with a solar absorbent. This solar absorbent is coated underneath with a thermally insulative transparent layer so that heat leakage to ambient is reduced by way of that surface and collected heat is instead mostly directed to the heat escape region between radiator fins 454 and fan blade bottoms 455b.

Formed below the heat escape region 454-455b is an oscillating water column (OWC) region 462. Heaving wave energy may pump air up through the top opening of the OWC region 462 to drive rotation and/or up and down reciprocation of the double-T fan structure 450. The weight of shell 451 and dome 404 is supported at least in part by a main float 460. The main float 460 may be of a hollow torroidal shape and may serve as a tank for containing decompressed air. The top surface of the main float 460 may be optically reflective so that solar radiation 403g is directed to the absorbing coating 452 of the shell above. Further hollow torroidal and/or spherical tanks may be included elsewhere as part of the spider buoy 405' for containing decompressed or compressed air or other compressible fluids.

Attached to the main float 460 and/or the shell of the OWC region 462 is a mechanical transmission unit 463. This mechanical transmission unit 463 provides either a discrete or continuous change of gearing ratio (mechanical advantage) between a first spool that takes up extension 413' of anchored cable 415' and a second spool that takes up extension 443b of a piston cable that drives float piston 442b' in vertical tube 442'. The gearing ratio of transmission unit 463 may be adjusted to provide a 2:1 translation ratio, for example, so that when a wave heave raises the main float 460 and transmission unit 463 by say 1 foot away from an anchored seafloor point (419a), the piston cable 443b' will correspondingly pull the vertical tube piston 442b' two feet down within vertical tube 442'. Rollers 414' center the bottom of the anchor cable extension 413' relative to the center of the spider buoy (405'). Rollers 444' center the bottom of the piston cable extension 443b relative to the center of its respective vertical tube 442'. The greater than unity mechanical translation provided by the mechanical transmission unit 463 allows long negative water columns to develop within the vertical tubes (442'). If air is pumped in above the pulled-down piston 442b', such pumped in air can increase system buoyancy.

A ferromagnetic cage 465 having a C-shaped, top view cross-section partially surrounds vertical tube 442'. Cage 465 is attached to the piston cable extension 443a outside of the tube such that cage 465 moves vertically up when piston 442b' moves down in the vertical tube 442' and vise versa. Thus the relative speed between cage 465 and piston 442b' can be double the speed of each one taken alone relative to the vertical tube 442'. The relative speed of each can be greater than wave rise and fall speed thanks to the greater than unity mechanical translation abilities of the mechanical transmission unit 463. Electro-magnetic coupling is provided between the opposingly moving cage 465 and piston 442b' so that when they pass in opposite directions, electrical energy can be generated. In a simple embodiment, the piston float 442b' includes a C-shaped core and winding within its water-tight interior while the cage 465 has opposed C-shaped magnetic core pieces with embedded permanent magnets such that, when flux from the embedded cage magnets modulates across the internal windings of the piston interior, electrical energy is generated. The piston cable extensions 443a-443b can include electrical wires for coupling the generated electrical energy to transmission unit 463. The transmission unit 463 can include further electrical coupling means for coupling the generated electrical energy to anchor cable 415'. Thus, electrical energy produced by the electromagnetic interaction between piston 442b' and cage 465 can be transmitted to the underwater grid network 416'-418'.

An important aspect of the counter-reciprocating piston 442b' and cage 465 pair is that they alternatingly move through fluid regions of substantially different temperatures (in the case of cage 465 moving into and out of lower ocean depths) and/or that they alternatingly move fluid bodies of substantially different temperatures (in the case of piston 442b') into contact with portions of the vertical tube 442'. The differing fluids in some instances (e.g., where one fluid is air and the other is salt water) can exhibit substantially different electrolytic and/or dielectric properties and/or substantially different specific heats and/or substantially different densities and corresponding weights or pressures. The interior of the vertical tube 442' can include variable charge storage means that responsively change in effective charge storage capabilities in response to the changing electrolytic/dielectric properties and/or changing temperatures and/or pressures of the alternatingly introduced fluids. Dashed lines 466 represent capacitor plate electrodes (which electrodes can be painted on or otherwise integrated with the vertical tube) with such properties (e.g., responsive to one or more of modulating temperature, modulating electrolytic surrounds and modulating pressures). Alternatively or additionally, the capacitor plate electrodes represented by dashed lines 466 may respond to alternatingly attracting and repelling electrical fields presented to them from one or both of the counter-reciprocating piston 442b' and cage 465 to the shell material of the vertical tube 442'. Alternatively or additionally, the capacitor plate electrodes represented by dashed lines 466 may be surrounded by magnetically-affected dielectric that responds to alternatingly stronger and weaker magnetic fields presented from one or both of the counter-reciprocating piston 442b' and cage 465 to the shell material of the vertical tube 442'.

Item 468 is representative of the cooler, higher-pressure sea or other water that enters the vertical tube 442' from its bottom or leaves therethrough as piston 442b' reciprocates up and down. The capacitor plate electrodes represented by dashed lines 466 may respond to the changing environment created by the inflowing and exhausted water 468 by correspondingly priming with investment current and then purging out the temporarily donated charge per CiPR principles described herein. Item 467a is representative of air or another gas that is sucked or allowed into the upper part of the vertical tube 442' as piston 442b' reciprocates downwardly. Item 467b is representative of air or another gas that is compressed within or expelled from the upper part of the vertical tube 442' as piston 442b' reciprocates upwardly. A set of computer-controllable valves, represented by 464 determine which gas source is used for inhalation into, or expulsion from upper tube interior region 467a/b. Air sucked into region 467a can be relatively warm air obtained from above the ocean surface or from within the solar-wise heated shell 404/451. Piston-driven inhalation and/or expulsion may be selectively directed by valves 464 so as to rotate fan structure 450. Piston-driven compression (467b) of inhaled warm air raises its temperature and pressure. As in the case with the lower water 468, CiPR type capacitor plate electrodes (not shown but corresponding to dashed lines 466) may be provided in the shell surrounding upper tube region 467a to respond to the changing environment created by the inflowing and exhausted air or other gas. Item 469 represents a temperature sensitive variable capacitor means that can be provided along or within the shell material of the vertical tube 442' to respond to the changing temperature fluids (e.g., cool water, warm air) that come into alternating contact with the tube interior.

Cable extension 443b can provide investment electrical power into the piston 442b' for operating capacitive and/or magnetic CiPR 10 mechanisms associated with one or more of the counter-reciprocating piston 442b' and cage 465 as well as the vertical tube shell structure interposed between the piston and cage. Referring to FIG. 4C, a simplified embodiment of an expanding-gap magnetic CiPR system 490 is shown. Charge stored in a rechargeable lending source such as capacitor 491 ($C_1$) is primed through variable inductor 492 when a switching means such as SCR 493b (could be a power MOSFET instead) is switched into a conducting mode by a gap-expansion detector 494. Diode 493a directs the priming current through the coil of variable inductor 492 ($L_2$) and through switching means 493b, as well as through an optional resonance-tuning coil L1. Diode 493a and SCR 493b (which SCR will shut off as the inductor current flow is about to reverse) operate to impede purge current from flowing back through the priming loop. When the magnetic field (i.e. in gap 492c) built up in $L_2$ collapses, the induced counter EMF in the inductance pushes the purge current out through the purge loop comprised of current directing diodes 494a, 494b, profit collector 495 ($C_2$), charge lender 491 ($C_1$), diode 496a, and inductor coil $L_2$ (492). Energy output is greater than energy provided by the lender ($C_1$) because, at the time that detector 494 closes switch 493b, the gap 492c between coil yoke 492a and movable yoke piece 492b is about to be expanding or is expanding. This produces excess electrical energy. By contrast, when a machine is in an electrical motoring mode, coil current ($I_{prime}$) is used to force the gap 492c to contract (this is referred to as a motoring mode). When system 490 is in an electrical energy generating mode, the forcibly expanding gap 492c is used to quicken the rate at which the magnetic field collapses across the windings of the inductor and this generates more electrical energy output ($I_{purge}$) than the amount of electrical energy current ($I_{prime}$) originally donated to build the magnetic flux field across the expandable gap 492c. If desired, system 490 may also have a motoring mode wherein magnetic flux is generated across variable gaps such as 492c to forcibly contract such gaps. A combined generating and motoring apparatus may be used to winch a cable in and out of a cable spooling area where the cable is subject to variable tension forces (e.g., wind and/or waves). The charging and collecting methods described for the capacitance CiPR system of FIG. 2A, for example, may be used for initially charging $C_1$ (491) and collecting accumulated profit from $C_2$ (495). Although gap widening is described here because it is a more conventionally understood method of collapsing (decondensing) a magnetic flux flow, it is within contemplation here to alternatively or additionally employ magnetic-path continuity breakers such as will be described in conjunction with FIGS. 4D-4E.

Coupling 494a may define a signaling path by way of which the detector 494 detects the condition where magnetic gap 492c is entering, or is about to enter into, a forced expansion mode. Computer means may be used to control the precise timing of the closing of switch means 493b. Energy source 497 forces the gap length to expand. The energy source may be any kind of force-providing one that forces the movable yoke 494b to move relative to stator yoke 492a so as to vary the magnetic gap length. The movable yoke 494b may be of a rotary type or a linear type. The means by which expansion detector 494 detects that magnetic gap 492c is, or is about to enter, a forced expansion mode can vary and may include capacitance-based detection means, inductive detection means, optical detection means, strain detection means (e.g., piezoelectric sensor) and so forth. The force of the energy source 497 may be measured prior to, or during output of the priming current such that the amount of priming current may be adjusted to match the power available at the moment form the energy source 497.

In one embodiment (not necessarily that of the spider buoy), optional photovoltaic cells such as diodes 494d are coupled by steering diode 494c to profit collecting capacitor 495. When solar energy 497b is available, the PVC's 494d (there can be more than the illustrated 4 in a series) charge capacitor 495 to the PVC output voltage. Capacitor 495 ($C_1$) may accumulate additional charge from elsewhere (i.e., from generative operation of L2 and/or from a capacitive CiPR source, not shown in FIG. 4C.) Dividend switches Sw1, Sw2 are occasionally closed to transfer charge from profit capacitor 495 ($C_2$) to lender 491 ($C_1$).

Referring to FIG. 4D, a plurality of charge lenders $C_{11a}$-$C_{11d}$ may be provided as shown for allowing independent charging of these to different voltages and independent triggering of their respective SCR's at different times, or for selective activation of specific ones of the SCR's in parallel, this occurring as various external energy sourcing opportunities 497b present themselves. At peak inductance, the illustrated magnetic yoke has essentially no air gap. (There is no requirement for a motor or generator to always have an air gap). The two large gears have spoked ferro-magnetic paths (paths that conduct magnetic flux flow but impede eddy current flow) embedded in them as part of a substantially cylindrical whole whose remainder contains non-ferromagnetic material (e.g., a plastic, electrically nonconducting main part of the gear body). A closed magnetic path is temporarily formed when simultaneously aligned ones of these spoked magnetic paths come into contact with additional spoked paths provided in the smaller, counter-rotating gears. In one embodiment, the ratio of the radii of the big gears to the radii of the smaller gears is an integer greater than one (i.e., 2:1, 3:1, 4:1, etc.) The closed magnetic paths that are formed of the aligned and temporarily contacting spokes, break apart in four places at once as the gears continue rotate out of their full alignment state. This breaking apart of the path in multiple places hastens the rate of collapse of the magnetic flux flow established through the temporarily closed magnetic loop by the one or more of the priming currents lent by $C_{11a}$-$C_{11d}$. Profit charge collects in capacitors $C_{22a}$ and $C_{22b}$. The charging and collecting methods described for the capacitance CiPR system of FIG. 2A, for example, may be used for initially charging lenders $C_{11a}$-$C_{11d}$ to desired voltages and for collecting accumulated profits from $C_{22a}$ and $C_{22b}$. The illustrated gears ride in a reciprocating gear cage that pulls or pushes the gears across the gear meshing points provided in stator yoke (the yoke about which the windings are wound). This causes the gears to rotate. Other means may alternatively or additionally be used for causing the gears to rotate into and out of magnetic path breaking states. Lubricating fluids such as oils may surround the gears and may further function as heat removal means. Although FIG. 4D shows magnetic path continuity and breaking occurring by way of one linear gear rack and one set of spoked rollers (e.g., cylinders), it is possible to have plural racks and spoked rollers between them such as shown for example in FIG. 8. It is possible to have a closed magnetic flux flow path formed by spoked rollers alone, arranged in a roller supporting cage of closed path configuration.

As an added bonus, ΔT-CiPR capacitors (499) can be embedded among various ones of the variable inductance windings of the generating means 498 shown in FIG. 4D so that $I^2R$ heating pushes corresponding ones of the temperature sensitive dielectrics past their respective Curie points at different times. In one embodiment, different ones of the windings are fired at different times so as to modulate the temperatures of the ΔT-CiPR capacitors (499). Air or other fluid is moved by the rotating yoke gears (rollers) to cool off the ΔT-CiPR capacitors below their respective Curie points. CiPR circuits (not shown) automatically pole the cooled dielectrics (e.g., Sr doped or Sn doped barium titanate) and provide priming current to them as well as providing profit collecting return loops. This concept of interlacing $I^2R$ heat generation and ambient cooling among different wire windings of the electricity generating or conducting means 498 shown in FIG. 4D and using the resultant temperature modulations to drive ΔT-CiPR capacitors (499) can be applied to many a different applications where magnetic windings, or even just power transmission wires, heat up as a result of electrical current being pushed through their parasitic resistances. A simple implementation is schematically represented at 499a. The first wire, which forms the magnetic winding (or a power transmission wire) is coated or otherwise surrounded with a flexible insulator that includes a temperature-sensitive ferroelectric dielectric (e.g., Sr doped or Sn doped barium titanate). A bare wire (e.g., bare copper) is twisted about the insulator-surrounded first wire. In the case of a magnetic winding, the twisted pair is wound about an appropriate magnetic core (e.g., 492a). The bare wire electrically shorts with itself along various points of its length so that it primarily defines a capacitor plate electrode rather than an inductive winding. The other plate electrode of the ΔT-CiPR capacitor is defined by the insulator-surrounded first wire which loops around the magnetic flow path.

Figure 5A:
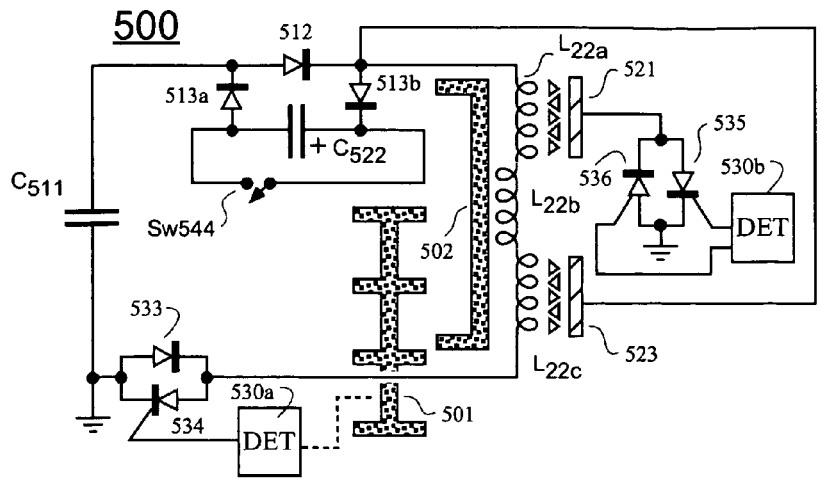
FIG. 5A shows a third integrated inductive and capacitive type of energy investment and profit recovery system in accordance with the invention.
Figure 5B:
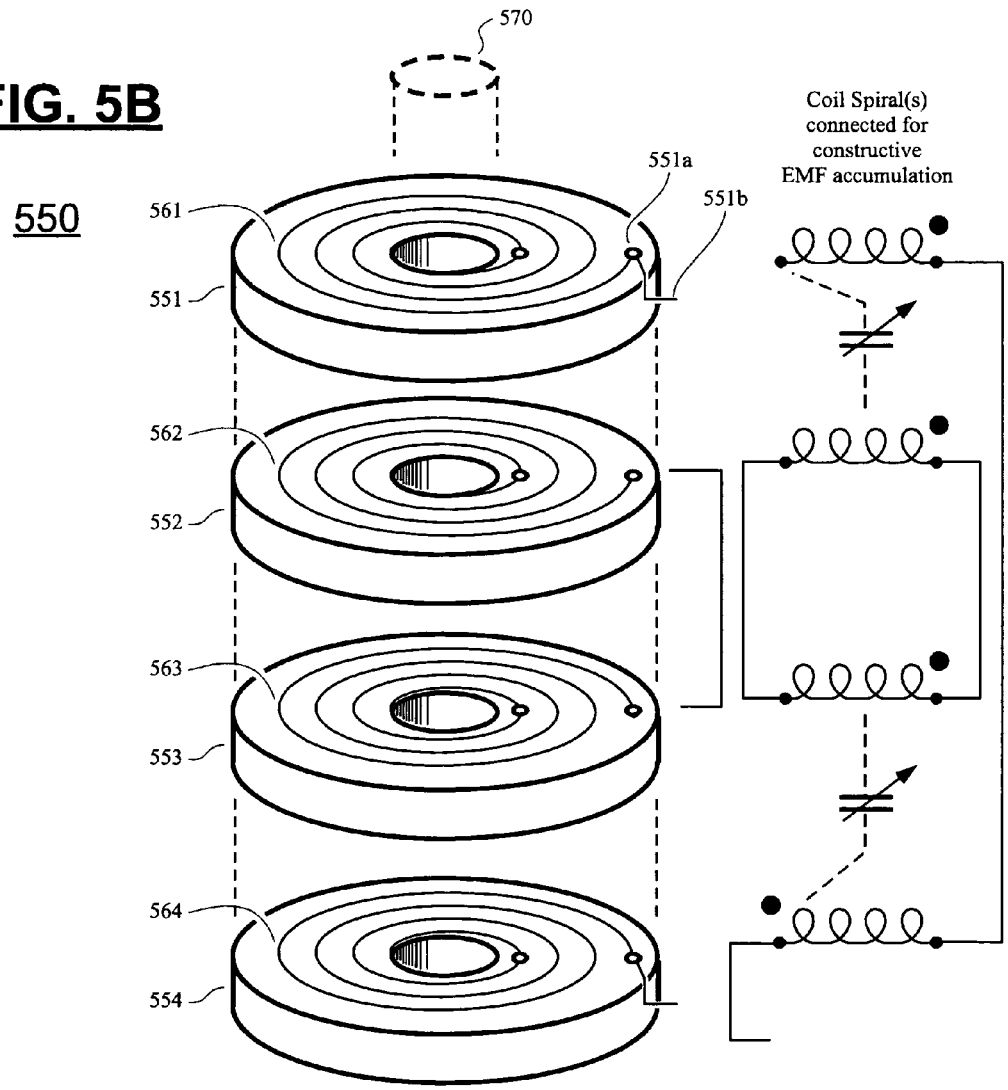
FIG. 5B is a schematic perspective view showing a method for integrating spiral electromagnet windings with interdigitated capacitor electrodes and temperature-varied dielectric layers for use in dual winding motors or other electromagnet machine means.

Referring momentarily to FIG. 5B, the bare wire embodiment described immediately above has the drawback that Eddy currents may be created through the shorts of the bare wire if those shorts are not properly organized to impede Eddy current flow. The embodiment of FIG. 5B shows a method of organizing clockwise (CW) and counter-clockwise (CCW) spirals so that those of the spiral layers which are to serve as capacitor plate electrodes develop destructively-oriented EMF's of substantially same magnitude, thereby greatly reducing or preventing Eddy current flow. More on FIG. 5B and co-related FIG. 5A will be provided below.

Figure 4E:
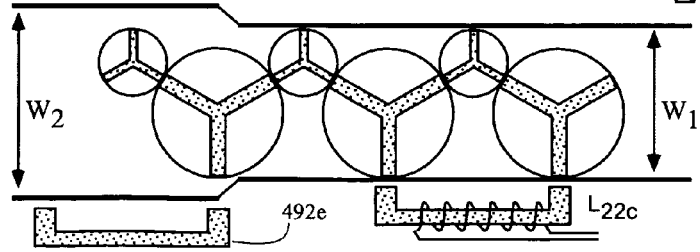
FIG. 4E shows a method for aligning roller-type magnetic path breakers.

Referring to FIG. 4E, a variation of the geared continuity breakers embodiment of FIG. 4D is shown in cross section. Instead of gears, substantially cylindrical roller bearings of large and smaller radii are used as shown. The ratio of the radii of the big rollers to the radii of the smaller rollers is an integer greater than one (i.e., 2:1, 3:1, 4:1, etc.) so that alignment of the ferromagnetic spokes is achieved even though the smaller rollers undergo a greater angular rotation than do the big rollers when the race cage (not shown) that holds both at their respective ends (pointed ends) is moved so that the rollers are forced to rotate against each other in a compression zone having width $W_1$. For example if both the small and big rollers have tri-spoked ferromagnetic extrusions embedded in them with the interspoke angle being about 120°, and the radii ratio is 2:1, then a 120° rotation by a big roller will be matched by a 240° rotation by a small roller when both are in the compressed race zone ($W_1$). Thus, the spokes in the big and small rollers will periodically come into contacting alignment with one another to form temporarily, maximally closed magnetic flux paths for nearby C-cores such as that of inductor $L_{22c}$. Priming current is pumped into the temporarily closed magnetic flux path over a time span just before the closed magnetic flux path starts to break open at the circumferential contact points of the big and small rollers. Path breakage occurs at the bottoms of the Y-spoke ends as well as at the tops. So in the embodiment of FIG. 4E, inductor $L_{22c}$ sees four path breaks occurring at the same time. In an alternate embodiment, 4-spoked X's are formed in the big rollers and the big rollers almost touch, but not quite. The gaps between the almost touching X's of the big rollers (alternate embodiment, not shown) widen rapidly because both of the big rollers are rotating in the same direction, say clockwise. So the right contact point of the first roller rotates downwardly while at the same time, the adjoining left contact point of the second roller rotates away upwardly. So the speed of gap expansion is double the speed of circumferential rotation of the big rollers.

When the rollers of FIG. 4E are in the decompressed race zone of width $W_2$, where $W_2 > W_1$, the big and small rollers are not compressed against each other and they are somewhat free to rotate relative to one another. A permanent magnet 492e (and/or a periodically activated electromagnet) urges the substantially free-wheeling rollers into alignment with one another just as they are entering the compressed race zone of tighter width $W_1$. Thus the extruded Y-members (or X or other starred ferromagnetic members) in the rollers become realigned from time to time as the race (not shown) is reciprocated back and forth to push or pull the rollers through the compressed race zone and past CiPR inductors such as $L_{22c}$. Although FIG. 4E shows the coil winding of $L_{22c}$ around a solid core, it is within the contemplation of the present disclosure to have an electromagnet winding encircling the ferromagnetic material of a torroidal magnetic flux path composed of only spoked rollers or geared cylinders so as to induce flux flow within the torroidal shape and thereby provide motoring and/or generating action as the continuity of the magnetic flux path is made and broken with rotation of its constituent spoked rollers or geared cylinders. Additionally, although the concept of continuity making and breaking is illustrated in terms of magnetic flux flow, it is also possible to make and break continuity of series connections between a series connected plurality of electrical capacitors. The concept need not be limited to continuity of magnetic flux flow.

Figure 4F:
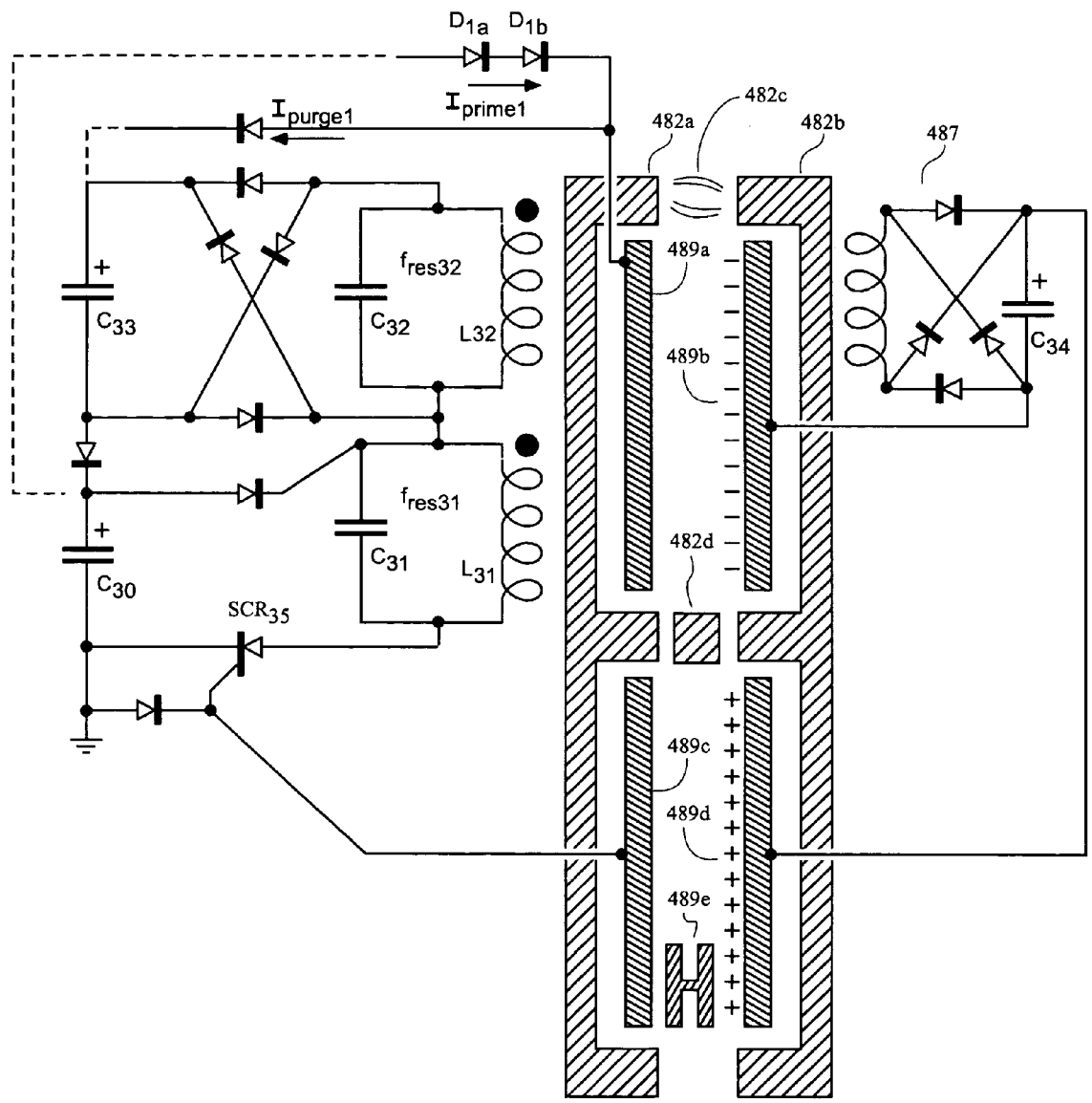
FIG. 4F shows a second integrated inductive and capacitive type of energy investment and profit recovery system in accordance with the invention.

Referring to FIG. 4F, yet another embodiment 480 is shown where counter-facing magnetic yokes 482a and 482b move relative to one another so as to alternatingly widen and reduce magnetic gaps 482c defined between the spaced apart yokes. Counter-facing capacitor plates such as 489a and 489b may be provided on same or coupled substrates of the yokes so as to also move relative to one another when the yokes move and so as to alternatingly increase and reduce capacitive coupling between the counter-facing capacitor plates 489a-489b. In an alternate embodiment, yoke 482a is in the float piston of FIG. 4B, yoke 482b is in the cage and magnetic shorting rods like 482d are embedded in the shell of the vertical tube. Capacitance improving coupling 489e is also embedded in the shell of the vertical tube. Magnetic coupling therefore maximizes when the cage yoke 482b aligns with the magnetic shorting rods like 482d and the in-float yoke 482a simultaneously aligns with the matching-wise spaced magnetic shorting rods 482d (only one shown). Capacitance therefore maximizes when the cage capacitor electrode like 489b aligns with the capacitance improving coupling 489e and the in-float capacitor electrode like 489a simultaneously aligns with the matching-wise spaced capacitance improving couplings 489e (only one shown).

Circuit 487 energizes a so-called, flying capacitor, $C_{34}$. In one embodiment, circuit 487 includes a pickup coil magnetically coupled to the yoke on the right, 482b (e.g., the in-cage yoke) and it includes a full wave rectifier that is connected for converting the AC EMF of the pickup coil into a DC voltage for development across the flying capacitor, $C_{34}$, and also for development between capacitor plates 489b and 489d (e.g., the in-cage capacitor electrodes). When capacitor plate electrodes 489a and 489b fully oppose each other, and capacitor plates 489c and 489d similarly fully oppose each other (and optionally also cross with the in-shell coupling enhancement 489e), the voltage of the flying capacitor attracts positive charge onto plate 489a and negative charge onto plate 489c (where 489a and 489c are inside the piston float in one embodiment). Triggering current then flows through the gate terminal of silicon controlled rectifier, $SCR_{35}$, thereby triggering $SCR_{35}$ (or another electronic switching means as may be appropriate) into a conductive mode just when the magnetic gaps 482c between yokes 482a-482b are at minimum and about to start widening. A priming voltage couples from supply means $C_{31}$ into first resonant tank circuit $C_{31}$-$L_{31}$. Inductor $L_{31}$ is mutually coupled to $L_{32}$ as shown schematically. Because the magnetic gaps 492c are widening at this time, oscillation frequency increases. The second resonant tank circuit $C_{32}$-$L_{32}$ is tuned for the higher frequency while the first resonant tank circuit $C_{31}$-$L_{31}$ is tuned for a lower frequency. Increased energy couples into the second resonant tank circuit $C_{32}$-$L_{32}$ as a result of the widening gaps 482c and reduced inductance. A full wave rectifier converts the profit energy into a DC voltage for storage in profit collector $C_{33}$. Later, when capacitor plates 489a and 489d fully oppose each other, and capacitor plates 489c and 489b similarly fully oppose each other, capacitive purge current flows through profit collector $C_{33}$ and priming donor $C_{31}$. It may be appreciated that both inductive and capacitive generation of electrical energy is provided as the yokes 482a-482b and capacitor plates 489a-489d move relative to one another. As explained above, yoke 482b may be part of the cage of the buoy shown in FIG. 4B and yoke 482a may be inside the piston float.

Referring to FIG. 5A, yet another combined inductive and capacitive CiPR system 500 is shown. An externally driven (moved) magnetic yoke is represented at 501. A stator yoke with windings $L_{22a}$, $L_{22b}$ and $L_{22c}$ provided about it is schematically represented at 502. Capacitor $C_{511}$ may be replaced by a sinusoidal voltage source or combined in parallel or series with one another. Assume for purpose of explanation that capacitor $C_{511}$ is present alone and it is initially charged to $+V_{max}$ (positive at its top side) relative to ground just before switch means 534 is switched into a conductive state by detector module 530a. Detector module 530a closes switch means 534 when the magnetic permitivity of a loop formed by yokes 501 and 502 is about to decrease substantially. Priming current (investment electrical energy) flows through the closed switch means 534 as well as through the series connected windings $L_{22a}$, $L_{22b}$ and $L_{22c}$ and through diode 512. At that initial moment, top winding $L_{22a}$ is charged positive relative to ground (say at roughly $0.75*(+V_{max})$) and bottom winding $L_{22c}$ is charged close to ground (say at roughly $0.25*(+V_{max})$). The middle of the middle winding $L_{22b}$ is at roughly $0.5*(+V_{max})$. Electrons are drawn to top plate 521 due to its voltage and counterposed positive charge is drawn to bottom plate 523. The positive charge comes through diode 512. The electrons (negative charges) come through switch means 535, which switch is closed by module 530b at about the same time SCR 534 is closed by detector module 530a. As capacitor $C_{511}$ discharges through inductance, $L_{22a}$-$L_{22b}$-$L_{22c}$, a magnetic field is built up in the inductor and the voltage across $C_{511}$ transitions through 0V and then down to $-V_{max}$.

Roughly at that $-V_{max}$ point, current flow ($v=Ldi/dt$) through inductance $L_{22a}$-$L_{22b}$-$L_{22c}$ reverses as its magnetic field collapses. Switch 534 automatically becomes nonconductive. Switch 535 will have become nonconductive at an earlier time, when voltage across the inductance was about to cross through 0V after having been at $+V_{max}$ (roughly). Electrons will be temporarily trapped on plate 521 because switch 536 is not yet closed. Detector 530b closes switch 536 a short time later but first allows heat from $I^2R$ dissipation and/or from another source (e.g., gas compression) to reduce the dielectric constant of the ΔT-CiPR dielectric provided between winding $L_{22a}$ and plate 521. This drop of capacitance works to increase the potential energy of the negative charge that is temporarily trapped (condensed) on plate 521. It also increases the potential energy of the positive charge that is temporarily trapped on plate 523. Then as diode 512 becomes reverse-biased and diodes 513a-513b become forward biased, detector 530b closes switch 536 and the trapped charge is allowed to flow through diodes 513a-513b as well as through profit collector $C_{522}$. The reversed current flow of inductance $L_{22a}$-$L_{22b}$-$L_{22c}$ also flows through diodes 513a-513b and through profit collector C522, looping also through lending capacitor $C_{511}$. Capacitor $C_{511}$ is recharged back towards its original $+V_{max}$ value and excess profit is collected in $C_{522}$. Switch $Sw_{544}$ may be closed when a motoring mode is desired as opposed to the described, profit-charge generating mode.

Referring to FIG. 5B, one possible way of structuring an integrated inductor and capacitor means 550 is shown in exploded perspective. A magnetic solid yoke, or alternatively a pipe for carrying magnetizable fluid, is shown in phantom at 570 passing concentrically through cylindrical structure 550. Other shapes, including noncircular and/or nonsymmetrical, are possible for the yoke and/or pipe. There could be plural ones of such yokes or pipes each surrounded fully or partially by spiraling conductor patterns. One is shown for simplicity. A first insulative layer 551, which may include temperature sensitive dielectric (e.g., doped barium titanate) embedded in elastic or inelastic medium, forms a torroid like part of the illustrated cylindrical structure 550. A first electrically conductive (or semiconductive) spiral 561 winds counter-clockwise (CCW) from near the central opening towards the periphery of the first insulative layer 551, and in so doing it winds about the yoke(s) or pipe(s) 570. Although just one such CCW spiral is shown at 561 for sake of illustrative simplicity, there could be many very narrow such spirals all winding in parallel in the CCW direction, each for guiding charge flow along a restricted and corresponding spiral path. Through-the-insulator vias such as 551a and/or edge contacts such as 551b may be provided and used to provide connections between layers and/or to external devices.

A second insulative layer 552, which may include low-K dielectric material (e.g., void filled silicon oxide) forms a second torroid like part of the illustrated cylindrical structure 550. Although not shown as such, in one embodiment, the second insulative layer 552 may be a wedge shaped torroid rather than one with parallel top and bottom surfaces so that the wedge shape defines part of a curved elbow rather than part of the vertical windings cylinder shell shown in FIG. 5B. A second electrically conductive (or semiconductive) spiral 562 winds counter-clockwise (CCW) from near the central opening towards the periphery of the second insulative layer 552, winding about the yoke(s) or pipe(s) 570 and matching the path of the first spiral 561 above it. Although just one such CCW spiral is shown at 562 for sake of illustrative simplicity, there could be many very narrow such spirals all winding in parallel in the CCW direction, each for storing charge along a corresponding spiral path that capacitively couples to the first CCW spiral 561 and/or its counterparts of the of the first insulative layer 551, the capacitive coupling being through the high dielectric constant, ferroelectric layer 551.

A third insulative layer 553, which may include a temperature sensitive, high-K dielectric (e.g., doped barium titanate) forms a third torroid like part of the illustrated cylindrical structure 550. A third electrically conductive (or semiconductive) spiral 563 winds clockwise (CW) from near the central opening towards the periphery of the third insulative layer 553, winding about the yoke(s) or pipe(s) 570 and opposing the path of the second spiral 562 above it for the purpose of producing an EMF that substantially counters the EMF of the second spiral 562. A schematic representation of the destructively interfering coupling of the two spirals is shown to the right of layers 552 and 553. Electrical connections between spirals 562 and 563 may be made by way of solder bumps, contact pads and/or conductor-filled vias provided near the outer edges of the interposed dielectric layer 552 and/or provided near the inner passage way provided for the magnetic yoke 570. Amalgam and/or sonic bonding may be used for electrically interconnecting and fastening together the illustrated layers. It is within the contemplation of the disclosure to have countering spirals on a same plane rather than merely in different planes. It is also within the contemplation of the disclosure to have radially extending capacitor electrodes that are interconnected end-to-end in zigzag style without closing a loop. This is another way of forming an Eddy current impeding, capacitor plate integrated within the magnetic pathway. Although just one CW spiral is shown at 563 for sake of illustrative simplicity, there could be many very narrow such spirals all winding in parallel in the CCW direction, each for storing charge along a corresponding spiral path (or unclosed zig-zag path) that capacitively couples to a lower down, fourth CW spiral 564 through the high dielectric constant, ferroelectric layer 553. Although just one magnetic yoke 570 is shown, there could be plural spaced apart yokes, each having windings spirally or otherwise surrounding it so as to induce magnetic flux flow.

A fourth insulative layer 554, which may include a low-K dielectric material (e.g., void filled silicon oxide), forms a fourth torroid like part of the illustrated cylindrical structure 550. The top and bottom surfaces of the fourth insulative layer 554 do not have to be parallel to one another. A fourth electrically conductive (or semiconductive) spiral 564 winds clockwise (CW) from near the central opening towards the periphery of the fourth insulative layer 554, winding about the ferromagnetic yoke(s) or pipe(s) 570 and matching the path of the third spiral 563 above it. Although just one such CW spiral is shown at 564, there could be many very narrow such spirals all winding in parallel in generally the CW direction, each for guiding charge flow along a restricted and corresponding spiral path. In contrast to spirals 562 and 563, the first and fourth spirals, 561 and 564 are interconnected constructively as shown schematically to the right so that their inductively induced EMF's add up constructively. Although spirals are shown, various more exotic forms of flow guidance may be provided as may be desirable. (See for example FIG. 5C.) Grooves may be pre-etched in the dielectric layers 551-554 for defining the patterns of the conductive spirals 561-564 adhered thereto or embedded therein. A damascene technique may be used for embedding metal spirals in corresponding spiral grooves preformed in the dielectric layers 551-554. Edge connection from one or both of layers 552-553 provides a capacitor terminal for the capacitor (e.g., a variable capacitor) that inherently forms between destructive spirals 562-563 and the surrounding constructive spirals 561, 564. An equivalent circuit might be drawn as two capacitors joined together at first ends and having their other ends connected to ends of the inductor. In one embodiment, as should be apparent from the above; the two equivalent circuit capacitors define ΔT-CiPR capacitors. Heat for modulating the temperatures of these ΔT-CiPR capacitors may come from resistive heating of the spiral conductors and/or from other sources. The various dielectric layers may also include elastomeric ones for generating CiPR energy from pressure compressions and releases. Aside from forming a CiPR system, structure 550 or general equivalents thereof may find many other uses, including those where the integrated capacitors are not necessarily one or both of ΔT-CiPR and ΔP-CiPR capacitors. For example, the temperature sensitive capacitors, if included, may be used for detecting over-heating of the adjacent, constructively connected electromagnet coils, where the latter define part of an electric motor and/or electromagnet generator. The integrated inductor and capacitor structure may have plural windings and separate capacitances organized to define electronic filter networks or the like.

Figure 5C:
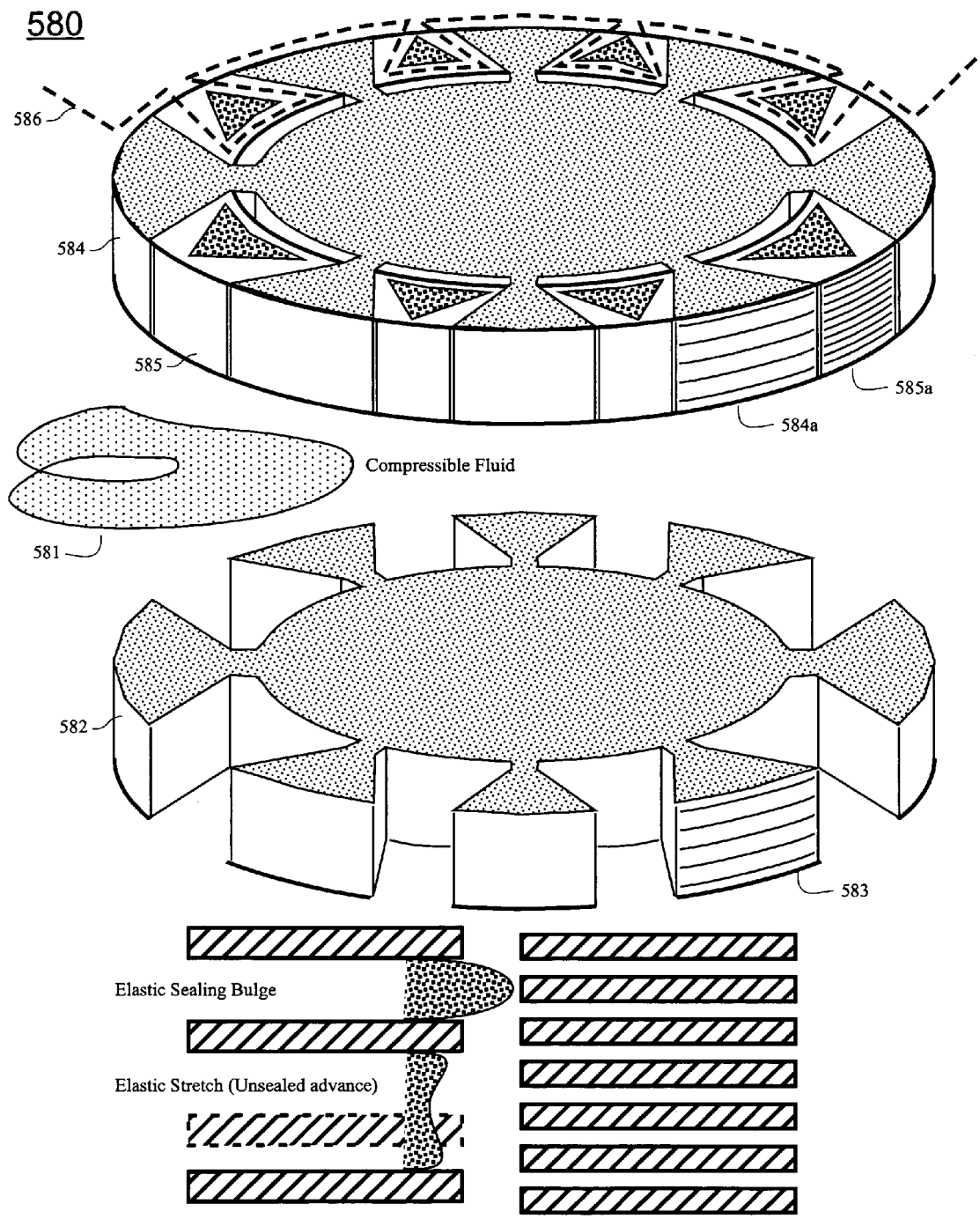
FIG. 5C is a schematic perspective view showing a method for integrating electromagnet windings and interdigitated variable capacitor means such as those of FIG. 5B within a compressor or pump having selectively sealable pistons.

Referring to FIG. 5C, shown is a perspective schematic for a compressor 580 (or pump) of compressible fluids 581 such as air or refrigerants. As is known in the arts of air compressors, air pumps, and/or air conditioners (heat pumps), when a compressible fluid (581) is introduced into a first volumetric space at first pressure and temperature and then the size of the volumetric space is substantially reduced, at least one, and usually both of the pressure and temperature of the compressed fluid increases (PV=nRT). During cyclings of a variable volume compressor, the temperatures and pressures can cycle between respective low and high magnitudes. In accordance with the invention, ΔT-CiPR and/or ΔP-CiPR capacitors are embedded in or adjacent to the changing volumetric space that holds the compressor's working fluid (e.g., refrigerant) and these CiPR capacitors are coupled so that electrical energy may be generated from the respective cyclings of fluid temperatures and/or pressures between the respective low and high magnitudes. By way of example, in a typical air conditioning compressor refrigerant conditions can modulate between lows of about 50° F. and 40 psig to highs of about 200° F. and 200 psig. Sr doped and/or Sn doped $BaTiO_3$ dielectrics may be used to form the dielectrics of ΔT-CiPR capacitors for such a temperature range. For higher temperatures, Pb may be doped into the $BaTiO_3$ particles. The particles may be embedded in an inelastic dielectric binder. Adjacent ΔP-CiPR capacitors may be formed by embedding less temperature sensitive ferroelectric dielectric particles in an elastic dielectric binder. When both ΔT-CiPR and/or ΔP-CiPR capacitors are present, profit current can be purged first when temperature increases during a compression cycle, and later when pressure decreases during a corresponding expansion cycle.

In accordance with FIG. 5C, one or more electromagnetically urged (and/or otherwise urged) and linearly reciprocating piston plates like 582 are each provided with dovetail-shaped fingers 583 at its periphery. The dovetail fingers 583 slidably mate with corresponding dovetail-shaped pockets provided in a matching stator ring 585. A second piston plate 584 is shown to have slidably entered the interior volumetric space of stator ring 585. Although not shown, it is understood that plural ones of such stator rings 585 are stacked one on the next to define a fluid retaining chamber in which a compressible fluid like refrigerant 581 may be compressed between moving together ones of adjacent piston plates like 582 and 584 or between a top or bottom of the fluid retaining chamber and an opposed surface of an approaching piston plate. Conversely, the volumetric space that does, or is to contain a compressible fluid like 581 may be expanded by moving apart adjacent piston plates like 582 and 584 or by increasing the separation between a top or bottom of the fluid retaining chamber and an opposed surface of a moving away piston plate.

In the embodiment of FIG. 5C, spiral-wise routed conductors such as 586 make their away around the edges of the dovetail pockets of the stator ring 585 so as to generate magnetic flux when energized. The generated flux can be used to urge a piston plate like 584 to enter the interior space of a given stator ring 585. In one embodiment, a plurality of ferromagnetic yoke plates are spaced between elastic separators at full pitch in each piston plate, but at slightly less than half pitch in the matching stator rings (585). Spiral windings are provided between the spaced half pitch yoke plates of the stacked stator rings (585). A half-pitched section is schematically shown at 585a. Full-pitched sections are schematically shown at 584a and 583. When magnetic flux flows, it compresses adjacent ones of the full-pitched, ferromagnetic plates together. The magnetically urged together plates squeeze an elastic sealing material provided between them out, thereby creating a sealing bulge with the piston chamber sidewalls. In one embodiment, the elastic sealing material has ferromagnetic particles embedded in it so as to enhance magnetic flux flow. In one embodiment, the half-pitched ferromagnetic plates attract the bulged ferromagnetic-impregnated sealing elastic material to them while next adjacent ones of the half-pitched ferromagnetic plates attract the upper and lower, full-pitched, ferromagnetic plates to compress together. Electromagnetic windings between the half-pitched ferromagnetic plates may be energized in different flux-flow polarity arrangements or deenergized as appropriate to advance the piston plates in a desired direction (up or down) and to stepwise advance the elastice sealing bulges along the piston chamber sidewalls. Although just two pistons, 582 and 584 are shown, it is within the contemplation of the disclosure to have more such electromagnetically moved pistons moving in appropriate sequences so as to compress or decompress the volumes of fluid between them. Mating concentric grooves (not shown) may be fashioned in the facing surfaces of adjacent pistons so as to define cup-in-cup compression zones. Heat can flow out from compressed fluid 581 trapped in the cup-in-cup sections and outwardly through the material of the pistons even though the fluid itself is essentially trapped in these compression zones. If desired, ΔT-CiPR capacitors may be integrated into the piston plates although this increases cost and complexity of the system. It is easier and more cost effective to have ΔT-CiPR capacitors integrated just with the inductive windings of the stator, namely, between the half-pitched ferromagnetic plates 585a in accordance with the method described for FIG. 5B.

Figure 5D:
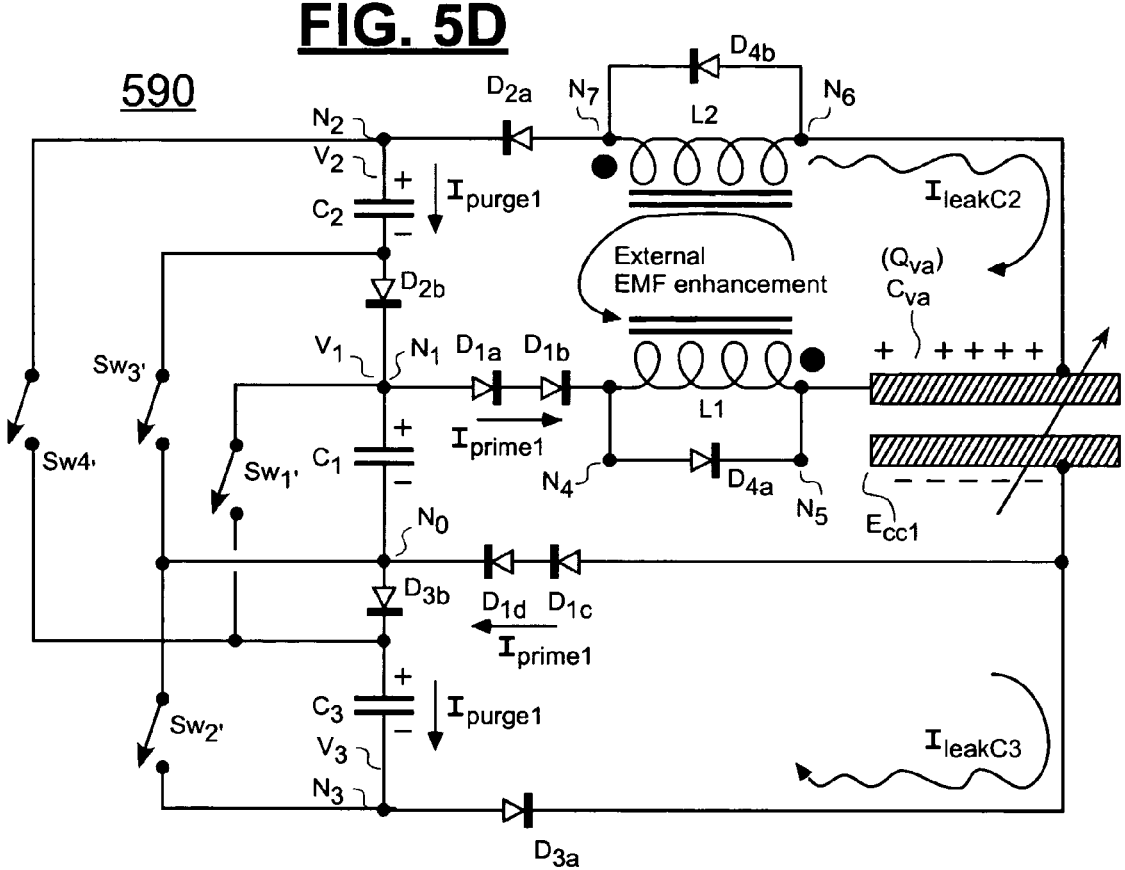
FIG. 5D shows a fourth integrated inductive and capacitive type of energy investment and profit recovery system in accordance with the invention.

Referring to FIG. 5D, yet another CiPR system 590 with combined capacitive and inductive elements is shown. Here, an external and moving permanent magnet may pump inductors $L_1$ and $L_2$. The permanent magnet may be moved by the same mechanical displacement mechanism that modulates the capacitance of variable capacitor $C_{va}$. EMF generated in inductors $L_1$ and $L_2$ may be used to pump charge into the variable capacitor $C_{va}$ and also into profit collector $C_2$. The illustrated circuit 580 is structured to reduce leakage stress in the current loops of profit collector capacitors $C_2$ and $C_3$. When switching to its low capacitance mode, the variable capacitor $C_{va}$ purges serially through $C_2$ and $C_3$ as well as through lender $C_1$. Because the voltage across $C_{va}$ during such purging is distributed across the three capacitors, $C_1$, $C_2$ and $C_3$, each of the latter do not have to have extremely large breakdown specifications as they might need if stressed alone by the full voltage across $C_{va}$. Similarly, the reverse-biased diodes, with the exception of $D_{1a}$, $D_{1b}$, $D_{1c}$ and $D_{1d}$; do not have to each have extremely large breakdown specifications. Leakage currents from the profit collectors, $I_{leakC1}$ and $I_{leakC3}$ can be reduced. Switches $S_{w1}$-$S_{w4}$ may be used for equalizing charge distributions amongst the illustrated capacitors.

Figure 6A:
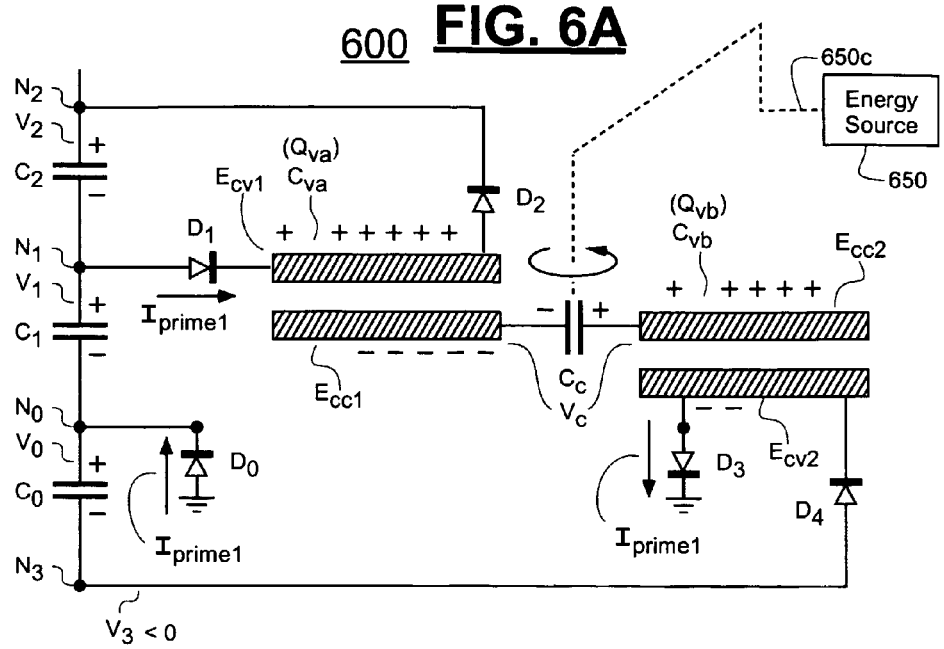
FIGS. 6A-6B show a flying capacitor embodiment in accordance with the invention.
Figure 6B:
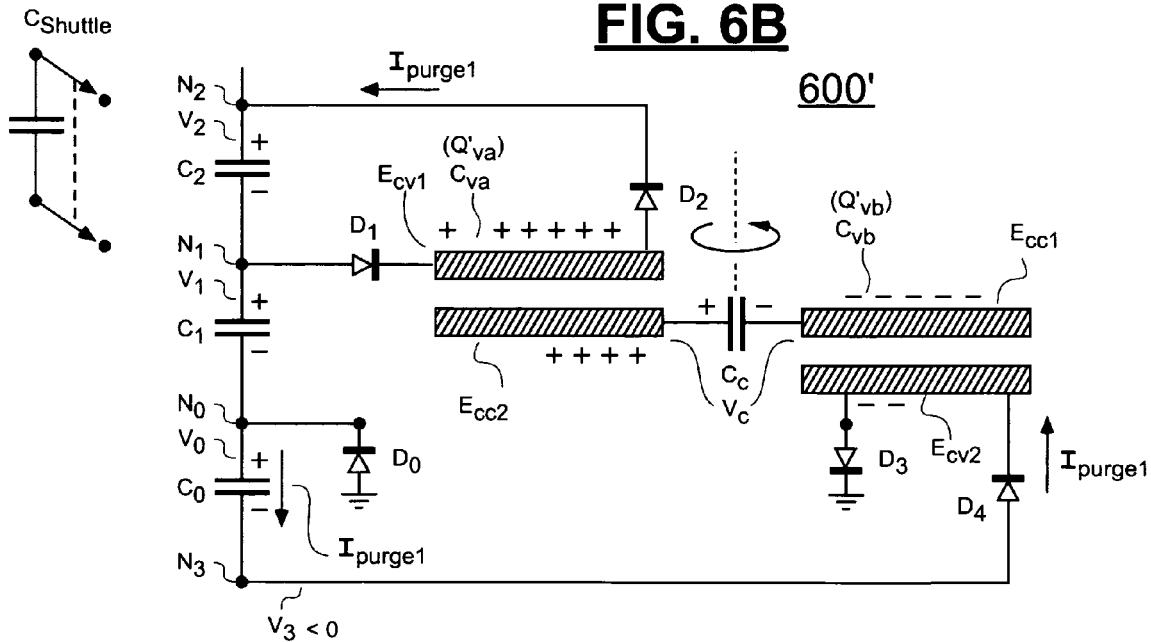

Referring to FIGS. 6A-6B, these schematics illustrate the flying capacitor concept. Moveable capacitor electrodes $E_{cc1}$ and $E_{cc2}$ are positioned in FIG. 6A so that the voltage ($V_c$) across flying capacitor $C_c$ attracts priming current into the opposed capacitor electrodes, $E_{cv1}$ and $E_{cv2}$ respectively of the stationary, variable capacitor $C_{va}$. Then, an external energy source 650 couples by path 650c to the flying capacitor $C_c$ and to the moveable capacitor electrodes $E_{cc1}$ and $E_{cc2}$ for translating them into the charge repelling state shown in FIG. 6B. Translation may be rotational or due to linear shift of periodic copies of the moveable capacitor electrodes $E_{cc1}$ and $E_{cc2}$. Although not shown, there can also be periodic copies of the relatively stationary capacitor electrodes, $E_{cv1}$ and $E_{cv2}$. In FIG. 6B, $I_{purge1}$ flows because the voltage ($V_c$) of the flying capacitor $C_c$ opposes the charges that had been attracted into (condensed onto) capacitor electrodes, $E_{cv1}$ and $E_{cv2}$ during the priming phase. Although they are termed flying capacitors, it is possible to use this concept in many ways, including having dielectrically covered rollers, with flying capacitors embedded in them, rolling on a counter surface having the equivalents of stationary capacitor electrodes, $E_{cv1}$ and $E_{cv2}$ embedded in such a counter surface.

Referring to FIG. 7, a shore-based CiPR system 700 in accordance with the present disclosure of invention is shown. Unlike the ocean-based systems discussed above, where saline water and moist air are basically forced by nature as the most suitable working fluids, in a more controllable home, office building or other onshore environment 700, it is practical to be more selective about the types of fluids (liquids and/or gases) that are to be opportunistically used in various parts of the building structure (e.g., on the rooftop, near the hot water furnace, and/or underground below the water table) for generating electrical energy. In one embodiment, at least first and second fluid tanks, 701 and 702, are provided (i.e in a furnace containing region of the building) for respectively containing: (a) mostly a dense and dark colored electrolytic liquid (e.g., a dark-dyed KOH aqueous solution in tank 701), and (b) mostly a less dense and immiscible second liquid which is relatively transparent and non-electrolytic (e.g., a light colored vegetable oil in tank 702). The first and second fluid tanks, 701 and 702, do not have to be filled entirely with their respective first and second primary fluids. Since the first and second fluids are immiscible with one another, contaminating oil in tank 701 will float to the top (because it is less dense) and this upper layer may be used protect the aqueous electrolytic liquid from oxidation by air above it. Fluids may be allowed to settle in the tanks and to be purified by level based siphoning after the immiscible components separate under force of gravity (and/or optionally under centrifugal force). An air or nitrogen pump 703 may be provided for selectively pumping pressurized air or another gas (i.e. nitrogen) into the tops of the first and second fluid tanks 701-702 so as to temporarily store energy in the form of pressurized gas and so as to help pump both of the liquids to the rooftop 705. In the case where nitrogen is used, it may be obtained from a PSA or other nitrogen/oxygen separator.

Actually, the two fluids are not necessarily both pumped to the very top of the illustrated slanted roof 705. Pump 701a pumps the denser dark fluid to the peak of the roof while pump 702a pumps the non-electrolytic and less dense fluid to the bottom of the rooftop. Then the immiscible fluids are stepwise swapped with one another under the force of gravity and/or otherwise as they move between alternatingly staggered heat-up and cool-down units. Unit 751 is an example of a heat-up container having a transparent but thermally insulative top surface (represented as dashed line). Unit 761 is an example of an underlying cool-down container having all opaque and/or reflective outer walls, which are not thermally insulative. In one embodiment, the bottom and most shaded wall (shaded from the sun) includes downwardly hanging radiator pins for better bringing the temperature of fluid in the cool-down container close to the temperature of the ambient atmosphere.

Things get a bit complicated at this stage because there are two versions of each fluid, a heating-up fluid packet and a cooling-down packet. Thus there are at least four different fluid packets traveling in different directions along the top of the roof, namely: 1) HUDDE (Heating-Up Dark Dense Electrolyte) fluid packets; 2) CODDE (COoling-down Dark Dense Electrolyte) fluid packets; 3) HULN (Heating-Up Light Non-electrolyte) fluid packets; and 4) a COLN (COoling-down Light Non-electrolyte) fluid packets. In one embodiment, each HUDDE packet is always in the container above that containing the corresponding CODDE packet, while each HULN packet is always in the container above that containing the corresponding COLN packet. Before a swap of immiscible fluids takes place, the less dense fluid is in the containers lower down along the roof slant while the denser dark fluid is in corresponding containers higher up on the roof slant. After the HUDDE and the HULN packets have Heated-Up in their corresponding, upper units, and the CODDE and COLN packets have COoled-down in their corresponding, lower units, a criss-cross swap of the immiscible fluids is performed. More specifically, a CODDE packet that had cooled off in a shaded, radiator studded container like 761 is swapped with a HULN packet that had heated up in a solar absorbing, transparent top container like 752. A COLN packet that had cooled off in a shaded, radiator studded container like 762 is swapped with a HUDDE packet that had heated up in a solar absorbing, transparent top container like 751.

As the cooled off CODDE packet from shaded container 761 enters the transparently topped upper container 752 that is losing its HULN packet, a number of things happen. First, the temperature of the transparent top container 752 drops because heat is transferred to the entering, pre-cooled CODDE packet (which, if aqueous, has a high specific heat due to its water content). Second, the temperature of the transparent top container 752 drops because the entering CODDE packet is dark colored and therefore acts as an optical shutter, cutting off solar radiation transmission to the inner bottom of container 752. Third, electrolytic concentration in the transparent top container 752 increases as the non-electrolytic HULN packet leaves and the more electrolytic CODDE packet enters. Fourth, if the transparent top container 752 partially contained a low boiling point fluid such as a volatile organic compound (VOC) and the temperature drop crosses below the BP of the low boiling point fluid, the phase change will cause a drop in pressure within the container as the low BP fluid condenses. Thus, if the inner surfaces of the transparent top container 752 include CiPR means that generates electrical energy in response to any one or more of: changing temperature, changing electrolyte concentration, changing dielectric constant (if non-electrolytic dark aqueous liquid is used instead of CODDE), or changing pressure, these changes will function as one of the charge priming or purging phases of the CiPR system. In the case where the inner surfaces of container 752 include ferroelectric dielectrics whose dielectric constants increase with drop of temperature, and/or supercapacitor electrodes whose charge storing capabilities increase with increase of electrolytic concentration, and/or capacitor electrodes whose charge storing capabilities increase with increase of water content between them, it will be a priming phase simultaneously for all these mechanisms.

As a heated-up HULN packet from an unshaded container, say 752 rises into a higher up, shaded container, say 761 that is losing its CODDE packet to unshaded container 752, a number of things happen. First, the temperature of the shaded container 761 increases because heat is transferred to it from the entering and pre-heated HULN packet (which, if non-aqueous, has a relatively low but not negligible specific heat). Second, electrolytic concentration in the shaded container 761 decreases as the electrolytic CODDE packet leaves and the less or non-electrolytic HULN packet enters. Third, if the shaded container 761 partially contains a low boiling point fluid such as a volatile organic compound (VOC) and the temperature increases above the BP of the low boiling point fluid, the phase change will cause an increase in pressure within the container as the low BP fluid evaporates. Thus, if the inner surfaces of the shaded container 761 include one or more CiPR means that generate electrical energy in response to any one or more of: changing temperature, changing electrolyte concentration, changing dielectric constant (if non-electrolytic dark aqueous liquid is used instead of CODDE), or changing pressure, these changes will function to promote one of the charge priming or purging phases of the CiPR system. A similar analysis can apply to the criss-crossing immiscible fluids of containers 751 and 762.

Referring to the under-roof container 706; which is structured to hold both the first and second fluids, as the less dense fluid (e.g., vegetable oil and VOC oil) is pumped up by pump 702a into the bottom of the roof slant 705, the denser fluid (e.g., aqueous) drops down into container 706 from the bottom of the roof slant. Pre-heated, HUDDE packets drop down directly from the roof bottom, through container 706, and into the DDE storage tank 701. By contrast, pre-cooled CODDE packets, such as those descending from shaded container 763 can pass nearby the condenser tubes of a home/office heat pump unit such as air conditioner 764. Air conditioner 764 may be one that includes integrated $\Delta$T-CiPR capacitors in its compressor regions such as described for FIG. 5C. Irrespective of this, air conditioner 764 may include two or more condenser sections, i.e., $Cn_1$ and $Cn_2$ to which the pre-cooled CODDE packets are alternatingly routed as a flowing coolant liquid so as to thereby cause modulating temperatures in those two or more condenser sections, i.e., $Cn_1$ and $Cn_2$ as a result of the changing flow of the coolant liquid. $\Delta$T-CiPR capacitors are integrated into the cooling fins of, and/or elsewhere within or adjacent to the alternatingly cooled, condenser sections, $Cn_{1-2}$ so as to convert part of the heat energy dissipated from those condenser sections, $Cn_{1-2}$ into electrical energy. The integrated $\Delta$T-CiPR capacitors can be of the flexible painted-on type and/or of other types. Temperature modulation may also or alternatively be controlled by modulating the rate of cooling air flow through the alternatingly better-cooled, condenser sections, $Cn_{1-2}$. This alternated air flow option is represented by schematic symbol 765. The alternatingly warmed air flows (765) coming off the alternatingly better-cooled, condenser sections, $Cn_{1-2}$, may be passed through separate exhaust tubes (not shown) which have $\Delta$T-CiPR capacitors integrated to them by way of painting-on type and/or of otherwise. Thus two $\Delta$T-CiPR mechanisms may be simultaneously driven by the alternated fluid flows: the $\Delta$T-CiPR mechanisms on the condensers and the $\Delta$T-CiPR mechanisms in the plural exhaust paths of the condenser(s).

Warmed DDE fluid that comes from the condenser sections, $Cn_{1-2}$, and/or comes from the under-roof tank 706 (where the two warmed flows may be mixed together) next flows down to the bottom of holding tank 701. Depending on available temperature differences, the warmed DDE fluid of tank 701 may next be selectively flowed to a fluid-recooling means such as the illustrated heat exchange with an underground cold fresh water pipe 768, where water flow in the latter acts as a heat sink. ΔT-CiPR capacitors may be integrated into the cooling heat exchange. The flow of the pre-heated DDE fluid may be alternating directed to different cooling sections so as to provide temperature modulation in those alternate heat sink sections and to thereby induce production of electrical energy by the ΔT-CiPR methods described herein. In one embodiment, the pre-heated DDE fluid is not directly circulated around the underground cold water supply pipes of the house or office building 700. Instead, force fed air or nitrogen is used as an intermediary heat exchange medium circulating around the cold water supply pipes. The reason is that, in case of a pipe leak, it will be clear what pipe is leaking. The indirectly-cooled DDE fluid will not be able to contaminate the fresh water supply or the underground water table. Note that water in fresh water pipes such as 768 flow long distances underground and thus provide an excellent and pre-existing means for sinking heat into the ground beneath the building. Sewage pipes 769a can also be used for such heat sinking. In buildings near the ocean, pipes 769b carrying seawater may be run underground to provide heat sinking and also to allow for onshore desalinization at solar heated locations.

An important theme that should be revealing itself from the ongoing description of building 700 is that there are two or more of each of various heat exchanging units. Air conditioner 764 was described above as having two or more condensers, $Cn_1$-$Cn_2$ through or by which a cooling fluid (i.e. the CODDE packets) is alternating passed, or not, so as to cause temperature modulation for the ΔT-CiPR capacitors integrated to the condensers. By similar token, one or more furnaces 770 are provided within building structure 700 where the furnace(s) have at least a redundancy in the number of heat sources used (i.e., flames $F_1$ and $F_2$), the number of heating loads used (i.e., hot water tank 771, only one shown) and the number of effluent exhaust pipes used (i.e., chimneys 772 and 773). ΔT-CiPR capacitors are integrated into one or more of these redundant heat exchange structures so as to take advantage of modulating temperature conditions that are created at these structures as heat energy is alternating, more strongly and then less strongly sourced in and/or sunk out. For example, by alternatingly turning on natural gas (NG) flame $F_1$ while flame $F_2$ is off and vice versa (they share a common pilot source—not shown), the temperatures around each of the thermally-spaced apart burners ($F_1$, $F_2$) may be caused to modulate so as to produce electrical energy in ΔT-CiPR capacitors that are integrated nearby. Water in the hot water tank 771 gets heated by essentially the same amount of combusted natural gas (or other fluid fuel) as it would have by use of a single flame, but some of the heat energy that would have otherwise gone up the chimney (772 or 773) as wastage is instead converted into useful electrical energy and fed to the local transmission grid or to another consumption means or energy storage means (i.e., batteries, flywheels, etc. not shown). By the same token, the hot exhaust gases from the flame(s), $F_1$ and/or $F_2$, are forcibly directed by a blower means (not shown) to alternating flow up through chimney 772 while cool air is blown through the other chimney 773 and then vise versa for the plural chimneys. Temperatures within the thermally spaced apart chimneys 772-773 are thereby caused to modulate and this produces electrical energy in ΔT-CiPR capacitors 776 that are integrated along the chute lengths of the chimneys. Some of the heat energy that would have otherwise simply gone up the chimney (772 or 773) and out into the atmosphere is instead converted into useful electrical energy and the latter is fed to the local transmission grid or to another consumption or storage means.

Heat exchangers 774a and/or 774b are wrapped around the hot water tank 771 and/or chimneys 772-773 for collecting some of the heat energy that would otherwise dissipate into the atmosphere and for transferring that collected energy into either one or both of the flows of pre-cooled DDE fluids (from valve 766) and pre-cooled LN fluids (from valve 767) before the latter are pumped up to the rooftop 705. The LN packets move through pump 702a to the bottom of the roof slant. The DDE packets move through heat exchanger 774b to the top of the roof slant. Those that become the HUDDE packets of heat-up unit 751 get an extra solar kicker of heat energy before descending to cool-down unit 762. Those that become the CODDE packets in cool-down unit 761 cool down in that unit.

In one embodiment, a zigzag downward path is formed in each heat-up unit (i.e., 751) for the descending HUDDE packets therein so that heat is transferred from the pre-heated unshuttered bottom surfaces of the zigzag path to the HUDDE packets as they flow down in zigzag manner. Shown at 780 is one configuration having an upside flat acrylic plate 781 with downward facing convex lens projections (i.e., hemispheroids or down pointing pyramids or down pointing prisms) and spaced away by hollow spacer spheres from the zigzagging down troughs of the ΔT-CiPR capacitors and/or varying electrolytic-presence super capacitors 782. The electrolytic super capacitors have insulated apart carbon electrodes (activated carbon or graphite) for which the HUDDE packets act as electrolyte. When the pre-cooled COLN packets rise into heat-up units like 751, the VOC portions of the noneletrolytic light fluids changes to gaseous phase and pumps the cross-swapping HUDDE packet down and out. This constitutes an electrolyte removal action. The energy of this electrolyte removal action is converted into electrical energy by the purged current from the electrolyte-less super capacitor. Temperature sensitive ferroelectric ΔT-CiPR capacitors are also integrated into zigzag structure 782 so that additional current is purged as the outer black carbon layer of 782 absorbs solar energy when the shuttering HUDDE packet flows out and the transparent or partially transparent HULN packet moves in.

Between the upper and lower, heat-up and cool-down units such as 752 and 762, further CiPR means may be integrated for converting wind motion or rain flow into electrical energy. For example, if the house is situated in a relatively windy area, then upper unit 752 may be elastically mounted to the lower unit 762 and both may be shaped so that wind blowing up over the roof slant urges the upper and lower units 752 and 762 to become temporarily displaced relative to one another. ΔX-CiPR means may be integrated along the counter-facing surfaces of the upper and lower units 752 and 762 so as to convert their relative motion into electrical current flow. Additionally or alternatively, if the house is situated in a relatively rainy area, then Δ∈-CiPR means may be integrated between the counter-facing surfaces of the upper and lower units 752 and 762 so as to convert sporadic flow of water between them into electrical current flow (given that water has a relatively high dielectric constant and air has a much lower one).

Numerous other methods may be used about the building structure for opportunistically and temporarily trapping natural flows of energy (e.g., solar radiation, wind, rain) and/or man-made flows of energy (e.g. from heat pumping systems such as air conditioners, or heat generating equipment such as multi coil section electrical motors) and for generating electrical current flow as charge that is temporarily condensed (or magnetic flux flow that is temporarily condensed) is allowed to, or forced to decondense under the influences of the trapped and released energies. By way of a further example, hot air exhaust or recycled VOC gases may be passed through heat exchange 754 at the top of the roof. A low boiling point liquid such as an alcohol may be used as a working fluid for counter reciprocating pistons 754*a* and 754*b* to convert the exhausting gases (754) into piston motion, and then by means of ΔX-CiPR and/or ΔT-CiPR mechanisms into collected electric charge profit.

Figure 8A:
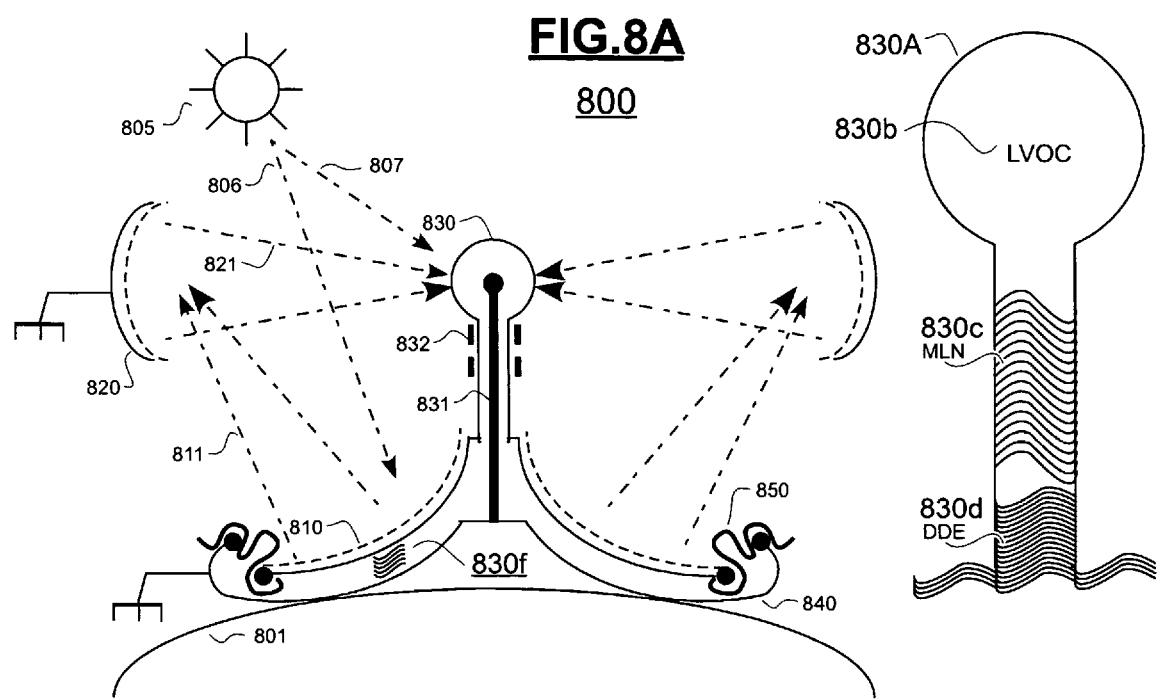
FIG. 8A shows a cross sectional view of a first, moving mirror CiPR system (uses VOC as its working fluid)

Referring to FIG. 8A, a schematic cross sectional view is shown of another CiPR system 800 that can convert solar energy into electrical energy. When the Sun 805 is out, its rays 806 directly or indirectly strike a first upward-facing and concentrating mirror 810. The reflected and concentrated rays 811 are directed in a first mode (cold mode) of the system 800 towards a stationary side mirror 820 which also is structured as a concentrating mirror (e.g., a parabolic mirror). The twice-reflected and twice-concentrated rays 821 are then directed in the first mode toward the center of a solar energy absorbing bulb 830 having a transparent but thermally insulative outer shell (e.g., a voids populated nonreflective glass). A vertical guide post 831 is provided within bulb 830. This vertical guide post 831 may be made of a solar absorbing material (e.g., black-dyed anodized aluminum). It is fastened to a stationary base 840 while the surrounding bulb 830 is allowed to reciprocate vertically as guided by the vertical post 831. Inside of the bulb 830, three immiscible fluids are provided as better shown in exploded view 830A (the solar absorbing post is left out in this illustration). At the top of the bulb, a first volume of a low density and low boiling point (low BP, i.e. below about 70° F.) fluid 830*b* is provided such as a VOC (volatile organic compound). Below the first volume of the low density, low BP mix of gas and liquid 830*b* there is provided a second volume 830*c* of a medium density, and light colored (e.g., clear colored) fluid such as a light oil with a higher BP (i.e. greater than about 100° F.). Below the volume of the MLN (medium density, light and non-electrolytic liquid 830*c*) there is provided a third volume 830*d* of a high density, high BP and electrolytic liquid (DDE).

In the first, so-called cold mode; the DDE liquid 830*d* alone fills a fill-space 830*f* between an electrically conductive bottom surface of mirror 810 and an electrically conductive top surface of base member 840. Upper mirror 810 moves together with bulb 830 while the lower base member 840 is relatively stationary (rigidly connected to side mirrors 820). As seen, the shape of base member 840 generally conforms to the topography of the bottom conductive surface of mirror 810. The two counterfacing and generally conforming surfaces define an electrolytic capacitor in this cold mode. A flexible bellows skin 850 sealingly closes the fill-space 830*f* and joins the stationary base member 840 to the reciprocateable mirror 810, which mirror 810 reciprocates together with bulb 830.

As solar energy heats the solar-absorbing post 831, some of the liquid portion the LVOC 830*b* is converted into gas. This increases pressure in the bulb 830 pushes a sufficient amount of the MLN 830*c* into the top of the fill-space 830*f* so as to break or substantially reduce the bridging continuity which the electrolytic fluid 830*d* had provided between capacitor plates 810 and 840. Since at this time, the mirror plate 810 reciprocates up and away from stationary base member 840, this acts to further reduce capacitive coupling between capacitor plates 810 and 840.

The upward reciprocation of bulb 830 also causes a reflective shield 832 to come into interposed disposition between side-mirrors concentrated beams 821 and the solar absorbing post 831. Although not shown in FIG. 8A, rising plate 810 may at this time make solid-to-solid contact with a copper or other heat sink so that temperature inside the bellows-like structure 810-840-850 can drop. One or more of the above actions leads to a cooling down of temperature inside the bulb after it had heated up and its fluids had expanded into the second, or hot mode of the CiPR system 800. With such cooling, part of the LVOC reconverts to liquid, the MLN withdraws from the fill-space 830*f* and the bridging continuity made by the electrolytic fluid (DDE) reestablishes itself between plates 810 and 840. Thus, electrical capacitance increases and priming current rushes in. In the next heating cycle, the invested charge will be purged out as plate 810 is urged part from plate 840. Not shown are the trap-door and steering devices (e.g., diodes) which guide the prime and purge current flows.

Figure 8B:
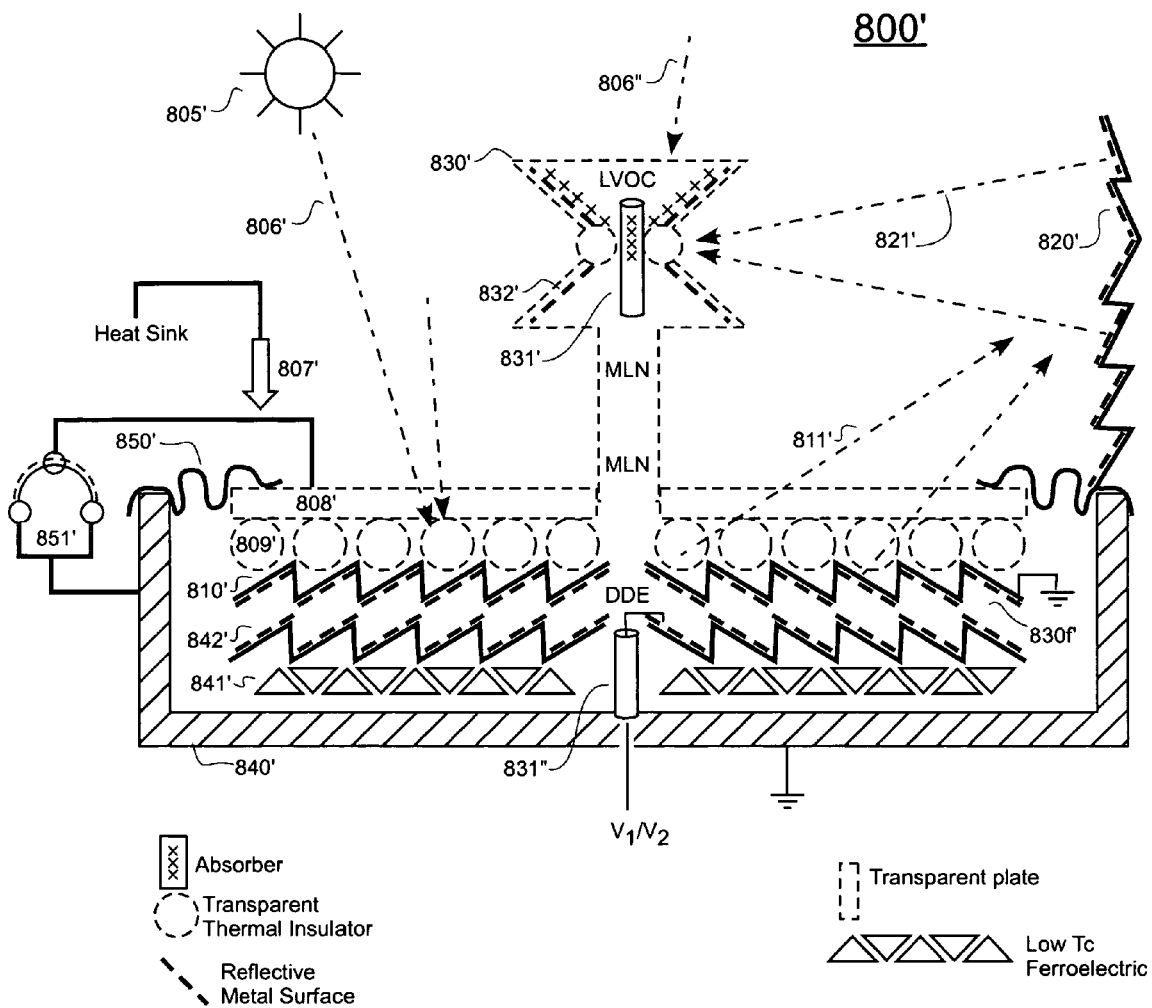
FIG. 8B shows a cross sectional view of a second, moving mirror CiPR system (has bistable positions for Fresnel mirrors and embedded ΔT-CiPR)

Referring to FIG. 8B, another embodiment 800' is shown schematically in cross section. Per the legend, a ferroelectric 841' with low temperature Tc('s) (in range of about 70° F. to 200° F.) is layered in a metal base can 840' (e.g., cylindrical with an open top). Mirror 810' is now shaped as Fresnel style concentrator focusing its reflections toward side mirror 820' (also a Fresnel style concentrator). Silvering is provided on the bottom surface of the glass, acrylic or like substrate of mirror 810' so as to be protected from scratching and/or the external environment. The silvering layer of 810' is grounded and may be covered by a thin dielectric. A V1/V2 lead connects to a counter silvering on plate 842'. Ferroelectric 841' is interposed between the V1/V2 plate 842' and grounded can 840'. Charge storage on layer 842 fluctuates both because temperature fluctuates in the DDE fill zone 830'*f* and because distance between it and counter plate 810' changes as the VOC fluid expands and shrinks in volume.

The VOC holding bulb 830' has the shape roughly of two opposed frusto-cones touching apex to apex (each cone in one embodiment is actually a regular prism having a triangular, square, hexagonal, etc. base instead of a circular one). A peek-a-boo optical hole is provided at the meeting of the apexes for the concentrated beams 821' of mirror 820' to enter and heat solar absorbing tube 831' (an opened ends and hollow tube). LVOC fluid (gas & liquid) is held in both the upper and lower frusto-cones, attaining maximum heat absorption near the thermally-insulated environment of the peek-a-boo optical hole. The outer surfaces of the upper and lower frusto-cones (except in the zone of the peek-a-boo hole) act as mirrors for reflecting radiation to other, neighboring CiPR systems like 800'. When mirror 810' reaches its peak height during reciprocation, the energy of beams 811' is directed away from the peek-a-boo hole, to one or more of the neighboring CiPR systems like 800'. The mirroring on the outer surfaces of the upper and lower frusto-cones can be used to aim the re-directed energy towards the alike top mirrors 810' of the neighboring CiPR systems (not shown). The inner surface of the upper cone has a solar absorbing coating. The top of the upper cone is composed of a transparent thermal insulator. Thus solar radiation 806" can enter from the top to heat the LVOC fluid.

A heat sink 807' makes thermal contact with mirror 810' when top plate assembly 810'-809'-808' rises. Member 851' represents a bistable and temperature sensitive urging means such as a bimetallic bistable spring that snaps to an upward urging mode or a downward urging mode in response to pressures on the top plate assembly 810'-809'-808' and surrounding temperature (ambient temperature). Transparent spheres act as concentrating lenses and as thermal isolators. Disc plate 808' may be made of glass or another hard transparent cover material. A fluid input/output valve and pressure relief valve (not shown) may be provided on through can 840' for adjusting the amounts of DDE, MLN and LVOC in the bulb and fill space and protecting flexible bellows 850' from rupturing in case of excessive internal temperatures and pressures. While a working fluid combination of an immiscible triad of DDE, MLN and LVOC has been discussed here, other working fluids may be used including just air or nitrogen. While use of thermal expansion and use of a low-K fluid dielectric to displace a high-K or electrolyte has been discussed immediately above, it is within contemplation here to additionally or alternatively use a low-K fluid dielectric to displace an electrically conductive liquid layer that defines part of a first plate of a variable capacitor means, the displacement of the conductive liquid layer causing one or both of reduction in effective surface area of the variable capacitor means and increase in effective plate separation within the variable capacitor means. Moreover, at the same time that displacement of an electrically conductive liquid layer is contemplated here, it is also within contemplation here to additionally or alternatively use a low-permittivity fluid to displace a higher permittivity magnetic flux conducting liquid layer that defines part of a magnetic yoke means of a variable inductance means.

Referring to FIG. 9, some of the broader concepts of the present disclosure of invention may be again summarized as follows. In a CiPR system 900, an investment charge donor 911 periodically or opportunistically donates an amount of investment charge through a trap-door switch 912 (i.e. one way diode) into a variable condenser 913. The variable condenser 913 may be one that temporarily condenses into closer proximity either electrically charged particles of same polarity and/or magnetic flux flows of same direction. A decondenser 920 is integrated with, or operatively coupled to the variable condenser 913 by way of the mechanism represented by line 923. The decondenser is driven by a supplied energy to cause the decondensation of the condensed charged particles and/or of the condensed magnetic flux flows of variable condenser 913. A purging electromotive force (EMF) is induced as a result of the decondensation. The trap-door switch means 912 substantially blocks electrical current from flowing directly back to the donor 911 by way of switch 912. Purged current (if any) is therefore trapped and steered or guided into instead flowing over a taller barrier, namely the higher opposing voltage, $+V_2$ presented at a node of steering switch 914. (Note, the purge path should not present so high of a barrier that electrostatic arcing is the path of lesser resistance to the trapped charge.) In the illustrated example, the purged current flows serially through both a charge splitter and profit collector 915 and through the donor 911. The donor 911 recoups at least a part of its original investment. The profit collector collects a profit amount of charge. A dividend distribution means such as illustrated switches $Sw_1$ and $Sw_2$ may be used to distribute some of the collected profit from profit collector 915 to the donor 911 (this can be done indirectly rather than directly as shown) so that some of the profit may be reinvested. Switch 913*b* is strategically located so that profit is not lost to ground during the dividend distribution operation.

The supplied energies that drive decondenser 920 can be selectively chosen from among a plurality of different kinds, including but not limited to those that provide: a ΔT-phenomenon (e.g., temperature change due to heat flow); a ΔP-phenomenon (e.g., pressure change due to heat flow); a ΔX-phenomenon (e.g., positional change due to wind, waves, any mechanical force); a Δ∈-phenomenon (e.g., dielectric constant change or electrolyte composition change due to temperature change and or fluid replacement); ΔA-phenomenon (e.g., effective area change due to fluid change or yoke gap movement); ΔB-phenomenon (flux flow change); or other energetic changes that may be used to cause alternating condensations and decondensations.

Another example of combined magnetic and capacitive CiPR means is shown at 923*a*, 923*b* in FIG. 9. The linear yoke pieces move linearly in opposite directions relative to one another. The spoked continuity breakers 923*b* roll between the linear yoke pieces. Other forms of parallel surfaces could be used. Low Tc ferroelectric dielectric are provided adjacent to the electrical coils (or integrated with them) so as to convert pulses of waste heat energy into electrical energy. This has far ranging applicability such as in electrical motors, generators, power transmission systems (transformers) and so forth.

Figure 10A:
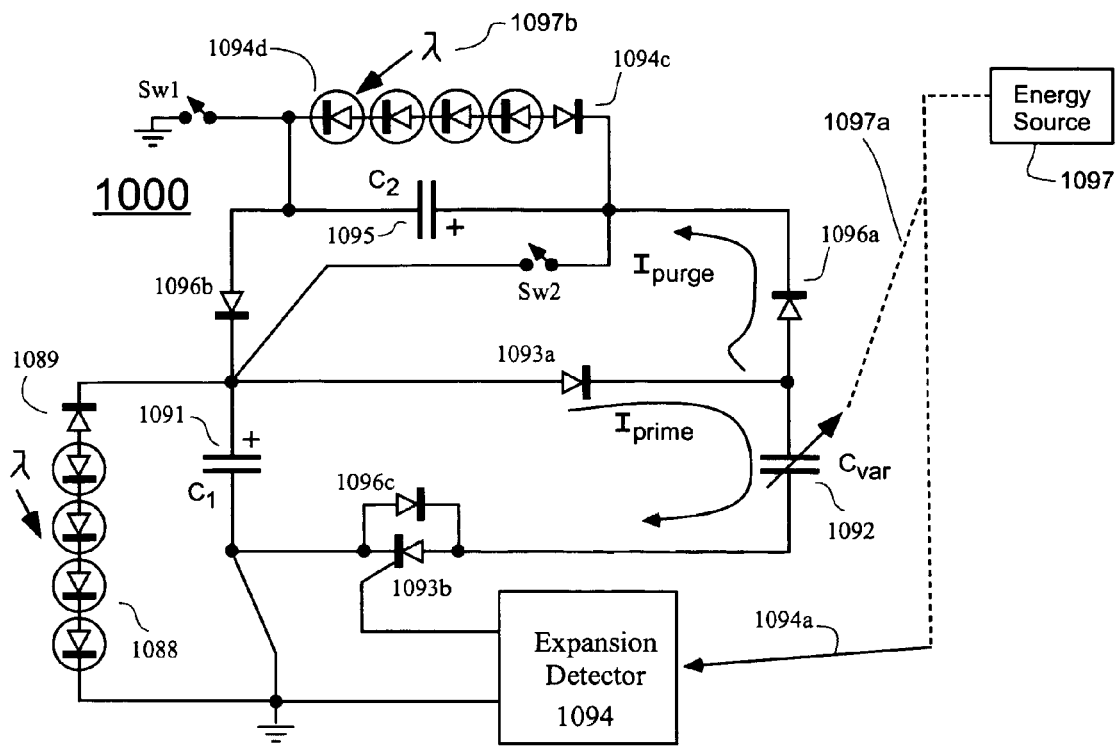
FIG. 10A is a schematic of a first combination photovoltaic and capacitive CiPR system.

Referring to FIG. 10A, shown is a schematic of a first combined photovoltaic and capacitive CiPR system 1000. A first series of photovoltaic cells (PVC's) 1088 generate current for charging a rechargeable donor means 1091 ($C_1$) via a first current steering means 1089. As in other cases discussed herein, the charge donor 1091 is not limited to being a fixed capacitance ($C_1$) and may additionally or alternatively include a supercapacitor, a rechargeable Li ion or other secondary battery or other charge storing and lending means as may be appropriate. A second series of photovoltaic cells (PVC's) 1094*d* generate current for charging a rechargeable collector means 1095 ($C_2$) via a second current steering means 1094*c*. As in other cases discussed herein, the profit charge collector 1095 is not limited to being a fixed capacitance ($C_2$) and may additionally or alternatively include a supercapacitor, a rechargeable Li ion or other secondary battery or other charge receiving, storing and outputting means as may be appropriate.

When expansion detector 1094 detects that variable condensing/decondensing means 1092 ($C_{var}$) is entering a significant decondensing state (a purge), it switches switching means 1093*b* (e.g., an SCR) into a conductive state. Priming current, $I_{prime}$ flows through trap door means 1093*a* (e.g., a diode) at that time to prime the variable condensing/decondensing means 1092 ($C_{var}$). As energy source 1097 (e.g., wind, waves, thermal expansion and/or other) drives means 1092 ($C_{var}$) further into a decondensation state, the purge phase current, $I_{purge}$ is blocked from leaking back through trapdoor 1093*a* and instead flows through steering means 1096*a* and 1096*b* as well as through the profit charge collector 1095, the donor 1091 and diode 1096*c*. Profit collects in collector 1095 and recoupment charge collects in donor 1091 during the purge phase. The profit stored in collector 1095 due to purging is in addition to any profit that may have collected by the charge generating action of PVC series 1094*d*. (Radiation 1097*b* is the source of that alternate profit.) Coupling 1097*a* operatively couples source 1097 to the variable condensing/decondensing means 1092 ($C_{var}$). Coupling 1094*a* operatively couples source 1097 to the expansion detector 1094. In one embodiment, expansion detector 1094 is deleted, diode 1096*c* is deleted while SCR 1093*b* is replaced by a short. Switches Sw1 and Sw2 may be used for redistributing (i.e. equalizing) charge between $C_1$ and $C_2$. Although not shown, one or both of $C_1$ and $C_2$ may be coupled to drive an electrical load.

Figure 10B:
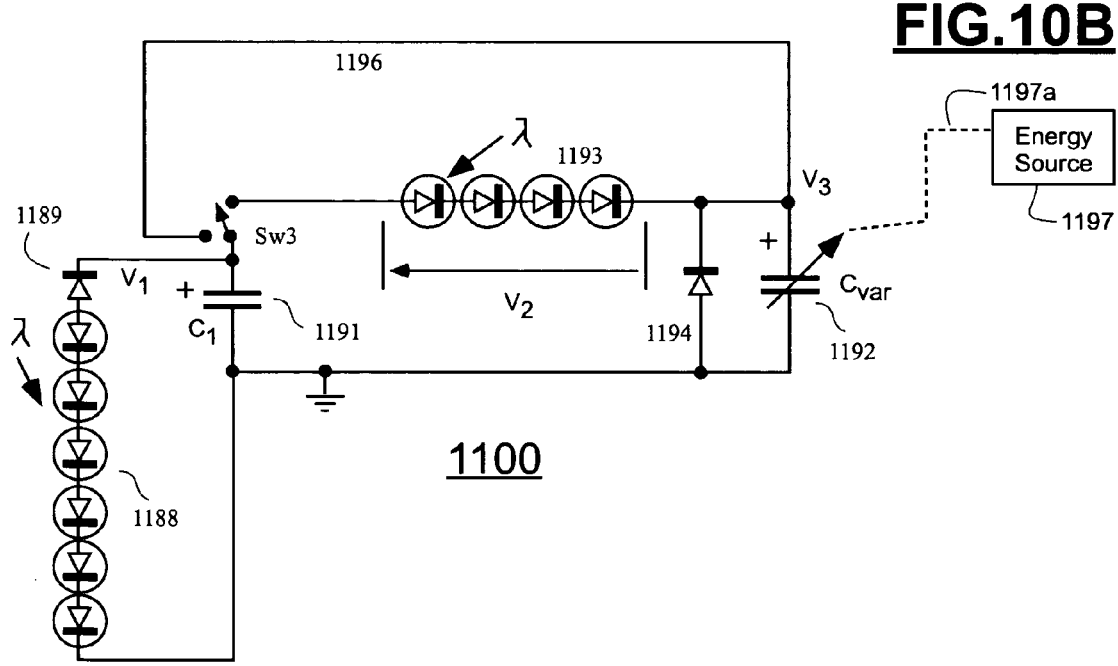
FIG. 10B is a schematic of a second combination photovoltaic and capacitive CiPR system.

Referring to FIG. 10B, shown is a schematic of a second combined photovoltaic and capacitive CiPR system 1100. A first series of photovoltaic cells (PVC's) 1188 generate current for charging a rechargeable donor means 1191 ($C_1$) to a first voltage $V_1$ via a first current steering means 1189. As in other cases discussed herein, the charge donor 1191 is not limited to being a fixed capacitance ($C_1$) and may additionally or alternatively include a supercapacitor, a rechargeable Li ion or other secondary battery or other charge storing and lending means as may be appropriate. A second series of photovoltaic cells (PVC's) 1093 are provided for photovoltaicly generating a PVC voltage $V_2$ less than $V_1$ of first PVC series 1188. A third voltage $V_3$ develops across the variable condensing/decondensing means 1192 ($C_{var}$). Coupling 1197*a* operatively couples energy source 1197 to the condensing/decondensing means 1192 to thereby switch the latter means 1192 ($C_{var}$) between its condensing and decondensing states. Diode 1194 limits means 1192 ($C_{var}$) from going to far into a reverse polarity. Switch Sw3 may be occasionally thrown to equalize charge distribution between condensing/decondensing means 1192 and donor 1191 by way of short circuit path 1196.

When third voltage $V_3$ enlarges due to decondensing action in the condensing/decondensing means 1192, it sweeps photovoltaically generated charge (profit charge) out of the second series of PVC's 1093 and into first storage means 1191 ($C_1$). At this time, the charge depletion zones within diodes 1093 enlarge thereby providing a larger volume within the semiconductor for photovoltaically generating new electron hole pairs. The newly generated separation of charges works to reduce third voltage $V_3$ and optionally enlarge first voltage $V_1$ (if 1191 is not a chemical battery) until equilibrium of $V_1 = V_2 + V_3$ is reestablished in circuit 1100.

When third voltage $V_3$ shrinks due to condensing action in the condensing/decondensing means 1192, PVC series 1193 becomes temporarily forward biased to supply priming current into condensing/decondensing means 1192 so as to reestablish the equilibrium condition, $V_1 = V_2 + V_3$ in circuit 1100. The circuit is now ready to be again pumped by energy source 1197. If energy source 1197 is one driven by intermittent wind, then the system 1100 can double as a photovoltaic only source of energy if the sun is out during the day and there is no wind. It may function as a wind driven system even at night providing the moon is out to provide solar radiation and the wind blows to boost the weak charge provided by moonlight.

The following Recaps are now provided. In view of the disclosure, it is shown herein that:

Recap-1: A variable density actualizing means (i.e., 500) may be realized in accordance with the disclosure of invention provided herein for supporting one or both of temporarily condensed electric charge (i.e., 521) and intensified magnetic flux flow (i.e., 502), where the actualizing means comprises:

(1a) condensing means (i.e., 521,501) for condensing one or more of an amount of electrical charge supplied (i.e., 512) from a charge donating source (i.e., C511) and flux flow induced by a magnetic field generated by a magnetic field source (i.e., L22);

(1b) decondensing means (i.e., 497*b*,ferroE), integrated with the condensing means and couplable to one or more energy sources (i.e., 250), for decondensing the charge and/or flux flow condensed by the condensing means, the decondensing being powered by input energy received from one or more of the energy sources; wherein the decondensing means is powered by at least one of:

(1b.1) heat energy received from one or more of the energy sources (i.e., sun, air, HUDDE 751);

(1b.2) electrolytic ion removal energy received from one or more of the energy sources (i.e., VOC's); and (1b.3) dielectric constant reducing energy received from one or more of the energy sources (i.e., waves, wind, air conditioning compressor).

Recap-2: The variable density actualizing means of Recap-1 may be realized wherein the decondensing means is further powered by at least one of:

(2b.4) pressure energy received from one or more of the energy sources;

(2b.5) displacement energy received from one or more of the energy sources (i.e., waves, wind);

(2b.6) dielectric constant reducing energy received from one or more of the energy sources (i.e., waves, wind); and (2b.7) magnetic permitivity reducing energy received from one or more of the energy sources (i.e., waves, wind).

Recap-3: The variable density actualizing means of Recap-1 may be provided as an integral part of a compressor (i.e., 580) of a compressible fluid.

Recap-4: The variable density actualizing means of Recap-3 may be provided wherein the compressible fluid includes a refrigerant.

Recap-5: The variable density actualizing means of Recap-3 may be provided wherein the compressible fluid includes air.

Recap-6: The variable density actualizing means of Recap-3 may be provided wherein the compressor includes an electromagnet motor for compressing the compressible fluid and the electromagnet motor has a temperature sensitive dielectric incorporated with inductive windings of the motor, the temperature sensitive dielectric forming part of said decondensing means which is powered at least by heat energy received from one or more of energy sources and the inductive windings of the motor define at least one such heat-sourcing energy source.

Recap-7: The variable density actualizing means of Recap-1 may be provided as an integral part of a fluid condenser (i.e., 764) and/or a heat radiator.

Recap-8: The variable density actualizing means of Recap-7 may be provided wherein the variable density actualizing means is provided as an integral part of said fluid condenser and the fluid condenser condenses a refrigerant.

Recap-9: The variable density actualizing means of Recap-8 may be provided wherein said fluid condenser is a first of plural condensers (i.e., $C_{n1}$-$C_{n2}$) that are alternatingly cooled by one or more cooling fluids and reheated by respective one or more refrigerants so that temperature at the first and each of the other condensers modulates sufficiently in response to being alternatingly cooled and reheated so that said decondensing means which is powered at least by heat energy received from one or more of energy sources is powered at least in part by the temperature modulations of the first condenser.

Recap-10: The variable density actualizing means of Recap-7 may be provided wherein the variable density actualizing means is provided as an integral part of said heat radiator and said heat radiator is a first of plural heat radiators that are alternatingly cooled by one or more cooling fluids and reheated by a radiator working fluid so that temperature at the first and each of the other heat radiators modulates sufficiently in response to being alternatingly cooled and reheated so that said decondensing means which is powered at least by heat energy received from one or more of energy sources is powered at least in part by the temperature modulations of the first heat radiator.

Recap-11: The variable density actualizing means of Recap-10 may be provided wherein the plural heat radiators are disposed within a transportation vehicle.

Recap-12: The variable density actualizing means of Recap-1 may be provided as an integral part of a heater (i.e., 770).

Recap-13: The variable density actualizing means of Recap-12 may be provided wherein said heater is a first of plural heaters (i.e., F1-F2) that are alternatingly energized and deenergized so that temperature at the first and each of the other heaters modulates sufficiently in response to being alternatingly energized and deenergized so that said decondensing means which is powered at least by heat energy received from one or more of energy sources is powered at least in part by the temperature modulations of the first heater.

Recap-14: The variable density actualizing means of Recap-13 may be provided wherein said first heater is alternatingly energized and deenergized by an alternate increase and decrease of at least one of the following:
(b.1a) a flow of fluid combustible fuel;
(b.1b) a flow of an electrical current; and
(b.1c) a transmission of radiated heating energy.

Recap-15: The variable density actualizing means of Recap-1 may be provided as an integral part of a fluid carrying passageway (i.e., 772).

Recap-16: The variable density actualizing means of Recap-15 may be provided wherein at least a portion of said fluid carrying passageway (i.e., 773) which is thermally-wise conductively coupled to the decondensing means (i.e., 776, ferro), is alternating cooled and heated by one or more heat carrying fluids.

Recap-17: The variable density actualizing means of Recap-15 may be provided wherein said fluid carrying passageway is part of a chimney system.

Recap-18: The variable density actualizing means of Recap-1 may be provided as an integral part (i.e., 551) of an electric current carrying means (i.e., 550) that is alternating heated and cooled.

Recap-19: The variable density actualizing means of Recap-18 may be provided wherein said electric current carrying means is part of an electric motoring means (i.e., 550).

Recap-20: The variable density actualizing means of Recap-18 may be provided wherein said electric current carrying means is part of an electricity transmission grid Recap-21: The variable density actualizing means of Recap-1 may be provided as an integral part of a solar radiation absorber (i.e., 751).

Recap-22: The variable density actualizing means of Recap-21 may be provided wherein said solar radiation absorber includes a substantially transparent thermal insulator (i.e., 781) disposed for allowing solar radiation to pass through for absorption while impeding immediate loss of the absorbed solar radiation as heat that is convectively dissipated to the ambient environment Recap-23: The variable density actualizing means of Recap-1 may be provided as an integral part of an ocean or other water-body power system.

Recap-24: An energy transforming method may be provided which comprises:
(a) condensing (i.e., 521, 501) one or more of an amount of electrical charge supplied (i.e., 512) from a charge donating source (i.e., C511) and flux flow induced by a magnetic field generated by a magnetic field source (i.e., L22);
(b) decondensing (i.e., 497b, ferro), the charge and/or flux flow condensed by said condensing step, the decondensing being powered by input energy received from one or more energy sources; wherein the decondensing step is powered by at least one of:
(b.1) heat energy received from the one or more of energy sources (i.e., sun,air,HUDDE 751);
(b.2) electrolytic ion removal energy received from one or more of the energy sources (i.e., VOC's); and
(b.3) dielectric constant reducing energy received from one or more of the energy sources (i.e., waves, wind).

Recap-25: The energy transforming method of Recap-24 may be provided wherein the decondensing step is further powered by at least one of:
(b.4) pressure energy received from one or more of the energy sources;
(b.5) displacement energy received from one or more of the energy sources (i.e., waves, wind);
(b.6) dielectric constant reducing energy received from one or more of the energy sources (i.e., waves, wind); and
(b.7) magnetic permitivity reducing energy received from one or more of the energy sources (i.e., waves, wind).

Recap-26: The energy transforming method of Recap-24 may be provided wherein said decondensing step is powered at least in part by heat and/or pressure generated by a compressor (i.e., 580) of a compressible fluid.

Recap-27: The energy transforming method of Recap-24 may be provided wherein said decondensing step is powered at least in part by heat output from a fluid condenser (i.e., 764) and/or a heat radiator.

Recap-28: The energy transforming method of Recap-24 may be provided wherein said decondensing step is powered at least in part by non-propelling energy released by a propelled transportation vehicle, examples of said non-propelling energy including any one or more of heat energy output by a radiator of the transportation vehicle, heat energy output by an exhaust pipe of the transportation vehicle, heat energy output by a braking subsystem of the transportation vehicle, heat energy output by a propulsion motor of the transportation vehicle, and/or heat and/or other non-propelling energy output by a shock or vibrations reducing subsystem of the transportation vehicle.

Recap-29: The energy transforming method of Recap-24 may be provided wherein said decondensing step is powered at least in part by an alternating energizing and reenergizing of an external energy source where examples of said can include any one or more of alternately increasing and decreasing at least one of the following:
(b.1a) a supplying of a combustible fluid fuel;
(b.1b) a supplying of electrical current; and
(b.1c) a supplying of radiated heating energy.

Recap-30: A method of producing electrical charge may be provided comprising:
(a) alternatingly exposing a temperature-sensitive, first charge storing means to one or more fluids of temperatures that are substantially different from one another so that at a first of the substantially different temperatures, electrical charge is urged to enter and become temporarily stored (condensed) in the temperature-sensitive, first charge storing means and so that at a second of the substantially different temperatures, a substantial amount of electrical charge is purged (decondensed) out of the first charge storing means;
(b) passing the purged charge through a first profit charge collecting means; and
(c) from time to time, operatively coupling the first profit charge collecting means to a first charge lending means so that the first lending means can use at least some of the collected profit charge for subsequent donation (re-investment) to the temperature-sensitive, first charge storing means when the first charge storing means is again at said first temperature.

Recap-31: The producing method of Recap-30 may be provided and further comprising:
(d) alternatingly exposing a pressure-sensitive, second charge storing means to one or more fluids of pressures that are substantially different from one another so that at a first of the substantially different pressures, electrical charge is urged to enter and become temporarily stored (condensed) in the pressure-sensitive, second charge storing means and so that at a second of the substantially different pressures, a substantial amount of electrical charge is purged out of the second charge storing means;

(e) passing the purged charge through the first or another profit charge collecting means; and (f) from time to time, operatively coupling the first or other profit charge collecting means to the first or another charge lending means so that the first or other lending means can use at least some of the collected profit charge for subsequent donation (re-investment) to the pressure-sensitive, second charge storing means when the second charge storing means is again at said first pressure.

Recap-32: The producing method of Recap-30 may be provided and further comprising:

(d) alternatingly exposing an electrolytic type of charge storing means to first and second fluids of substantially different electrolytic capabilities so that when the fluid with substantially greater electrolytic capability is exposed to the third charge storing means, electrical charge is urged to enter and become temporarily stored (condensed) in the third charge storing means and so that when the fluid with substantially lesser electrolytic capability is alternatingly applied to the third charge storing means, a substantial amount of electrical charge is purged out of the third charge storing means (e) passing the purged charge from the third charge storing means through the first or another profit charge collecting means; and (f) from time to time, operatively coupling the first or other profit charge collecting means to the first or another charge lending means so that the first or other lending means can use at least some of the profit charge collected from the purging of the third charge storing means for donation to the third charge storing means when the fluid with substantially greater electrolytic capability is next exposed to said third charge storing means.

Recap-33: The producing method of Recap-30 may be provided wherein the one or more fluids include first and second fluids that are substantially immiscible in one another.

Recap-34: The producing method of Recap-30 may be provided and further comprising:

(d) alternatingly exposing a dielectric constant-sensitive, fourth charge storing means to two or more fluids of dielectric constants that are substantially different so that when the fourth charge storing means is subjected to a first fluid having a first of the substantially different dielectric constants, electrical charge is urged to enter and become temporarily stored in the dielectric constant-sensitive, fourth charge storing means and so that when the fourth charge storing means is subjected to another fluid having a second of the substantially different dielectric constants, a substantial amount of electrical charge is purged out of the fourth charge storing means; the method further comprising:

(e) passing the purged charge through the first or another profit charge collecting means; and (f) from time to time, operatively coupling the first or other profit charge collecting means to the first or another charge lending means so that the first or other lending means can use at least some of the collected profit charge for subsequent donation (re-investment) to the dielectric constant-sensitive, fourth charge storing means when the fourth charge storing means is again subjected to the first fluid having the first of the substantially different dielectric constants.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing such.

RESERVATION OF EXTRA-PATENT RIGHTS, RESOLUTION OF CONFLICTS, AND INTERPRETATION OF TERMS

After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. An energy converting system comprising:
condensing means for condensing electrical charge supplied from a charge donating source; and
decondensing means, coupled to the condensing means and, structured for repeatedly decondensing charge condensed by the condensing means, wherein operations of the decondensing means are powered by input energy received from one or more energy sources; and wherein the condensing means has or receives a fluid which is repeatedly displaced by the decondensing means.

2. The energy converting system of claim 1 wherein the decondensing means includes means for repeatedly reducing an effective dielectric constant of the condensing means.

3. The energy converting system of claim 1 provided as an integral part of a compressor of a compressible fluid.

4. The energy converting system of claim 1 provided as an integral part of a heat radiator system.

5. The energy converting system of claim 4 wherein said heat radiator system comprises plural heat radiators that are each alternatingly cooled by one or more cooling fluids and reheated by a radiator working fluid so that temperature at each of the heat radiators modulates sufficiently in response to being alternatingly cooled and reheated so that said decondensing means which is powered at least by heat energy received from one or more of energy sources is powered at least in part by the temperature modulations of one of the heat radiators of said heat radiator system.

6. The energy converting system of claim 5 wherein the plural heat radiators are disposed within a transportation vehicle.

7. The energy converting system of claim 1 provided as an integral part of a heater.

8. The energy converting system of claim 1 provided as an integral part of a fluid carrying passageway.

9. The energy converting system of claim 1 provided as an integral part of an electric current carrying means that is alternating heated and cooled.

10. The energy converting system of claim 9 wherein said electric current carrying means is part of an electric motoring means.

11. The energy converting system of claim 1 provided as an integral part of a thermal solar system having a solar radiation absorber.

12. The energy converting system of claim 11 wherein said solar radiation absorber has disposed adjacent thereto a substantially transparent thermal insulator which allows solar radiation to pass through for absorption by the solar radiation absorber while impeding immediate loss to an ambient environment of the absorbed solar radiation as heat that is convectively dissipated to the ambient environment.

13. The energy converting system of claim 1 provided as an integral part of an ocean power system.

14. An energy transforming method comprising:
(a) condensing in a variable charge condenser an amount of electrical charge supplied from a charge donating source;
(b) repeatedly decondensing charge condensed by said condensing step, the decondensing being powered by input energy received from one or more energy sources; wherein the decondensing step includes repeatedly displacing a fluid from or into the variable charge condenser.

15. The energy transforming method of claim 14 wherein said decondensing step includes receiving heat output from a fluid condenser or a heat radiator.

16. The energy transforming method of claim 14 wherein said decondensing step is carried out in a transportation vehicle and includes receiving input energy as any one or more of heat energy output by a radiator of the transportation vehicle, heat energy output by an exhaust pipe of the transportation vehicle, heat energy output by a braking subsystem of the transportation vehicle, heat energy output by a propulsion motor of the transportation vehicle, and waste energy output by a shock or vibrations reducing subsystem of the transportation vehicle.

17. The energy transforming method of claim 14 wherein said decondensing step includes increasing and decreasing at least one of the following:
a supplying of a combustible fluid fuel;
a supplying of electrical current; and
a supplying of radiated heating energy.

18. The energy converting system of claim 1 wherein said repeatedly displaced fluid includes at least one of:
an electrically insulative liquid having a dielectric constant greater than that of air;
an electrically conductive liquid that defines at least part of a capacitor plate surface; and
a liquid electrolyte.

19. The energy converting system of claim 1 wherein said decondensing means includes means for repeatedly switching temperature of a working fluid above and below a boiling point of the working fluid.

20. The energy converting system of claim 1 wherein said decondensing means includes a second liquid having a boiling point higher than that of the working fluid where the second liquid is immiscible in the working fluid.

21. An energy converting apparatus comprising:
a variable capacitor having at least one of:
a displaceable and electrically insulative liquid having a dielectric constant greater than that of air,
a displaceable and electrically conductive liquid that defines at least part of a capacitor plate surface of the variable capacitor, and
a displaceable and liquid electrolyte; and
a displacer operatively coupled to the variable capacitor for repeatedly displacing the at least one of the displaceable liquids of the variable capacitor.

22. The energy converting apparatus of claim 21 and further comprising an urging means having at least one stable state and one astable state where the urging means is coupled to the displacer such that the displacer is urged by the at least one stable state of the urging means into at least one of a heating-up or cooling down mode.

* * * * *